US009771095B2

(12) United States Patent
Laffan et al.

(10) Patent No.: US 9,771,095 B2
(45) Date of Patent: Sep. 26, 2017

(54) STROLLER WITH A SECONDARY ATTACHMENT

(71) Applicant: Austlen Baby Co., Berwyn, PA (US)

(72) Inventors: Patrick William Laffan, Berwyn, PA (US); Leslie Stiba, Pflugerville, TX (US)

(73) Assignee: Austlen Baby Co., Berwyn, PA (US)

( * ) Notice: Subject to any disclaimer, the term of this patent is extended or adjusted under 35 U.S.C. 154(b) by 33 days.

(21) Appl. No.: 15/040,397

(22) Filed: Feb. 10, 2016

(65) Prior Publication Data

US 2016/0229441 A1 Aug. 11, 2016

Related U.S. Application Data

(60) Provisional application No. 62/114,324, filed on Feb. 10, 2015, provisional application No. 62/207,703, filed on Aug. 20, 2015.

(51) Int. Cl.
| | |
|---|---|
| *B62B 9/26* | (2006.01) |
| *B62B 9/12* | (2006.01) |
| *B62B 7/00* | (2006.01) |
| *B62B 9/28* | (2006.01) |
| *B62B 7/14* | (2006.01) |

(52) U.S. Cl.
CPC ............... *B62B 9/26* (2013.01); *B62B 7/008* (2013.01); *B62B 9/12* (2013.01); *B62B 9/28* (2013.01); *B62B 7/142* (2013.01); *B62B 2202/26* (2013.01); *B62B 2206/02* (2013.01)

(58) Field of Classification Search
None
See application file for complete search history.

(56) References Cited

U.S. PATENT DOCUMENTS

| | | | |
|---|---|---|---|
| 5,653,460 A | 8/1997 | Fogarty | |
| 7,588,263 B2* | 9/2009 | Yang | B62B 9/26 224/409 |
| 7,789,413 B2 | 9/2010 | Hei et al. | |
| 8,070,180 B2* | 12/2011 | Stiba | B62B 7/10 280/47.38 |
| 8,807,588 B2 | 8/2014 | Thomas et al. | |
| 8,899,615 B2 | 12/2014 | Dijkstra | |
| 2004/0094935 A1* | 5/2004 | Fair | B62B 7/08 280/642 |

(Continued)

OTHER PUBLICATIONS

Invitation to Pay Additional Fees dated Apr. 29, 2016, from corresponding PCT Application No. PCT/US16/17316.

*Primary Examiner* — J. Allen Shriver, II
*Assistant Examiner* — Hilary L Johns
(74) *Attorney, Agent, or Firm* — DLA Piper LLP (US)

(57) ABSTRACT

The present disclosure relates to a stroller with a secondary attachment mechanism to facilitate the attachment of various structures to the stroller. In one embodiment, the secondary attachment mechanism may comprise an infant car seat adapter. In another embodiment, the secondary attachment may comprise a basket. The present disclosure also relates to a basket for use in an expandable stroller system. The expandable stroller system comprises an expandable base. The basket attaches to the expandable stroller system and expands with the expandable base of the stroller system advantageously providing additional storage space.

19 Claims, 65 Drawing Sheets

(56) References Cited

U.S. PATENT DOCUMENTS

| | | | |
|---|---|---|---|
| 2007/0126207 A1* | 6/2007 | Rojas | B62B 3/027 |
| | | | 280/647 |
| 2008/0150247 A1* | 6/2008 | Lake | B62B 7/123 |
| | | | 280/47.41 |
| 2009/0315300 A1* | 12/2009 | Stiba | B62B 7/10 |
| | | | 280/648 |
| 2010/0244393 A1* | 9/2010 | Thomas | B62B 7/14 |
| | | | 280/33.993 |
| 2011/0175305 A1* | 7/2011 | Chen | B62B 7/145 |
| | | | 280/30 |
| 2013/0001925 A1* | 1/2013 | Zhong | B62B 7/08 |
| | | | 280/642 |
| 2014/0346756 A1 | 11/2014 | Laffan et al. | |

* cited by examiner

STROLLER WITH A SECONDARY ATTACHMENT

PRIORITY

This application claims priority to U.S. Provisional Application No. 62/114,324, entitled "Stroller with a Secondary Attachment" filed Feb. 10, 2015, and U.S. Provisional Application No. 62/207,703 entitled "Basket Attachment for Stroller" filed Aug. 20, 2015, the contents of all of which are hereby incorporated by reference.

TECHNICAL FIELD

The disclosure relates to strollers, and more particularly strollers with a secondary attachment configured to hold passengers and/or goods.

BACKGROUND

Strollers have been known and used for a number of years to provide a comfortable device to move a passenger such as a baby or a small child. There is a need for a stroller to provide means for transporting a second passenger (such as an infant) and/or goods.

SUMMARY

A first exemplary embodiment of the stroller may have a base having a first, front end, a second, rear end and a one or more elongated portions extending therebetween. A first frame member having a first, lower end and a second, upper end is connected to the base proximate the first, front end of the base and a generally elongated portion extends between the first, lower end and the second, upper end of the first frame member. The second, upper end of the first, front frame member may have at least one structural member configured to provide support for a secondary attachment. A second, rear frame member having a first, lower end and a second, upper end is also connected to the base proximate the second, rear end of the base. The second, rear frame member has a generally elongated portion which extends between the first, lower end and the second, upper end of the second, rear frame member. The second, upper end of the second, rear frame member may have at least one structural member also configured to provide support for the secondary attachment. The secondary attachment may have a first segment with at least one attachment end laterally spaced apart from a second segment with another attachment end. At least one receptacle is located within each of the structural members of the first, front frame member and the second, rear frame member. Each receptacle is capable of receiving at least one of the attachment ends of the secondary attachment. In a first configuration the secondary attachment is attached to the first, front frame member and the second, rear frame member by way of the one or more attachment ends of the secondary attachment being engaged with the receptacles. In a second configuration the secondary attachment is detached from both the first, front frame member and the second, rear frame member.

In a further exemplary embodiment, the secondary attachment attaches to a stroller by aligning each of at least one attachment end of the secondary attachment with a receptacle located on the stroller, engaging each of the at least one attachment end and the receptacle by lowering each of the at least one attachment end of the secondary attachment into the receptacle in a substantially downwards motion, and locking each of the at least one the attachment end of the secondary attachment in the receptacle such that the secondary attachment cannot be moved with respect to the stroller.

In a further exemplary embodiment, the secondary attachment detaches from a stroller by unlocking at least one attachment end of the secondary attachment from its respective receptacle(s) located on the stroller and removing the secondary attachment from the stroller by lifting the at least one attachment end out of its respective receptacle(s) in a substantially upwards motion.

In a further exemplary embodiment, the secondary attachment may comprise a basket. The basket may have a first end having at least one attachment mechanism configured to attach to a first frame of a stroller, a second end may have at least one attachment mechanism configured to attach to a second frame of a stroller, a primary compartment, and at least one expandable compartment. Adjacent expandable compartments of the at least one expandable compartments are connected via at least one cable routing system and a common panel, and one of the at least one expandable compartment may be adjacent to the primary compartment. In an embodiment with an expandable stroller, the at least one expandable compartment is in a first expanded state when the expandable stroller is in an expanded state and the at least one expandable compartment is in a second non-expanded state when the expandable stroller is in a non-expanded state. In such an embodiment, each of the at least cable routing systems is configured to expand and retract the length of the expandable compartment.

BRIEF DESCRIPTION OF THE DRAWING

The invention may be understood by reference to the following description taken in conjunction with the accompanying drawings, in which, like reference numerals identify like elements, and in which.

DETAILED DESCRIPTION

Disclosed herein is a stroller with a secondary attachment structure. Although the secondary attachment may form any structure suitable for use with a stroller, the secondary attachment and mechanisms for attaching it to the stroller are discussed within the context of specific embodiments. In one embodiment the secondary attachment may comprise an infant car seat adapter. In another embodiment the secondary attachment comprises a basket. These embodiments are not intended to limit the invention or the claims, but instead to provide context and examples of the secondary attachment.

In general, the stroller system of the present disclosure comprises two generally mirror-imaged structural frames connected to each other by cross members. As the cross members may be placed in any suitable position to connect the opposing sides of the stroller, and since the structural frame members are generally mirror images, the discussion of the structure of the present disclosure will focus on a single frame, or side portion of the stroller. One skilled in the art will recognize that the description will apply equally to the mirrored frame, and the present disclosure is intended to apply equally to opposing frame members of the stroller.

Figure 1:
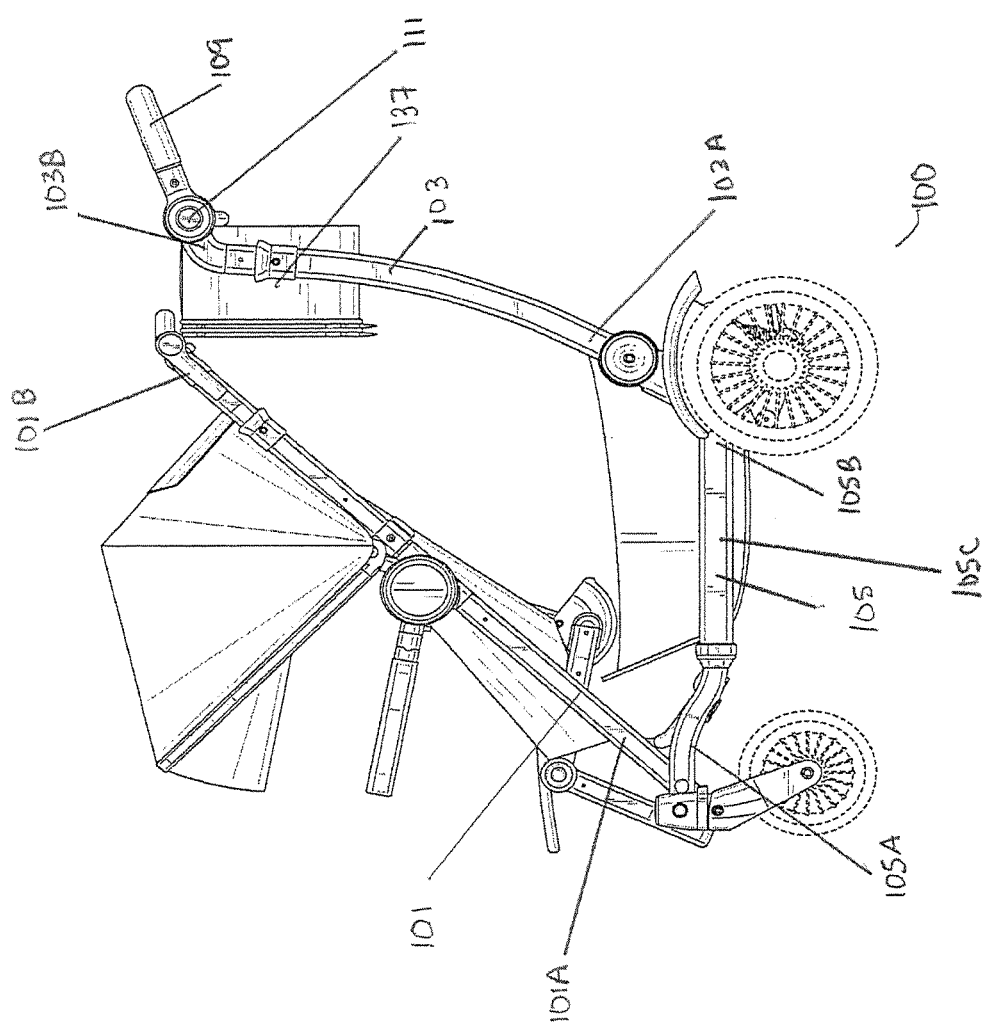
FIG. 1 illustrates a side view of a stroller with a secondary attachment.

As illustrated in FIG. 1, a stroller 100 has a base 105 having a first (front) end 105A, a second (rear) end 105B and an elongated portion 105C extending therebetween. A first (front) frame member 101 having a first lower end 101A and a second upper end 101B is connected to the base 105 proximate the first end 105A of the base 105. A generally elongated portion extends between the first lower end 101A and the second upper end 101B of the first front frame member 101. As will be discussed in more detail below, the second upper end 101B of the first front frame member 101 has at least one structural member configured to provide support for a secondary attachment. As depicted, in one embodiment the secondary attachment is a basket 137. A second rear frame member 103 having a first lower end 103A and a second upper end 103B is also connected to the base 105 proximate the second end 105B of the base 105. The second frame member 103 has a generally elongated portion which extends between the first lower end 103A and the second upper end 103B of the second rear frame member 103B. The second upper end 103B of the second rear frame member 103 has at least one structural member 111 also configured to provide support for the secondary attachment 137. A handle 109 may be attached to the second upper end 103B of the second rear frame member 103B.

Figure 2:
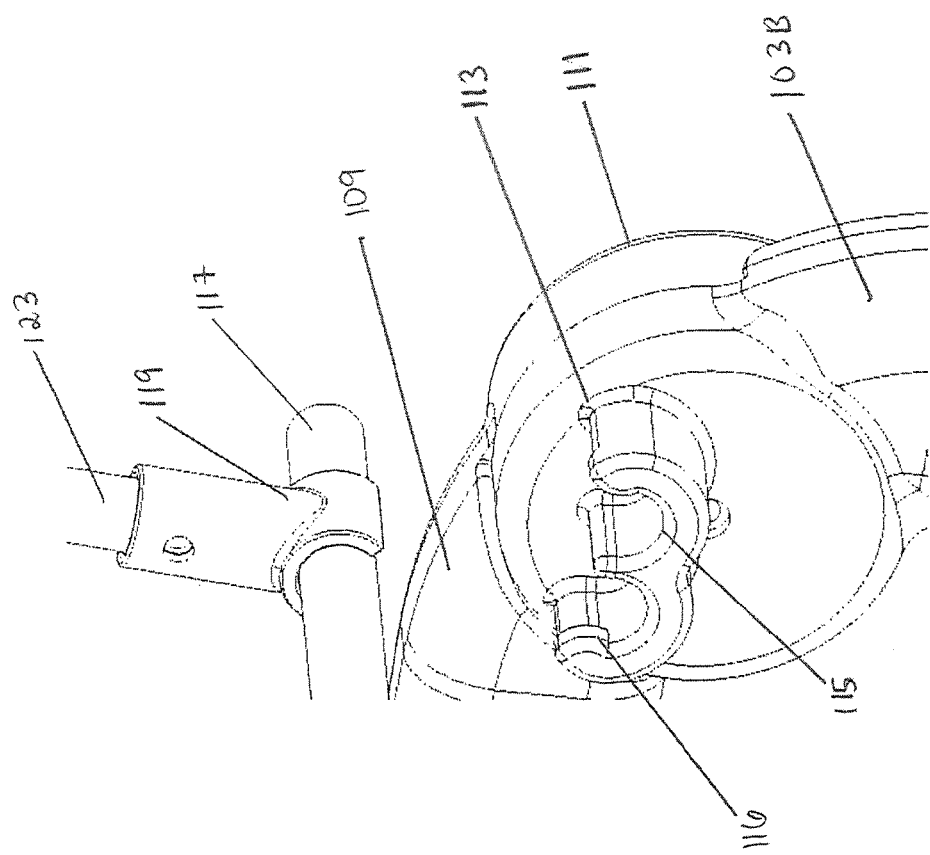
FIG. 2 illustrates a perspective view of a stroller with a secondary attachment.

FIG. 2 presents a side perspective view of the second portion 103B of the second frame member 103 taken from the interior of the stroller. FIG. 2 illustrates a structural member 111 adapted to receive a portion of a secondary attachment 123 located at the connection between the second upper end 103B of the second rear frame member 103 and handle 109. The structural member 111 has a receptacle unit 113 with two receptacles 115. Each receptacle 115 is capable of receiving at least one of the attachment ends 117 of the secondary attachment (which, in the embodiments shown is an infant car seat adapter) 123, and has an opening generally oriented towards the top surface of the receptacle 115. In one embodiment, the secondary attachment 123 may form a substantially rectangular frame. The perpendicular corners of the frame may be connected by a connector piece 119, with a protruding attachment end 117. Alternatively, the secondary attachment 123 may be of unitary construction or have some other configuration. In FIG. 2 the secondary attachment 123 is detached from the second rear frame member. The connector piece 119 may be configured to allow rotation of the perpendicular elements of the rectangular frame with respect to the other. The receptacles 115 are generally semi-circular in nature; however, each receptacle may have one or more rounded tabs 116 or other protrusions located proximate the open end of the semicircle to facilitate snapping of the attachment ends into the receptacle.

Figure 3:
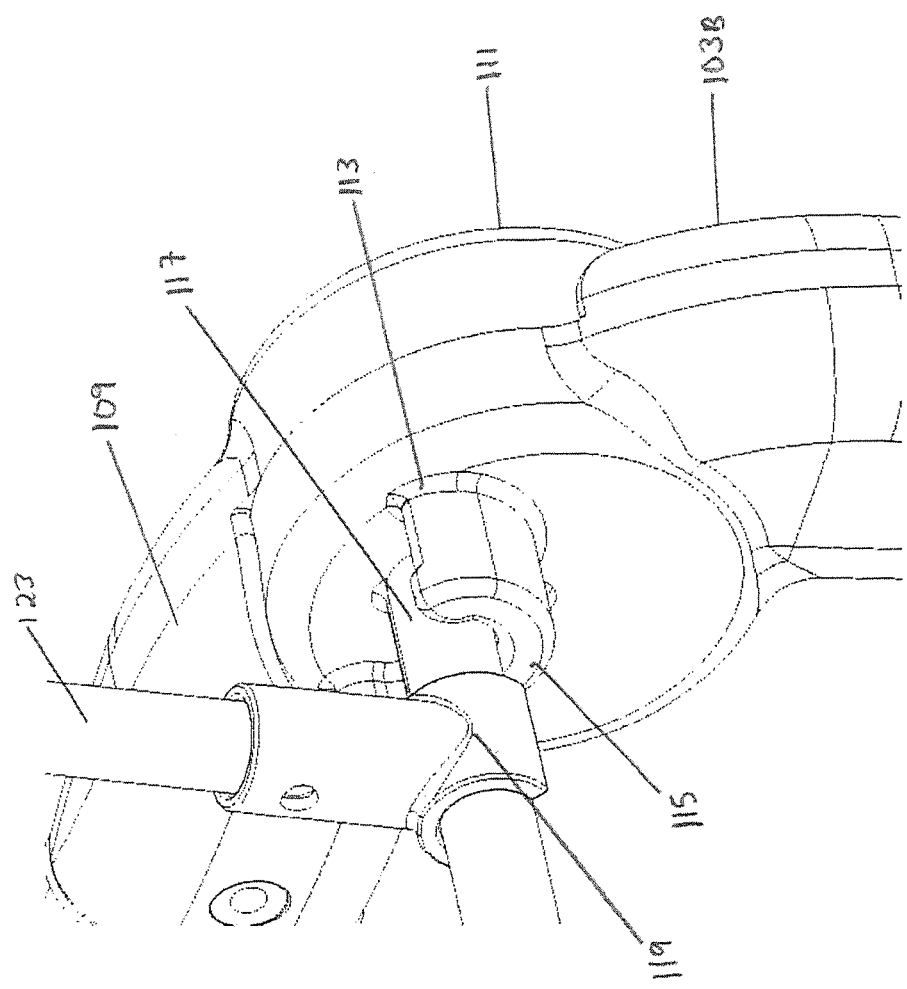
FIG. 3 illustrates a perspective view of a stroller with a secondary attachment.

FIG. 3 illustrates the secondary attachment 123 of FIG. 2, in a second configuration where the secondary attachment 123 is attached to the stroller, with the attachment ends 117 of the secondary attachment engaged with their respective receptacles 115. The attachment ends 117 may be substantially cylindrical in shape. In one embodiment, the attachment ends 117 may engage with their respective receptacles 115 and be held in place by a primary locking mechanism. The primary locking mechanism may include the rounded tabs 116, a spring loaded pin (not shown in FIG. 3) or some other locking means. In one embodiment, a one-step, two-handed method may be used to position and lock the secondary attachment 123 into the frame members. The secondary attachment 123 may be aligned with the openings of the receptacles 115 and it may lock into place once the secondary attachment is lowered into the receptacle 117. The secondary attachment 123 may be attached to the stroller using spring loaded pins which are biased to deploy, and are retracted by an actuator such that the attachment ends 117 can engage with the receptacles.

Figure 4:
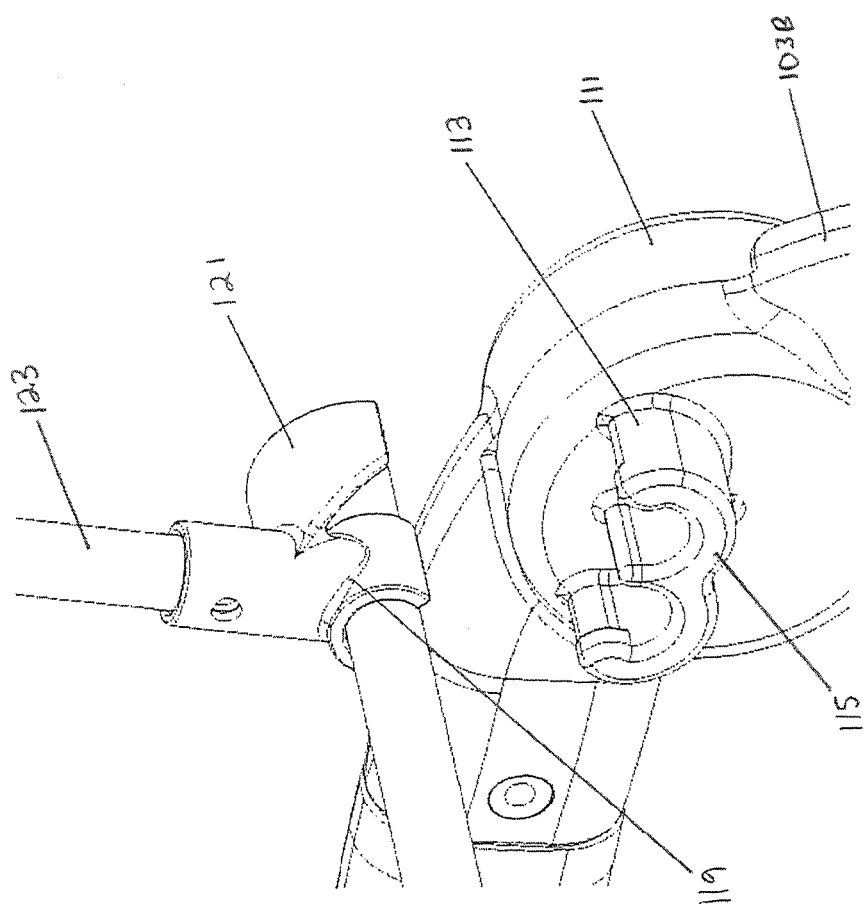
FIG. 4 illustrates a perspective view of a stroller with a secondary attachment.
Figure 5:
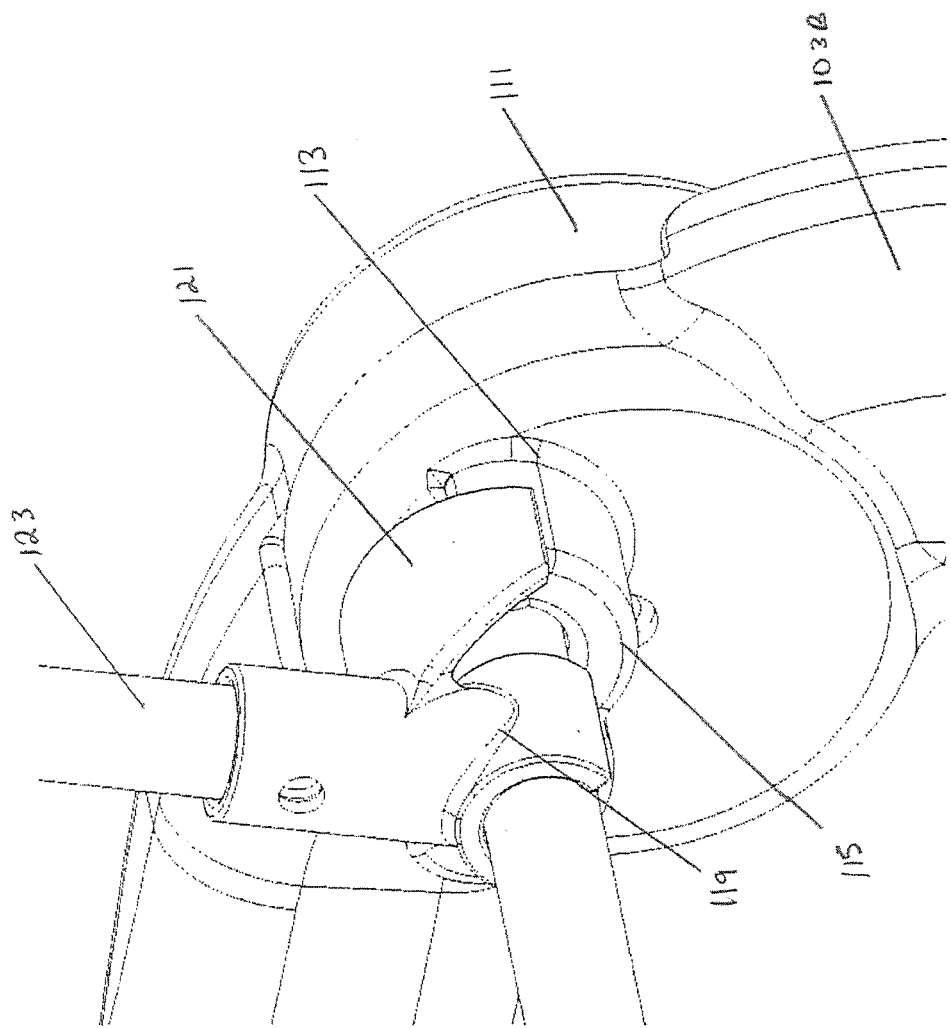
FIG. 5 illustrates a perspective view of a stroller with a secondary attachment.

FIG. 4 illustrates a secondary attachment 123 in a first position, disengaged from the stroller. The secondary attachment 123 of FIG. 4 has a secondary locking mechanism that includes a casing 121 attached to the secondary attachment 123. The casing 121 is positioned and shaped with a generally rounded shape to which facilitates rotation of the secondary attachment 123 about the opening or the receptacle 115 or the frame member, when the attachment end 117 is disposed in the receptacle, such that the casing 121 rotates about the receptacle 115, thereby locating the receptacle 115 at least partially between the attachment end 117 and the casing 121. As a result, the secondary attachment 123 can no longer be detached from the stroller by lifting it upwards. In one embodiment the casing 121 may be attached to the frame member, with other engaging protrusions located on the secondary attachment. FIG. 5 illustrates a secondary attachment 123 in a second position, engaged with the receptacle 117 buy prior to a rotating the secondary attachment to a position where the casing 121 prevents the secondary attachment 123 from being removed from the stroller.

Figure 6:
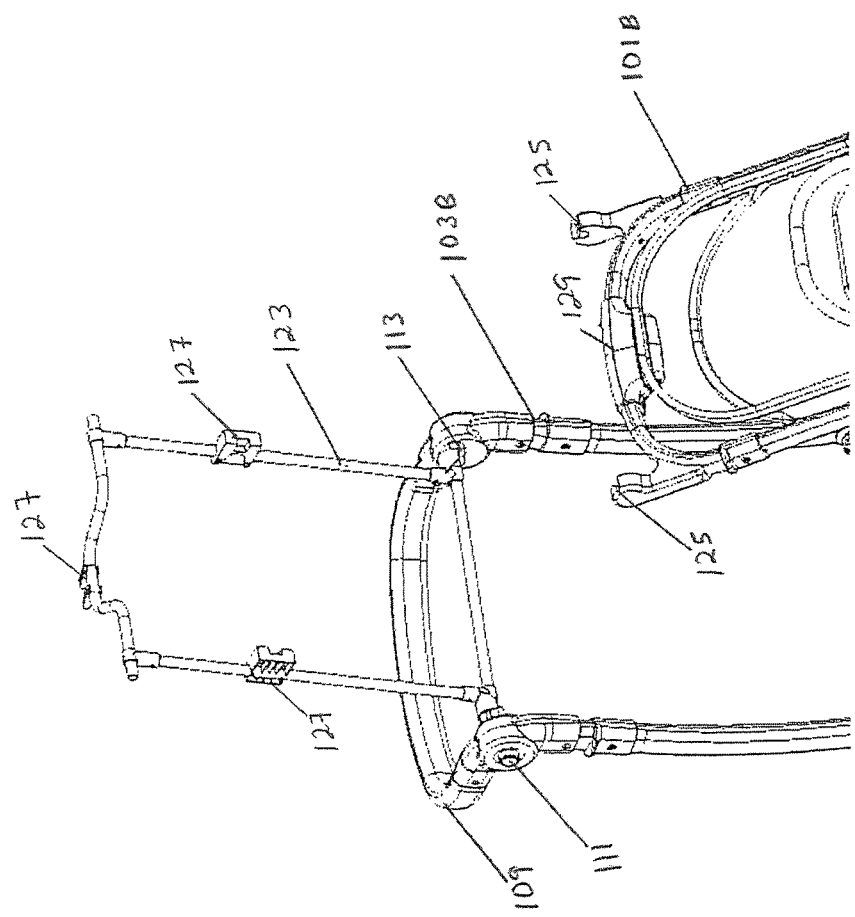
FIG. 6 illustrates a front side perspective view of a stroller with a secondary attachment.
Figure 7:
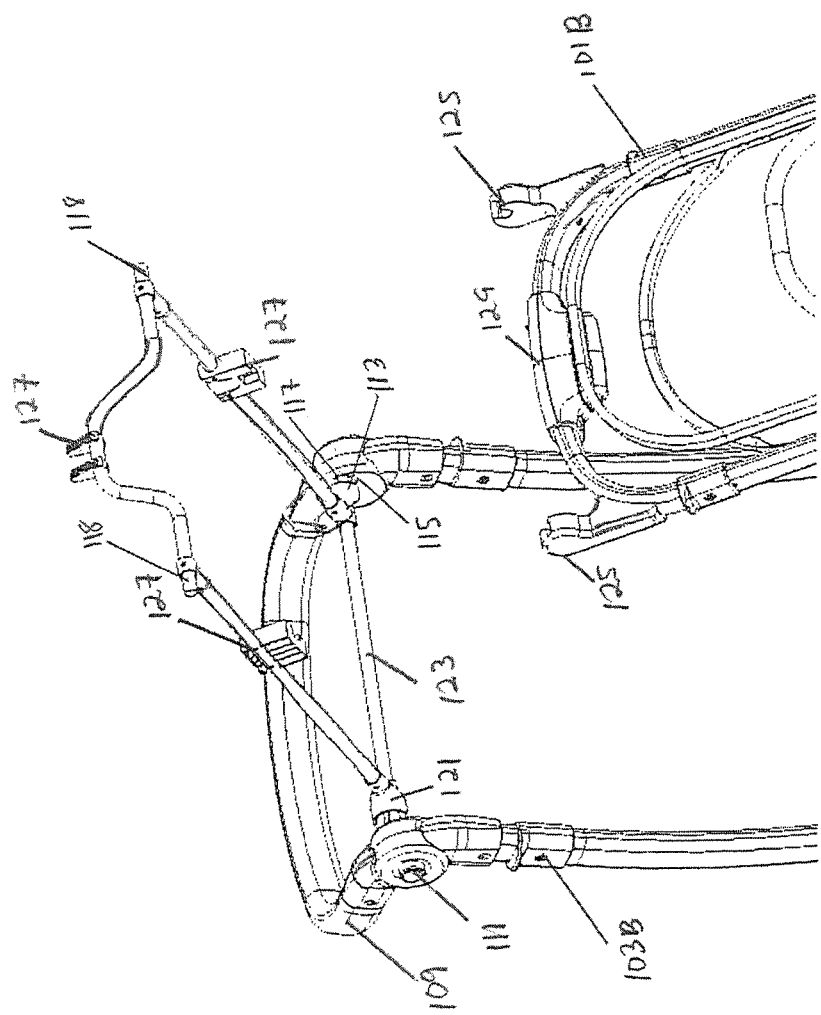
FIG. 7 illustrates a front side perspective view of a stroller with a secondary attachment.

FIG. 6 illustrates the secondary attachment 123 in a first position, similar to that of FIG. 5, where the secondary attachment 123 is attached to the stroller at the upper portion of the rear frame member 103B by placing the attachment end 117 in the receptacle 115. FIG. 7 illustrates the secondary attachment 123 with an exemplary infant car seat adapter in a second position where the secondary attachment 123 is rotated downwards about the attachment end 117 and receptacle 115, such that the attachment ends 118 may be aligned with the receptacles 125 on upper portion of the first frame member 101B.

Figure 8:
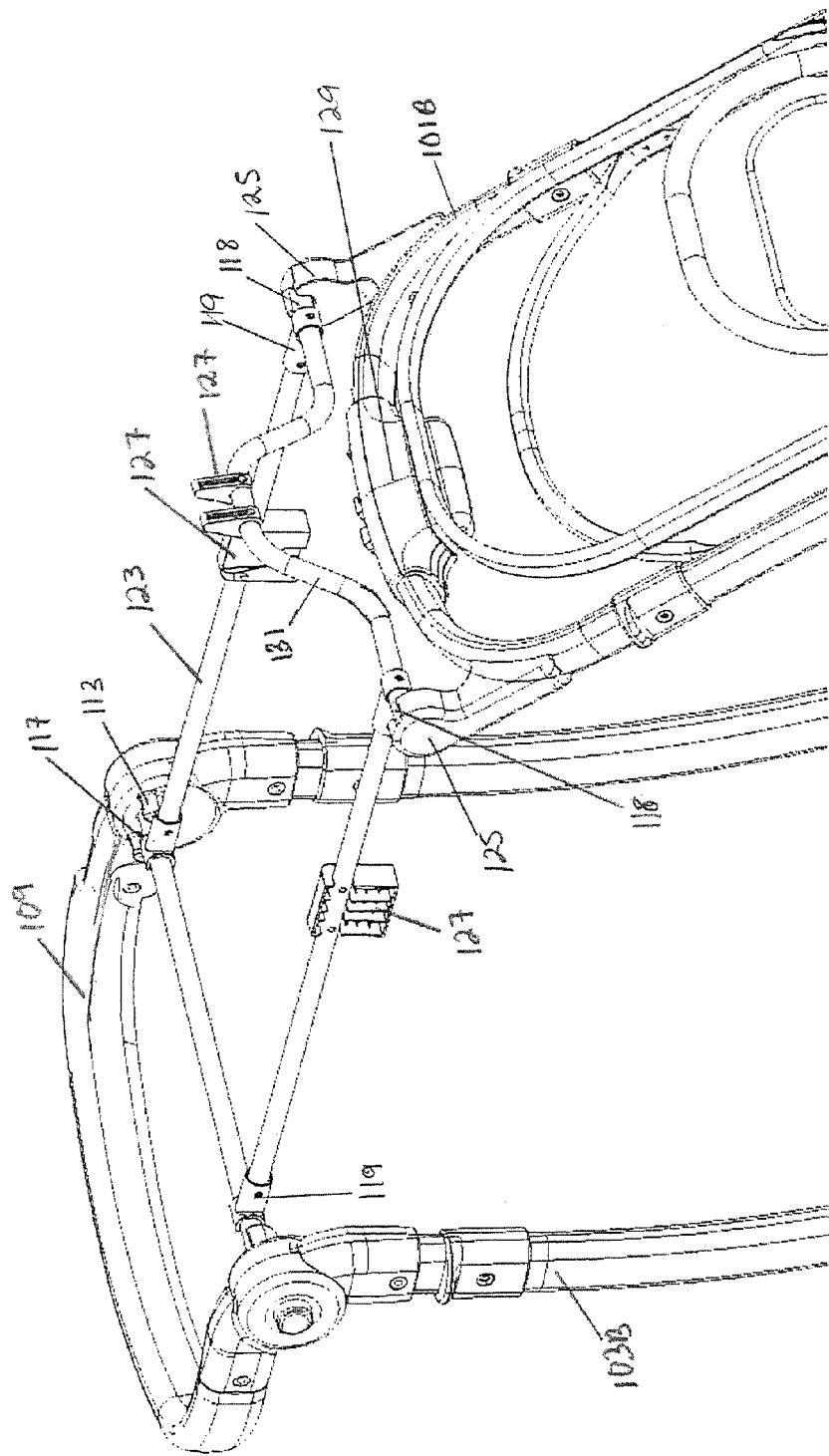
FIG. 8 illustrates a front side perspective view of a stroller with a secondary attachment.
Figure 9:
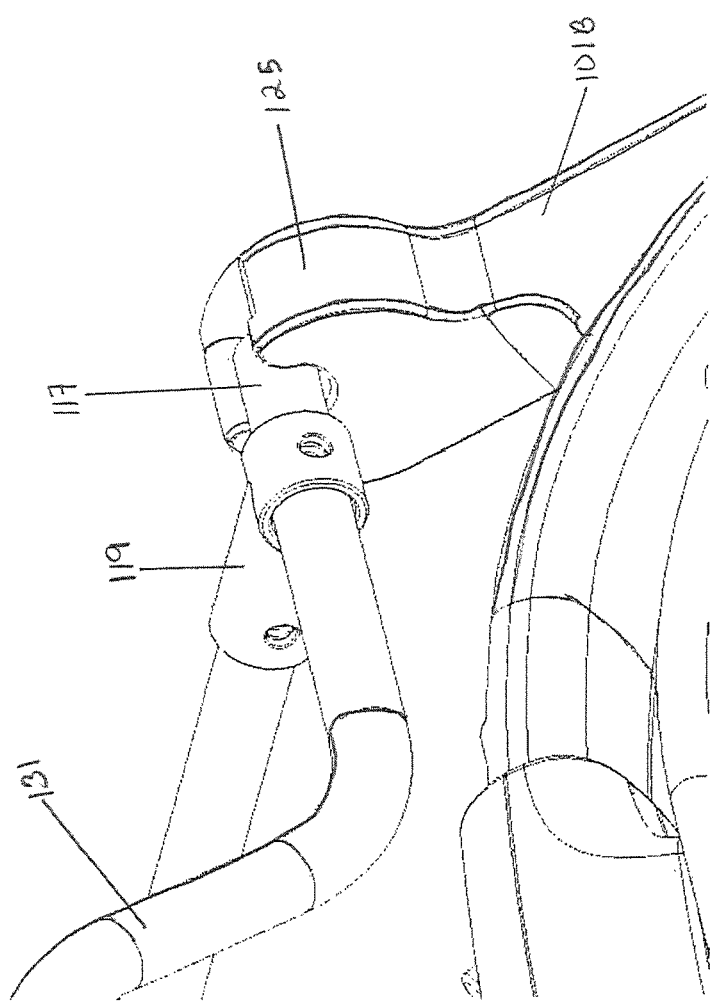
FIG. 9 illustrates a front side perspective view of a stroller with a secondary attachment.

FIG. 8 illustrates the secondary attachment 123 engaged with both the first front frame member 101B and the second rear frame member 103B. The secondary attachment 123 may have an infant car seat adapter further comprising at least one locking protrusion 127 configured to receive and engage with an infant car seat. The positioning of the locking protrusions 127 along the secondary attachment 123 may depend on the orientation and structure of the infant car seat intended for use with the secondary attachment. In one embodiment the locking protrusions 127 are biased to rotate upwards and towards the interior of the stroller to a position generally parallel to the frame of the secondary attachment 123 using spring-loaded pins or similar mechanisms. In a first position, when an infant car seat is not attached to the secondary attachment 123, the locking protrusions 127 may be generally parallel to the frame of the secondary attachment 123. When an infant car seat is attached to the secondary attachment 123, the locking protrusions 127 may be pushed in a generally downwards direction until they are generally perpendicular to the frame of the secondary attachment. Then the locking protrusions 127 may attach to one or more surfaces or attachment mechanisms of an infant car seat. In one embodiment, the secondary attachment 123 may have one or more sides with an elevated locking protrusion 131, the elevated locking protrusion may be configured to engage with the back of an infant car seat. FIG. 9 illustrates a closer view of the secondary attachment 123 engaged with the first front frame member 101B of the stroller, as discussed in regards to FIG. 8.

Figure 10:
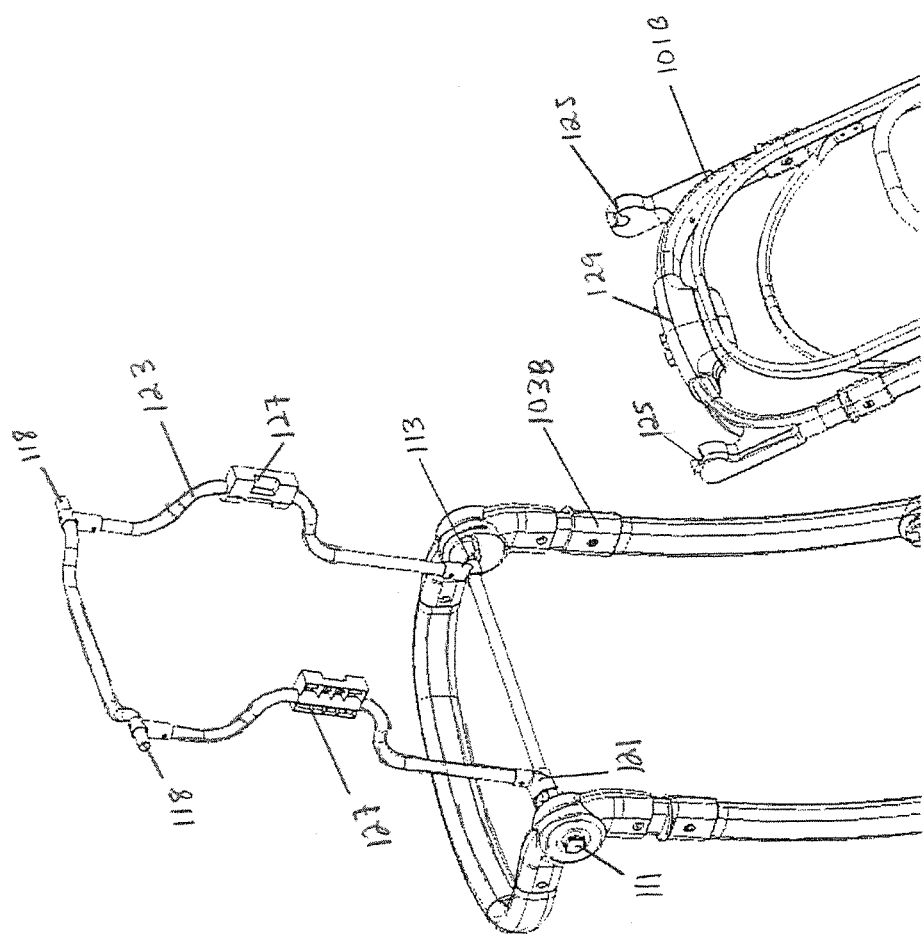
FIG. 10 illustrates a front side perspective view of a stroller with a secondary attachment.
Figure 11:
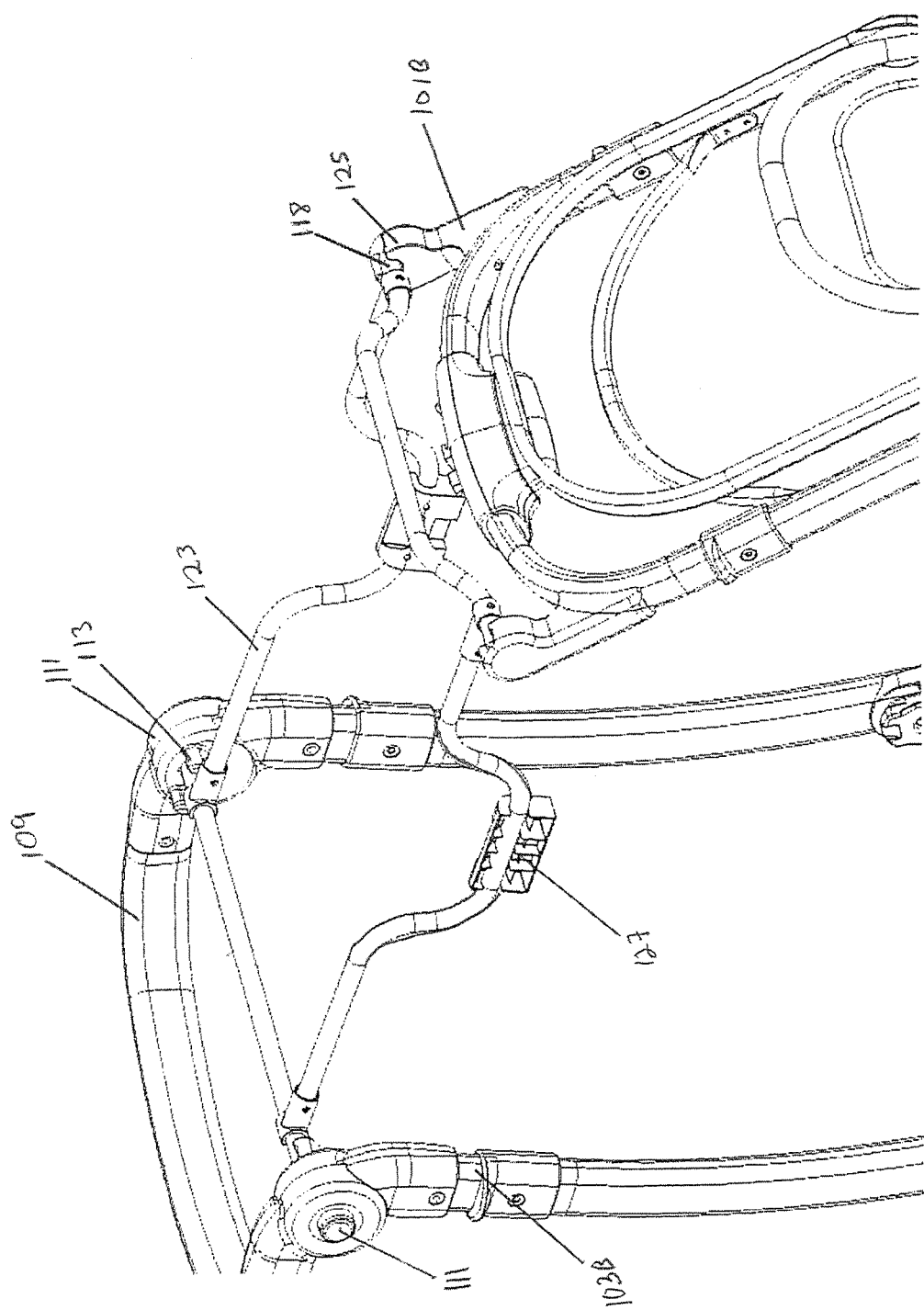
FIG. 11 illustrates a front side perspective view of a stroller with a secondary attachment.
Figure 12:
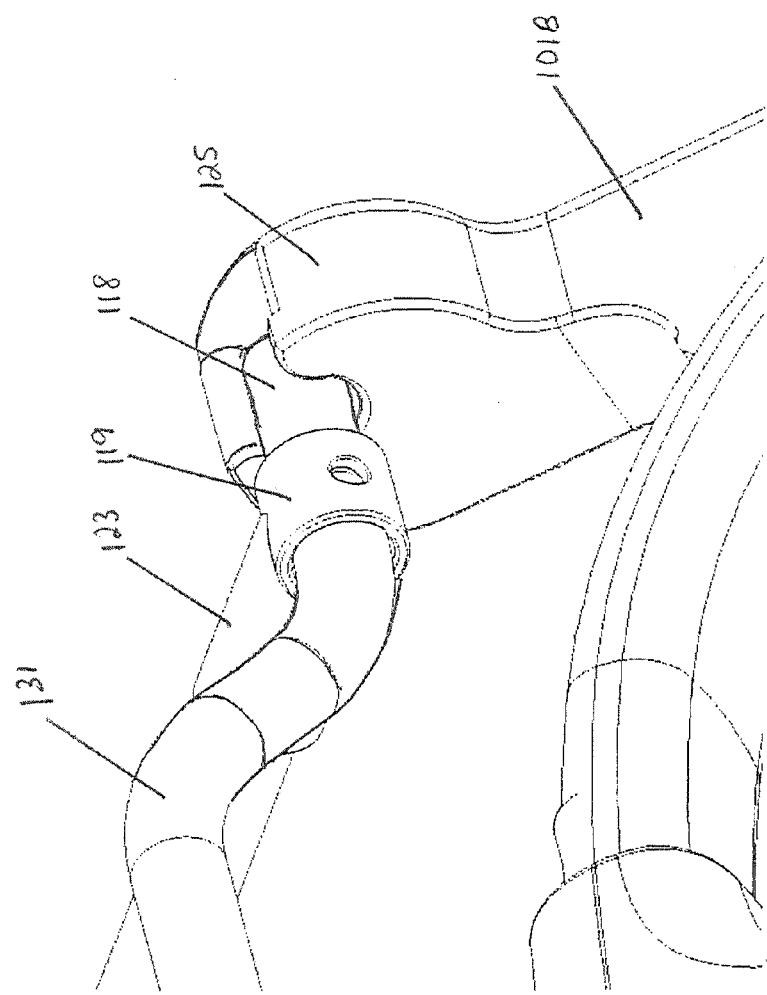
FIG. 12 illustrates a front side perspective view of a stroller with a secondary attachment.

An alternatively configured secondary attachment 123 is illustrated in FIG. 10. The secondary attachment 123 in FIG. 10 has two parallel portions with locking protrusions 127, and the parallel portions are specially shaped to receive a particular infant car seat. As depicted, the secondary attachment 123 may be custom configured in any number of configurations to conform with a particular infant car seat. Alternatively, the secondary attachment 123 may be configured to be compatible with multiple infant car seats. In one embodiment, the upper portion of the first front frame member 101B may have additional attachment adapters 129, such as receptacles, for securing the secondary attachment 123 or infant car seat to the first front frame member. FIG. 11 illustrates the secondary attachment 123 depicted in FIG. 10 engaged with both the first front frame member 101B and the second rear frame member 103B. FIG. 12 illustrates the secondary attachment 123 engaged with the first front frame member 101B of the stroller, as discussed in regards to FIG. 11.

Although a primary and secondary locking mechanism have been described above in view of a secondary attachment having an infant car seat adapter, it is envisioned that the primary and secondary locking mechanisms described above may also be used in connection with a basket and other secondary attachments for the stroller.

In one embodiment of the stroller, the first, front and second, rear frame members of the stroller may each have double receptacles. In such an embodiment, the secondary attachment (such as a basket) may be stowed in a closed position using the adjacent receptacles on either frame member. Additionally, the receptacles on the stroller may be interchangeable. Similarly, the attachment ends of the secondary attachment may be interchangeable. In such a configuration, the secondary attachment (such as an infant car seat adapter) may be attached in either a forward or reverse facing configuration.

Figure 13:
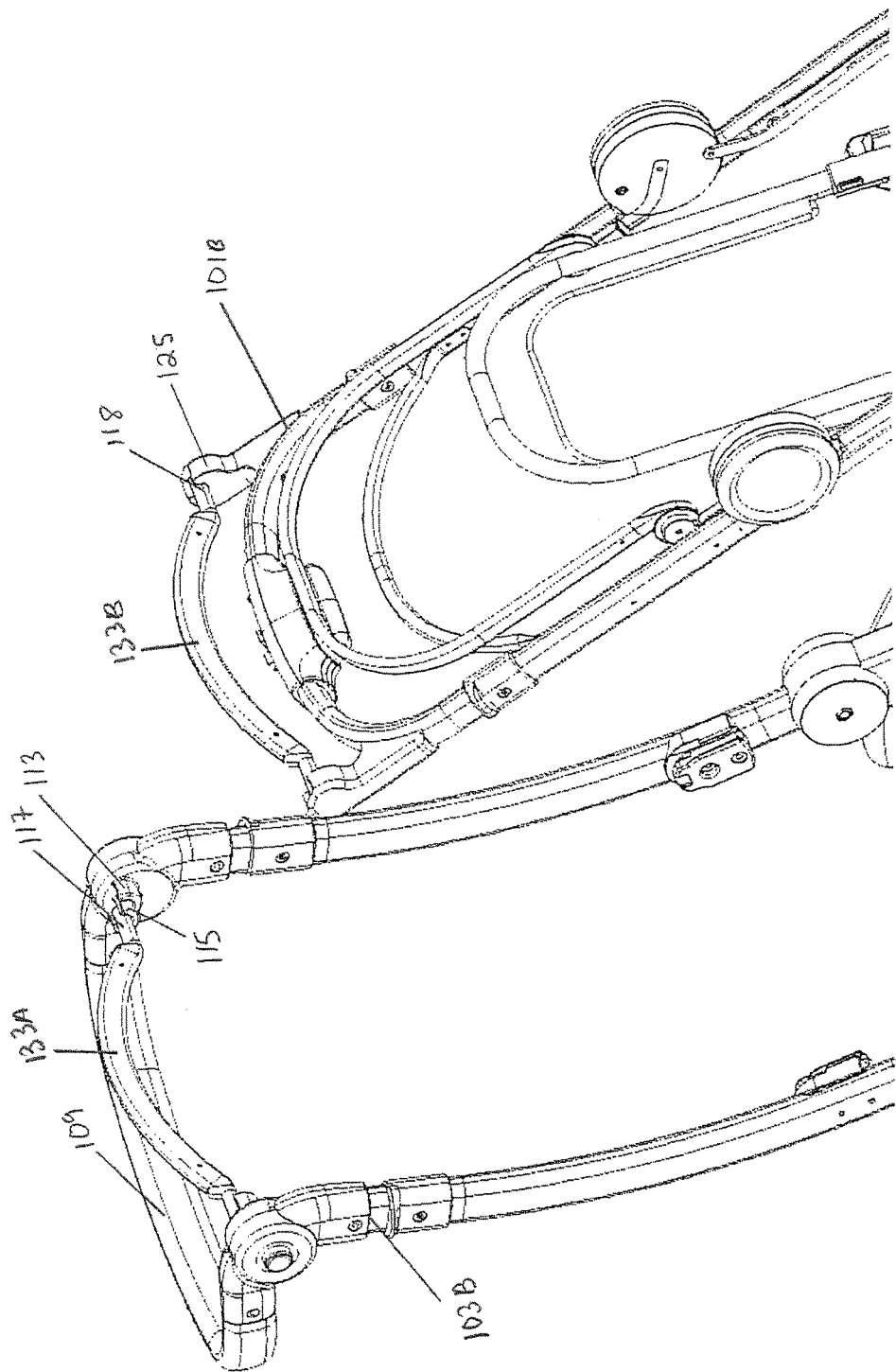
FIG. 13 illustrates a front side perspective view of a stroller with a secondary attachment.

FIG. 13 illustrates handle portions 133A and 133B of a secondary attachment, such as a basket (with soft portions of the basket not shown) having attachment ends 117, 118 engaged with receptacles 125, 125 present on the upper portion of the second frame member 101A and the upper portion of the first frame member 103A, respectively. Although the basket is not shown it is envisioned that the basket would extend between the rear handle 133A and the front handle 133B.

Figure 14:
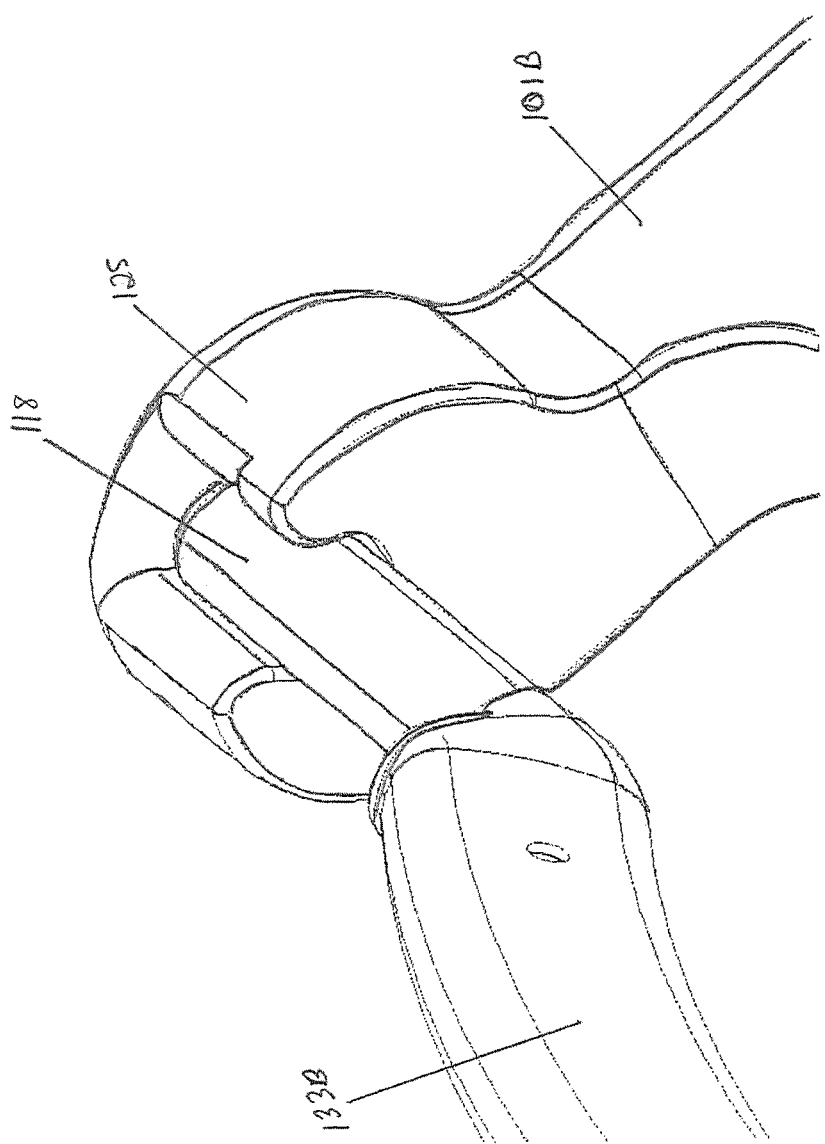
FIG. 14 illustrates a perspective view of a stroller with a secondary attachment.
Figure 15:
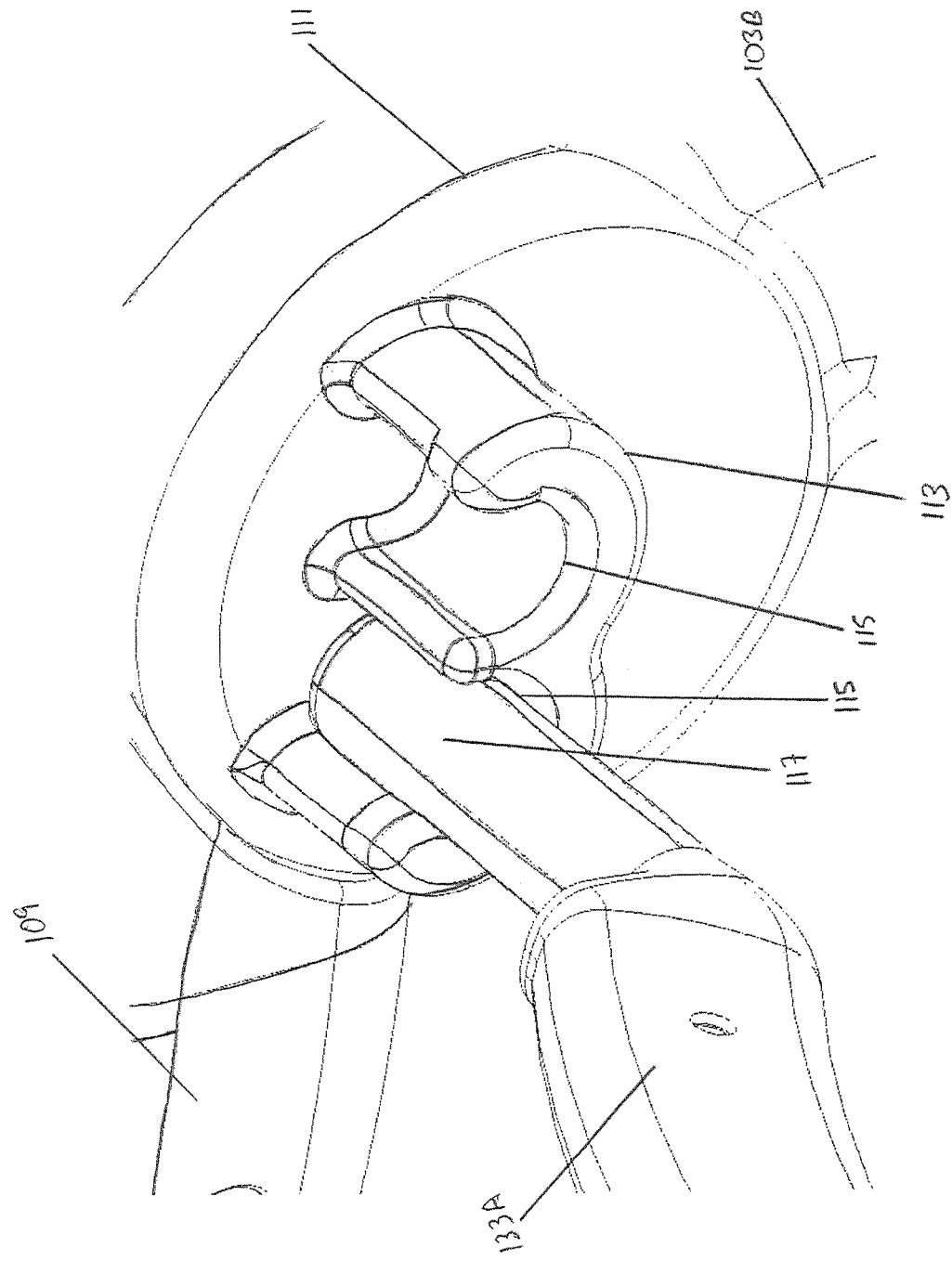
FIG. 15 illustrates a perspective view of a stroller with a secondary attachment.
Figure 16:
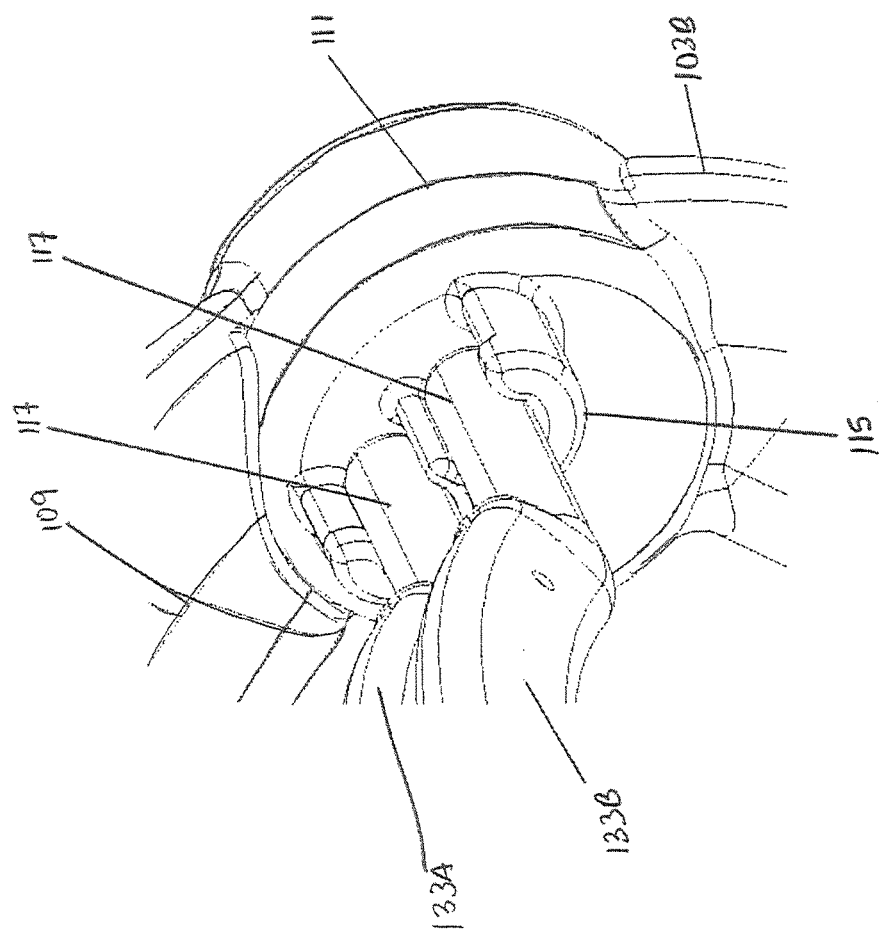
FIG. 16 illustrates a perspective view of a stroller with a secondary attachment.

FIG. 14 illustrates the engagement of the front handle 133B with the upper portion of the first front frame member 101B via the attachment ends 118 engaging with the receptacles 125. FIG. 15 illustrates the engagement of the rear handle 133A with the upper portion of the second rear frame member 103B via the attachment ends 117 engaging with the receptacle 115. As depicted the structural member 111 attached to the upper portion of the second rear frame member 103B may comprise a double receptacle structure 113 with two receptacles 115. In such an embodiment, the two handles of the secondary attachment, such as a basket, may be stored alongside each other (as depicted in FIG. 16), thus holding the secondary attachment in a stowed position.

Figure 17:
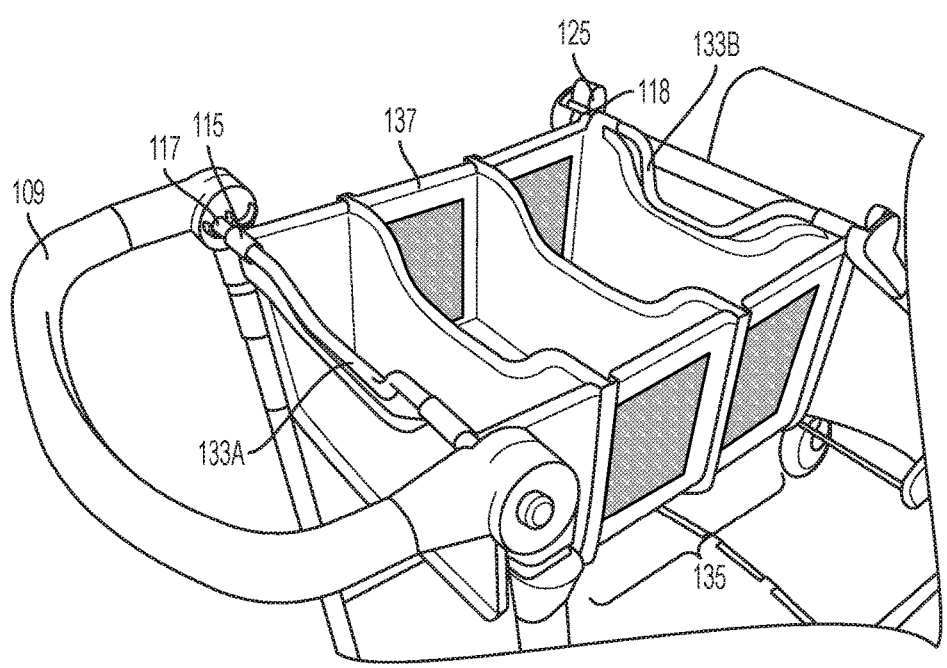
FIG. 17 illustrates a rear side perspective view of a stroller with a secondary attachment.

FIG. 17 illustrates a rear top perspective view of the stroller with a secondary attachment (basket). Illustrated are the attachment ends 117, 118, front receptacles 125 and rear receptacles 115, handles 133A and 133B, and the like. As illustrated the basket 137 may have one or more compartments 135.

Figure 18:
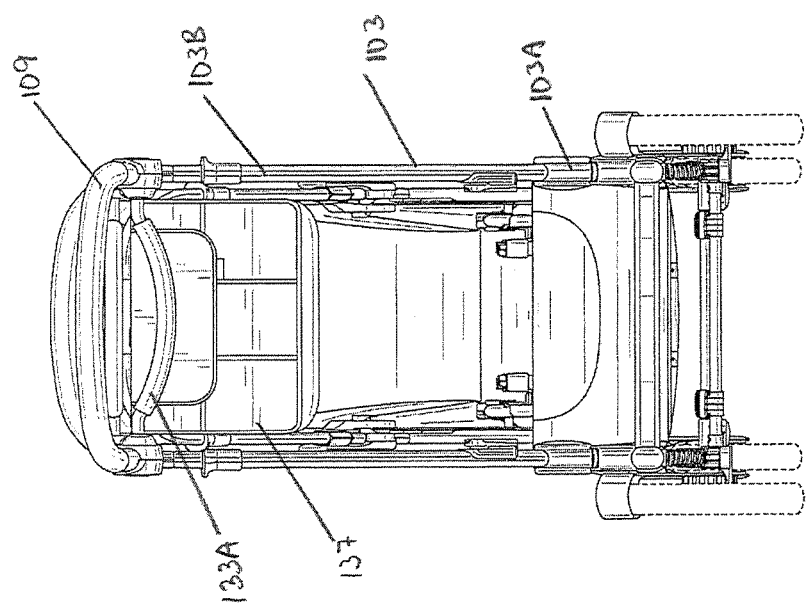
FIG. 18 illustrates a rear view of a stroller with a secondary attachment.
Figure 19:
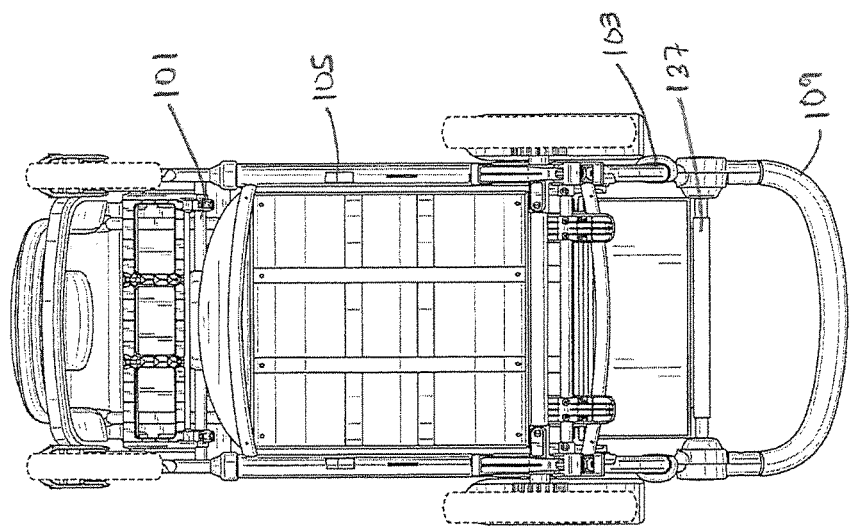
FIG. 19 illustrates a bottom view of a stroller with a secondary attachment.

FIG. 18 illustrates a rear view of a stroller with a secondary attachment 137. FIG. 19 illustrates a bottom view of the stroller with a secondary attachment 137.

Figure 20:
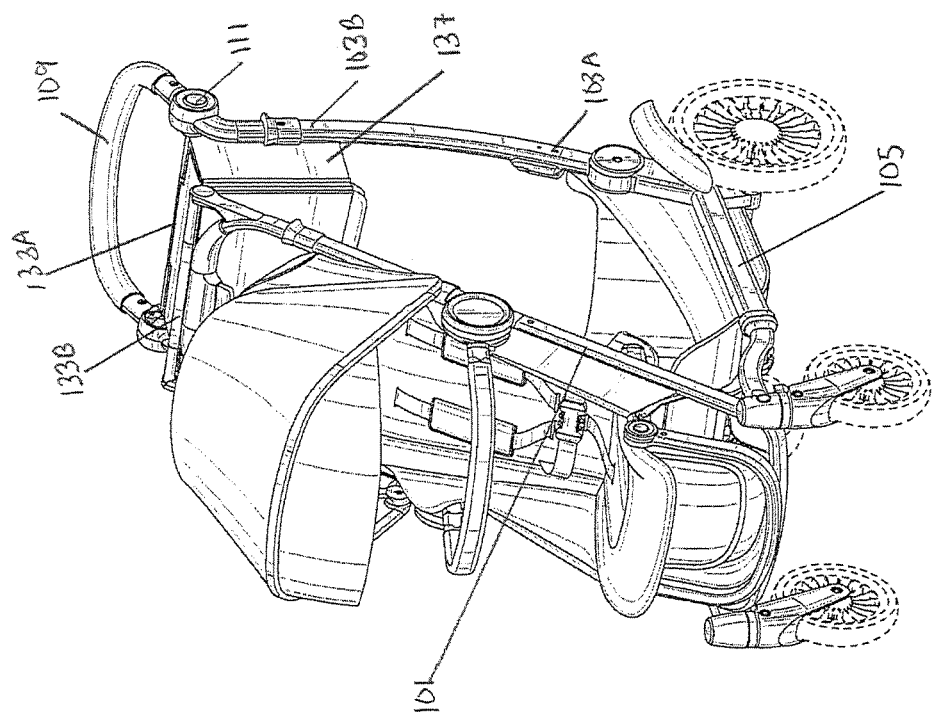
FIG. 20 illustrates a front side perspective view of a stroller with a secondary attachment.
Figure 21:
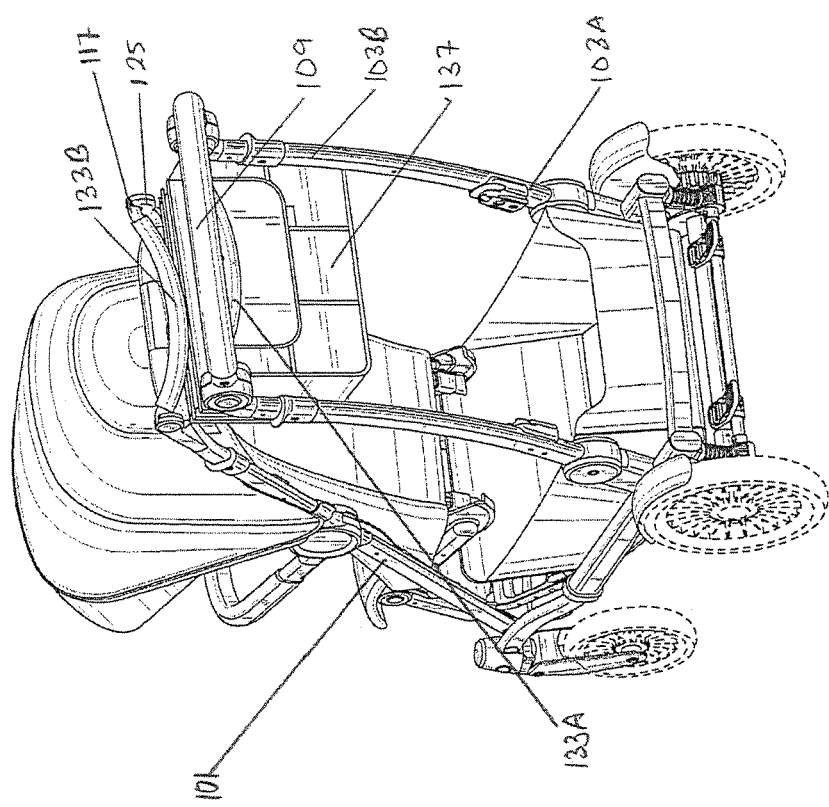
FIG. 21 illustrates a rear side perspective view of a stroller with a secondary attachment.
Figure 22:
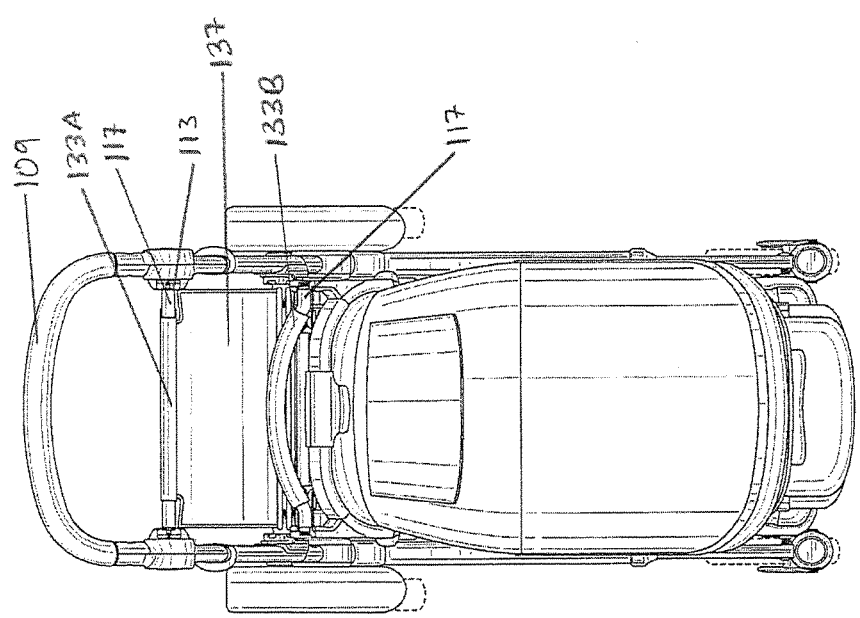
FIG. 22 illustrates a top plan view of a stroller with a secondary attachment.

FIG. 20 illustrates a front side perspective view of a stroller with a secondary attachment 137, such as a basket. In this view, the basket 137 is illustrated in a partially non-expanded state. FIG. 21 illustrates the rear side perspective view of a stroller with a secondary attachment 137 in correspondence with FIG. 20. FIG. 22 illustrates a top view of a stroller with a secondary attachment 137 in correspondence with FIG. 20.

Figure 23:
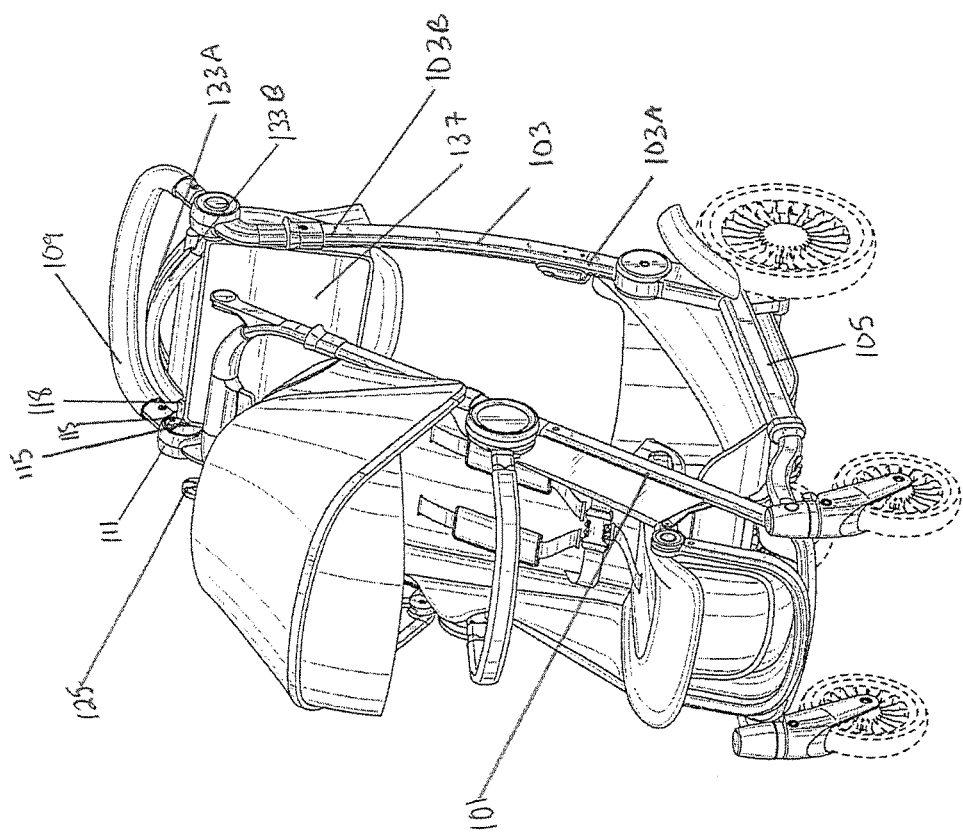
FIG. 23 illustrates a front side perspective view of a stroller with a secondary attachment.
Figure 24:
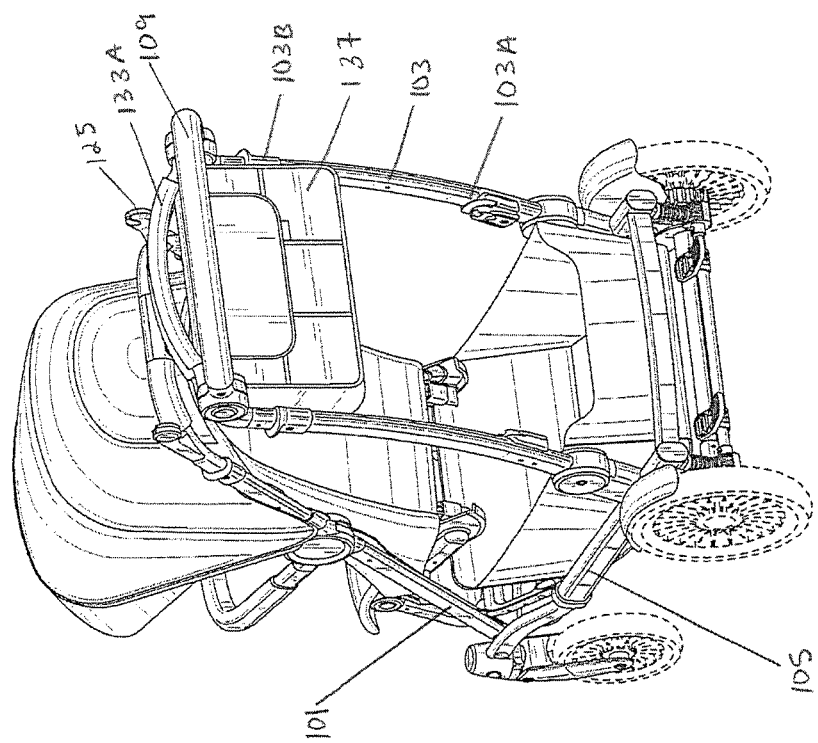
FIG. 24 illustrates a rear side perspective view of a stroller with a secondary attachment.

FIG. 23 illustrates a front side perspective view of a stroller with a secondary attachment (basket) 137, where the secondary attachment 137 is stowed on the second rear frame member 103. As depicted, the attachment ends 117 of both the front handle 133B and the rear handle 133A of the secondary attachment 137 are engaged with receptacles 115 on the upper portion of the second rear frame member 103B. As illustrated, in such a configuration, the receptacles 125 on the first frame member are not engaged with the secondary attachment 137. FIG. 24 illustrates a rear side perspective view of the stroller in the configuration discussed in regards to FIG. 23.

Figure 25:
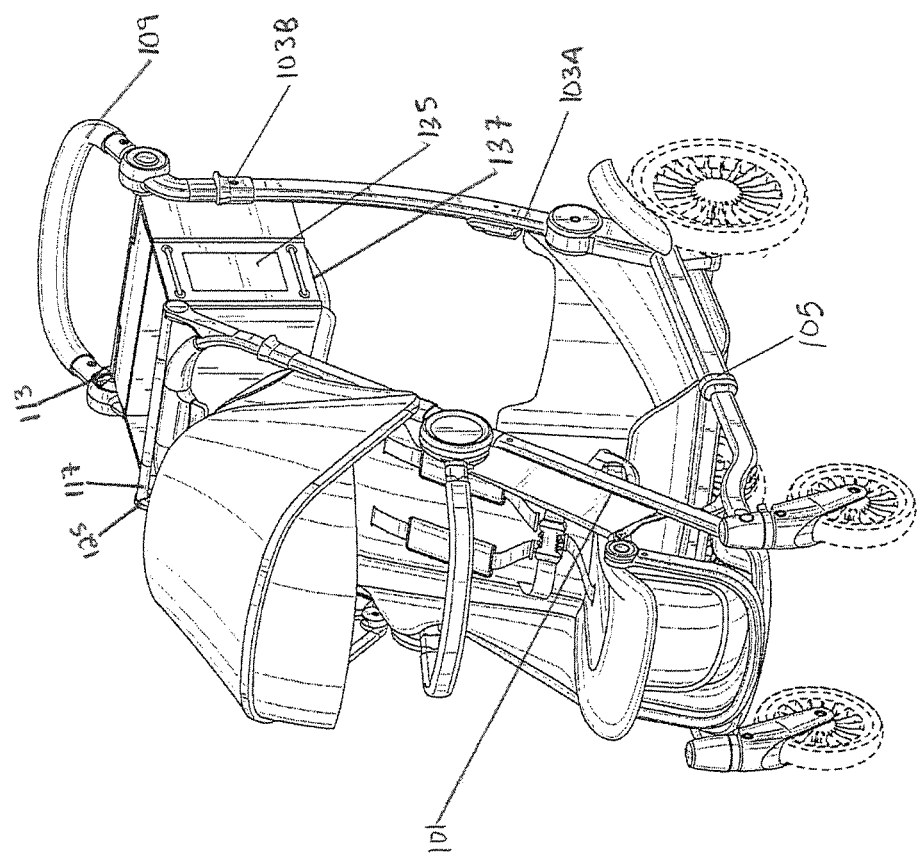
FIG. 25 illustrates a front side perspective view of a stroller with a secondary attachment.
Figure 26:
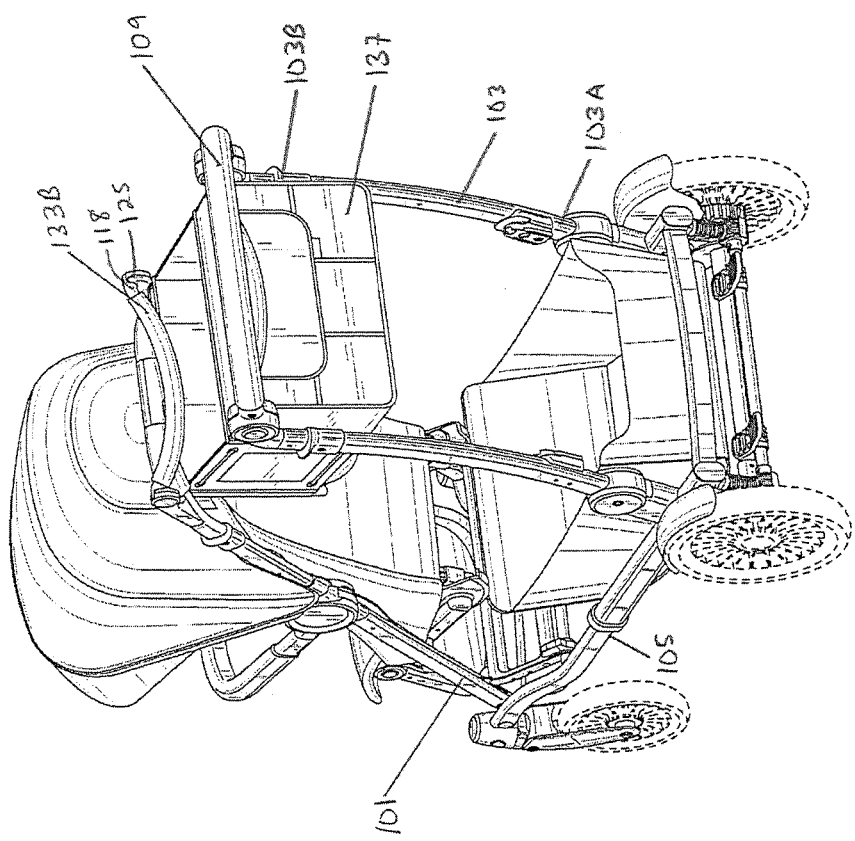
FIG. 26 illustrates a rear side perspective view of a stroller with a secondary attachment (basket).
Figure 27:
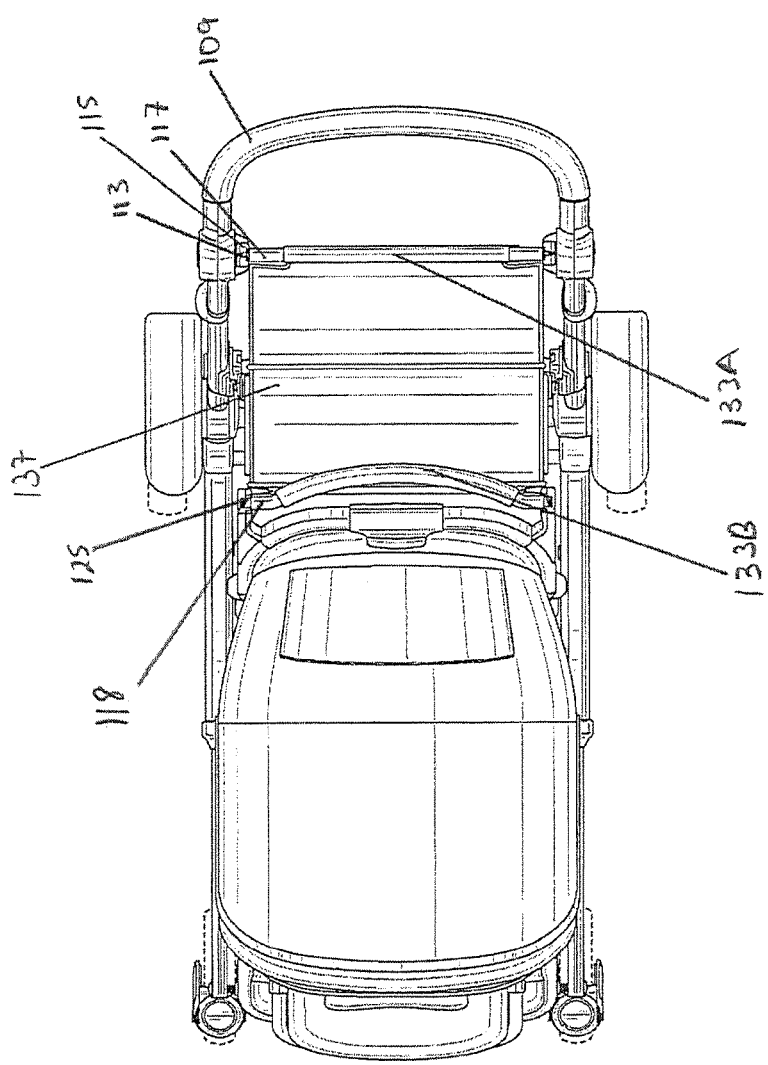
FIG. 27 illustrates a top plan view of a stroller with a secondary attachment.

In one embodiment, the base 105 of the stroller may be expandable. In such an embodiment the secondary attachment 137 may be expandable/contractible in accordance with the configuration of the base 105. Such an embodiment is depicted in FIG. 25. FIG. 25 illustrates a front side perspective view of a stroller with a secondary attachment 137, where the base 105 is expanded to a partially-expanded state. The secondary attachment 137 is also expanded in accordance with the configuration of the base 105. In one embodiment, one or more compartments 135, such as basket compartments, of the secondary attachment 137 may become expanded and thereby available for use by the user as the secondary attachment 137 is expanded. FIG. 26 illustrates a rear side perspective view of a stroller with a secondary attachment 137 in correspondence with the partially-expanded state depicted in FIG. 25. FIG. 27 illustrates a top view of a stroller with a secondary attachment 137 in correspondence with the partially-expanded state depicted in FIG. 25.

Figure 28:
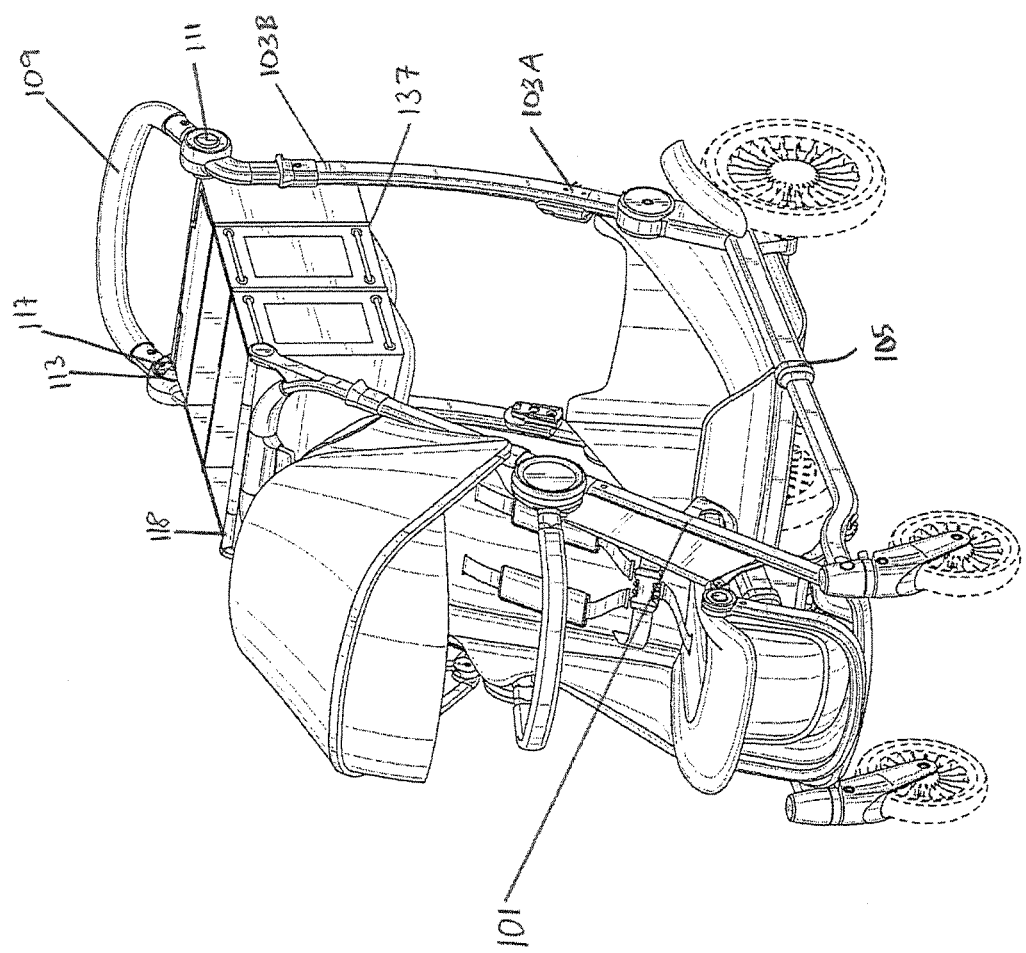
FIG. 28 illustrates a front side perspective view of a stroller with a secondary attachment.
Figure 29:
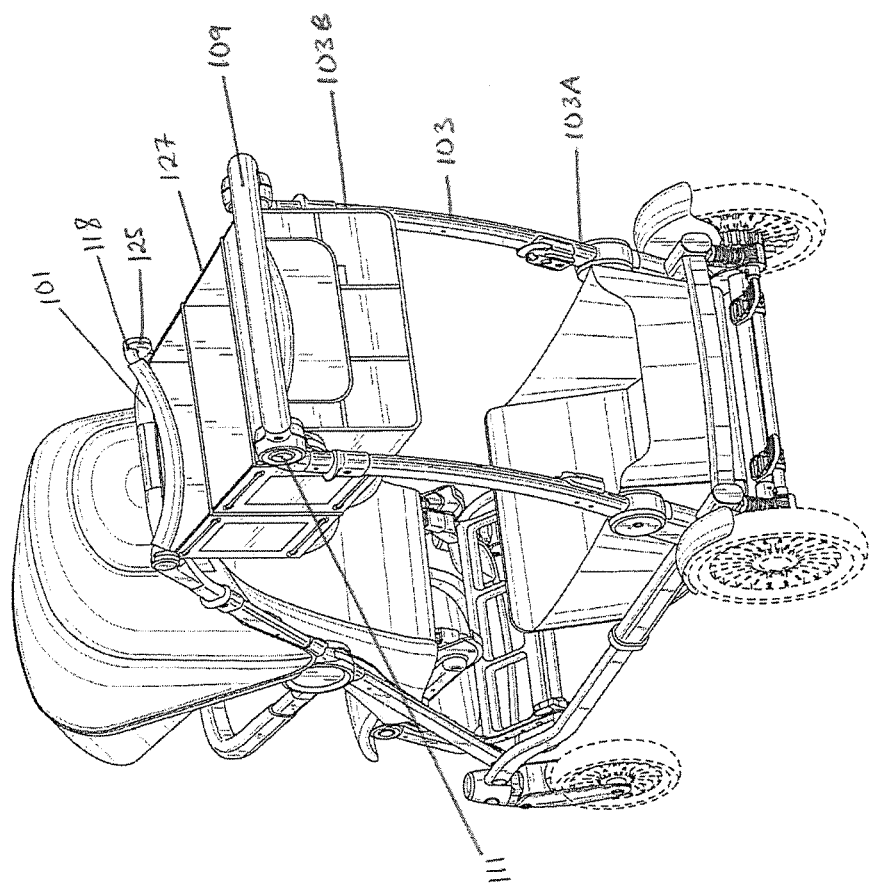
FIG. 29 illustrates a rear side perspective view of a stroller with a secondary attachment.
Figure 30:
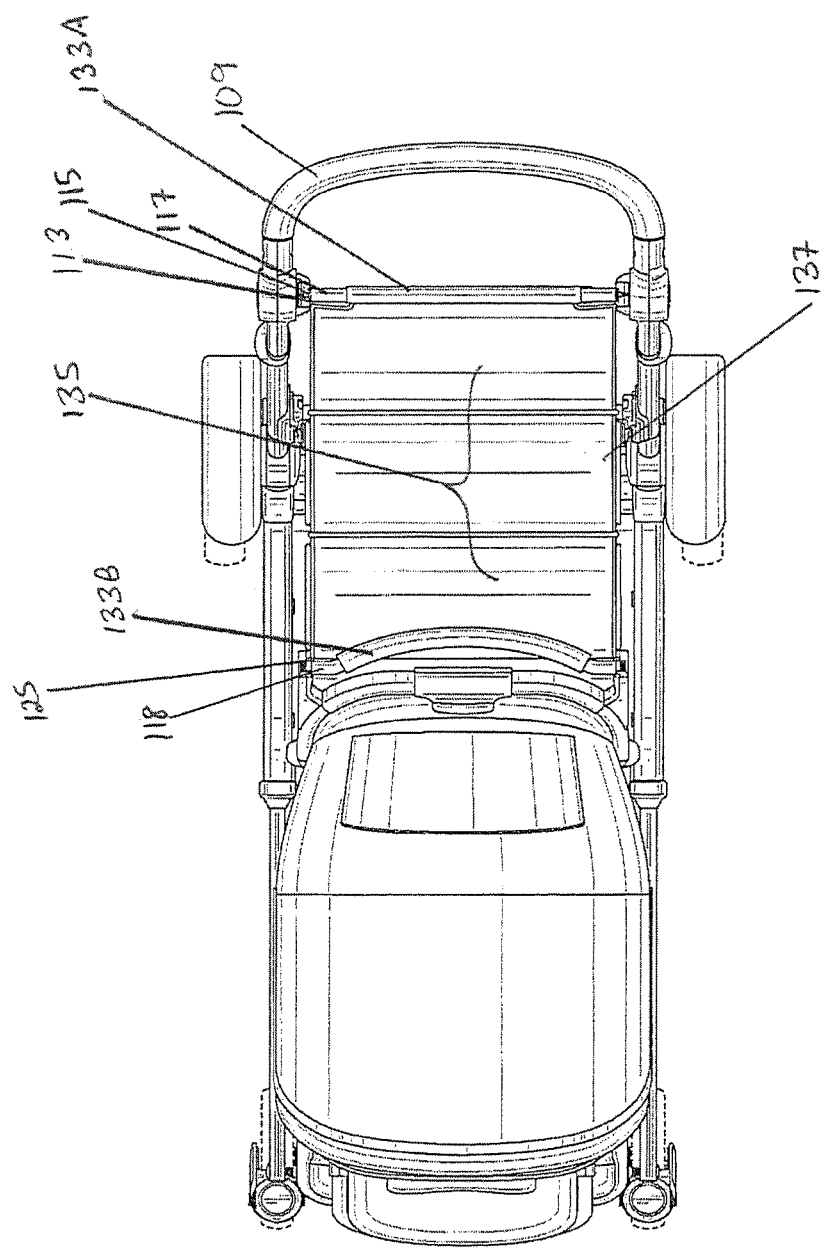
FIG. 30 illustrates a top view of a stroller with a secondary attachment.

A fully expanded base 105 and fully expanded secondary attachment (basket) 137 is illustrated in a front side perspective view (FIG. 28), rear side perspective view (FIG. 29) and top view (FIG. 30).

The secondary attachment may comprise additional supports positioned between the first and second ends of the secondary attachment. Although the basket example 137 is depicted herein with soft supports between the front and rear end 133A, 133B, the secondary attachment 137 may include rigid or semi rigid members as well. These additional supports may be configured to provide attachment points for a basket 137 such that the basket 137 may grow with the expandable stroller base 105. Additionally, the additional support members may be modular in nature and added to the secondary attachment such that the secondary attachment may adjust with the varying distance between the first, front and second, rear frame members of the stroller. In an embodiment of the stroller with a basket secondary attachment, adjustable interior panels may be utilized to create taut and usable states of the basket at different interval lengths. These interior panels may use cords, zippers, snaps and the like in order to create various basket sizes.

Additional attachment mechanisms may be located along the first and second frame members in order to store the secondary attachment 137 when it is not in use or provide additional support to the secondary attachment when it is in use. For example, a secondary attachment comprising a basket may include a deep basket which can attach to both the upper handles or receptacles of the stroller and the lower frame members (including the front seat, seat support, seat recline, rear frame, etc.) using hooks, loops, snaps, Velcro, and the like. Additionally, the secondary attachment may comprise size-reducing elements. For example, magnets can be placed at the outer seams of the basket such that the basket is stowed is a substantially compact state. The secondary attachment comprising the basket may also include divided compartments. The basket may be divided using, for example, plastic panels located at intermediate locations. The divided compartments may aid in distributing the load move evenly across the first and second frame members of the stroller.

Figure 31:
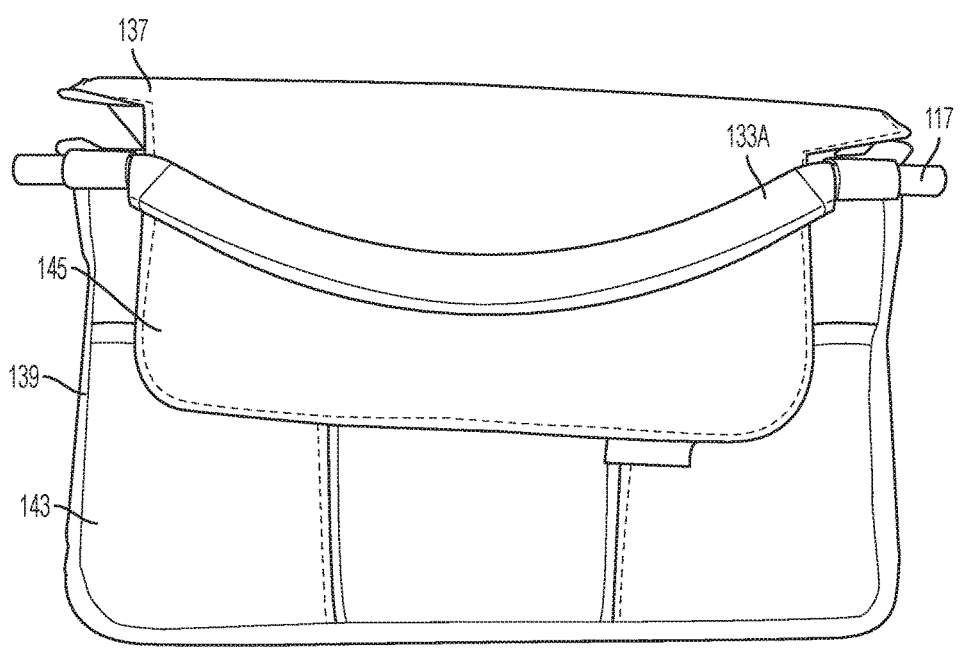
FIG. 31 illustrates a front view of a basket.

An exemplary embodiment of the secondary attachment, in the form of a basket, is illustrated in FIGS. 31-44. FIG. 31 illustrates a front view of a basket 137. As depicted in FIG. 31, a primary compartment 139 is located at a first end 141 of the basket 137. The primary compartment 139 may be constituted of fabric panels defining a void of generally fixed length and width. In an alternative embodiment, the primary compartment 139 may be expandable or collapsible in a manner similar to the other compartments discussed below. The exterior of the primary compartment 139 comprises one or more exterior compartments 143 configured to hold goods such as keys, cellphones, wallets, credit cards, pacifiers, washcloths, and the like. The exterior compartments 143 may be netted, padded, transparent and/or opaque. The primary compartment 139 is covered with a first flap 145 configured to cover the top opening of the primary compartment 139. In one embodiment, the first flap 145 may be magnetically attached to the exterior compartments 143. Optionally, the magnetic components may be contained within the one or more fabric layers of the flap and/or exterior compartments. Alternatively, the flap 145 may attach to the exterior compartments 143 by a zipper, button, clasp, or alternative attachment means. The first end 141 of the basket 137 also comprises a handle 133A with laterally spaced attachment ends 117 configured to attach to a frame of a stroller. In one embodiment the attachment ends 117 are substantially cylindrical and configured to be placed within one or more receptacles 125, 113 located on an expandable stroller. Additionally, rotation of the handle 133A may cause rotation in the attachment ends 117.

Figure 32:
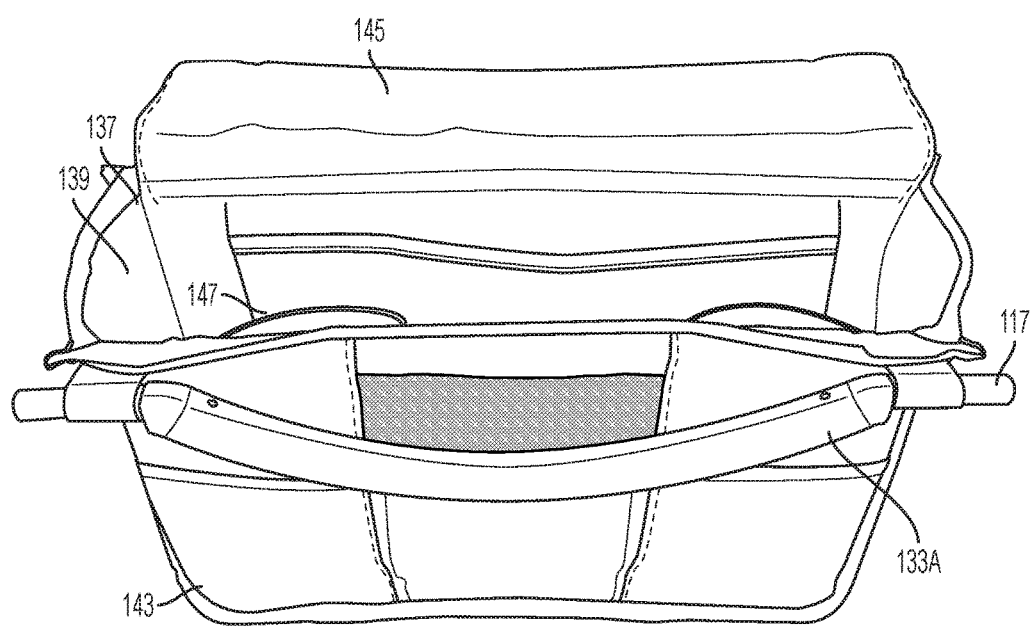
FIG. 32 illustrates a front top perspective view of the basket of FIG. 31 with an open flap.
Figure 33:
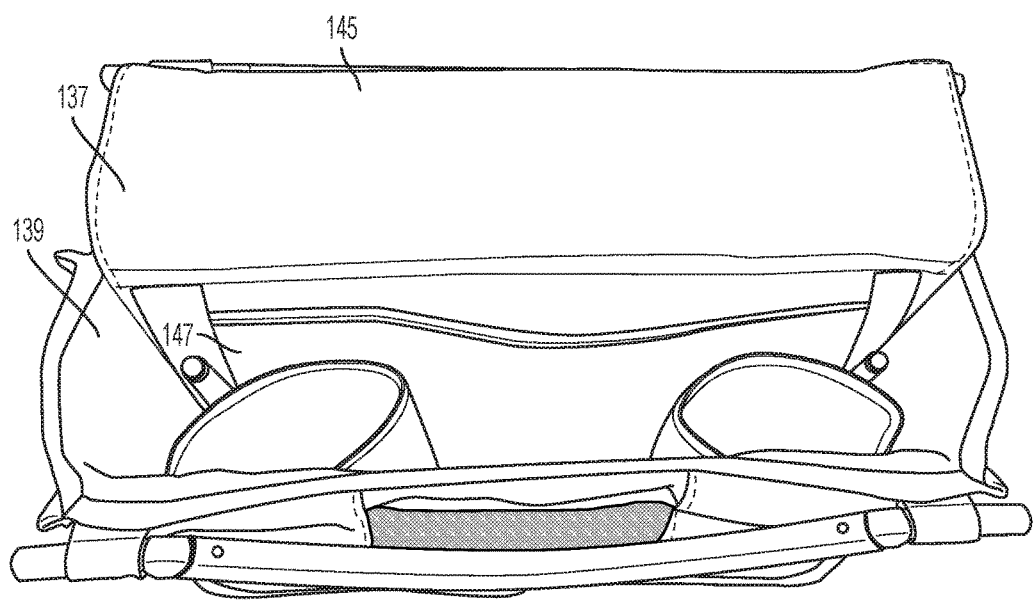
FIG. 33 illustrates a top view of the basket of FIG. 31 with the open flap.

FIG. 32 illustrates a front top perspective view of the basket 137 with an open flap 145. As depicted in FIG. 32, the interior of the primary compartment 139 comprises one or more interior compartments 147 configured as beverage cup holders, bottle holders, folder holders, silicone compartments, mesh/netted compartments and the like. In FIG. 33 a top view of the basket 137 with an open flap 145 is provided such that the interior of the primary compartment 139 including the interior compartments 147 is visible.

Figure 34:
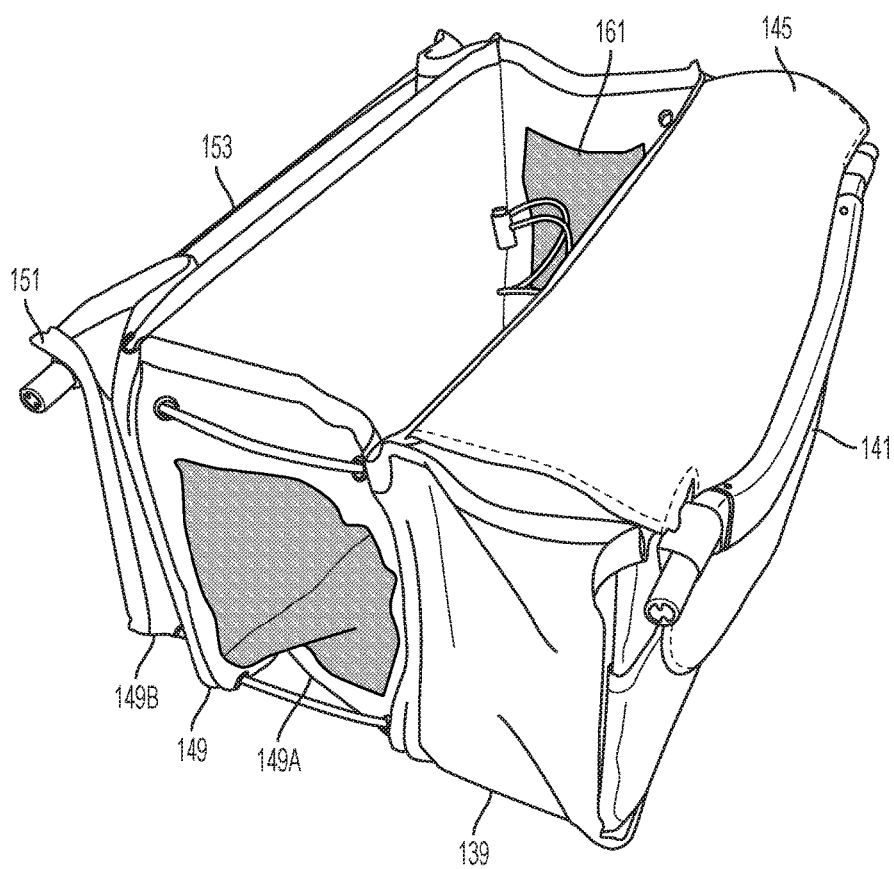
FIG. 34 illustrates a side perspective view of the basket of FIG. 31 with a closed flap in a partially expanded state.

FIG. 34 illustrates a side perspective view of the basket 137 with the closed flap 145 in a partially-expanded state. As depicted in FIG. 34 the basket 137 comprises the primary compartment 139 and one or more expandable compartments 149. The expandable compartments 149 may be of generally fixed width and expandable length, such that the distance between the first end 141 and second end 151 of the basket varies with the expansion/retraction of the expandable compartments 149. The basket 137 may be partially expanded when at least one of the one or more expandable compartments 149 are partially or fully expanded. As depicted in FIG. 34 the expandable compartment 149A is expanded. Alternatively, expandable 149B may be expanded. Either of these configurations may correspond to a stroller in a partially expanded state. The expandable compartments 149 may be located adjacent to each other such that the adjacent expandable compartments 149 share a common panel 153. In one embodiment the panel 153 comprises double layer fabric covering an inflexible solid structure.

Figure 35:
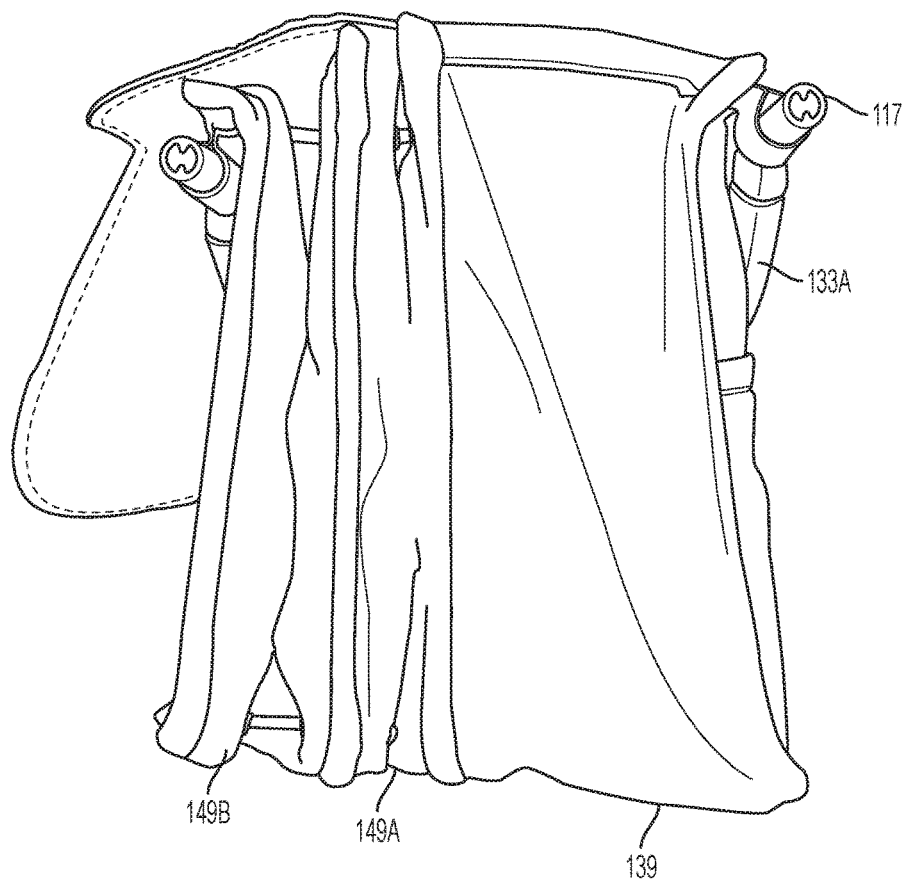
FIG. 35 illustrates a side view of the basket of FIG. 31 with the open flap in the non-expanded state.

FIG. 35 illustrates a side view of the basket 137 with the open flap in the non-expanded state. Note that the expandable compartments 149 fold substantially inwards.

Figure 36:
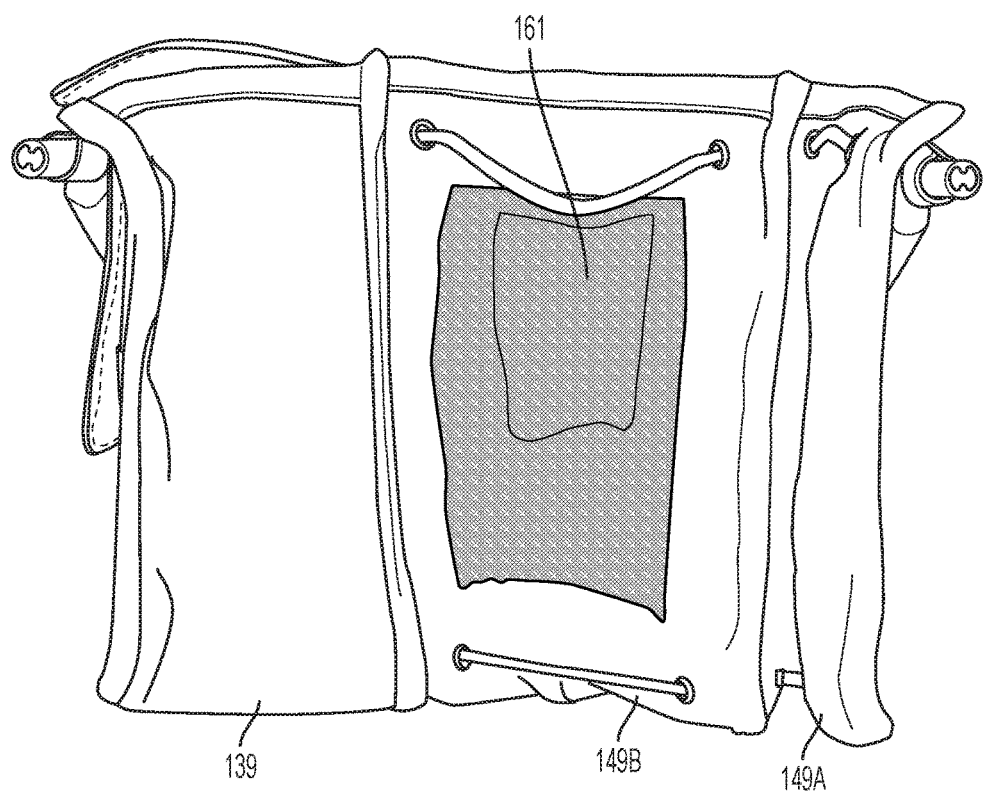
FIG. 36 illustrates a side view of the partially expanded basket of FIG. 31.

FIG. 36 illustrates a side view of the partially expanded basket 137. As depicted the expandable compartments 149 have netted side panels 161, allowing a user to view the contents of the expandable compartment from the side. Alternatively, the side panels 161 may be opaque.

Figure 37:
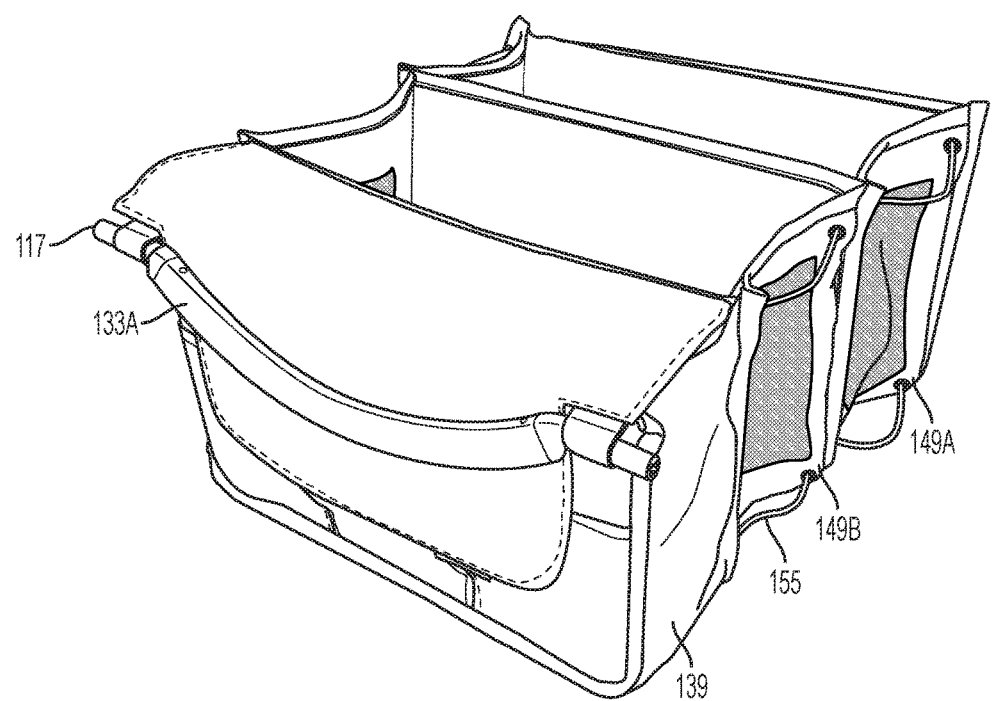
FIG. 37 illustrates a side perspective view of the basket of FIG. 31 with the closed flap in a fully expanded state.
Figure 38:
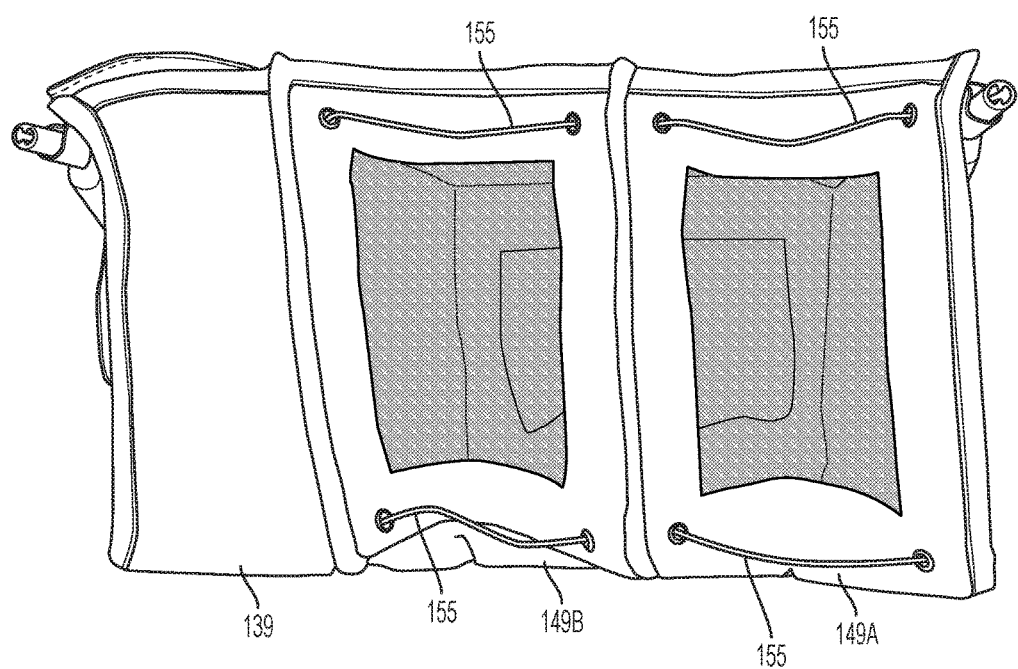
FIG. 38 illustrates a side view of the basket of FIG. 31 with the closed flap in the fully expanded state.

FIG. 37 illustrates a side perspective view of the basket 137 with the closed flap 145 in a fully expanded state. As depicted, both expandable compartments 149A and 149B are fully expanded. A corresponding side view is presented in FIG. 38. Components of the cable routing systems 155 used to expand and retract each expandable compartment 149 is visible.

Figure 39:
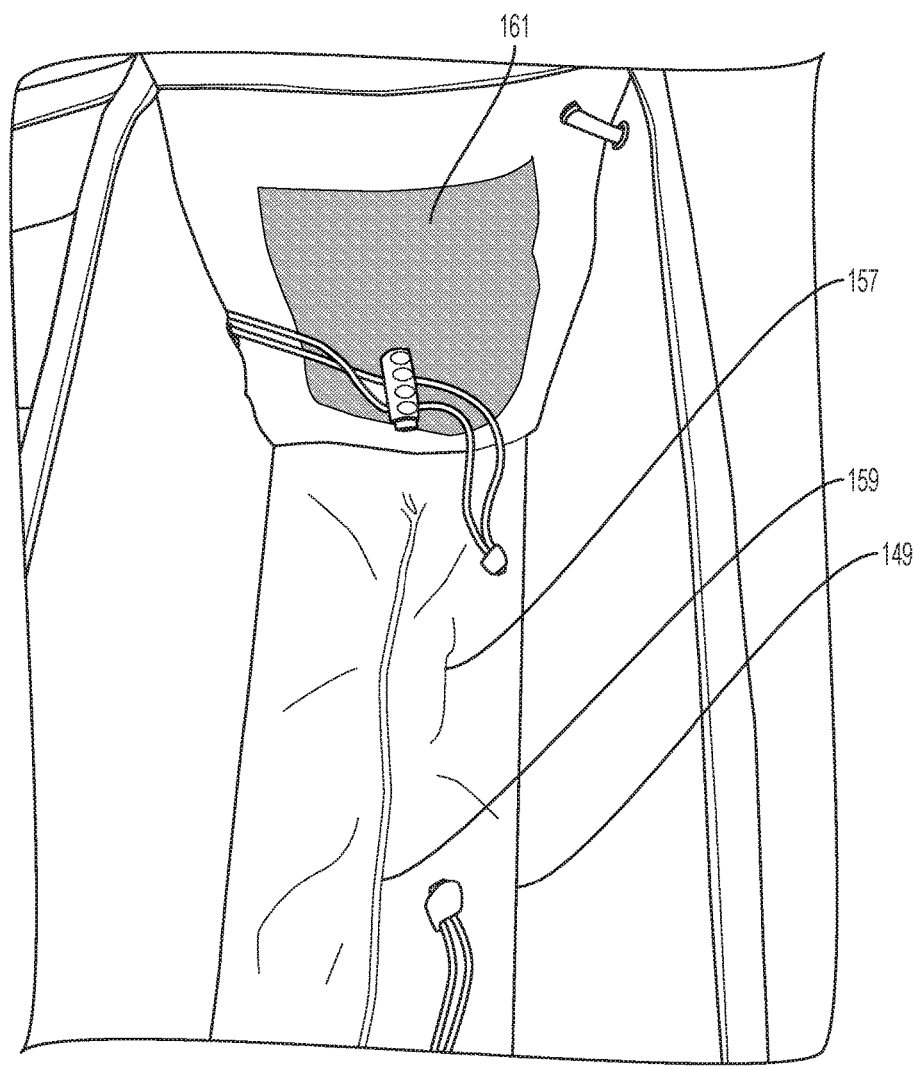
FIG. 39 illustrates a top view of the interior of a single expandable compartment of the basket of FIG. 31.

FIG. 39 illustrates a top view of adjacent expandable compartments 149 of the basket 137. As depicted, a side panel 161 facing the exterior of the basket contains a transparent mesh panel. The base 157 of the expandable compartment 149 may be gusseted 159 to allow for the expandable compartment 149 to fold substantially inwards when the expandable compartment 149 is retracted by the cable routing system 155 (not shown). Details of the cable routing system 155 are described further below.

Figure 40:
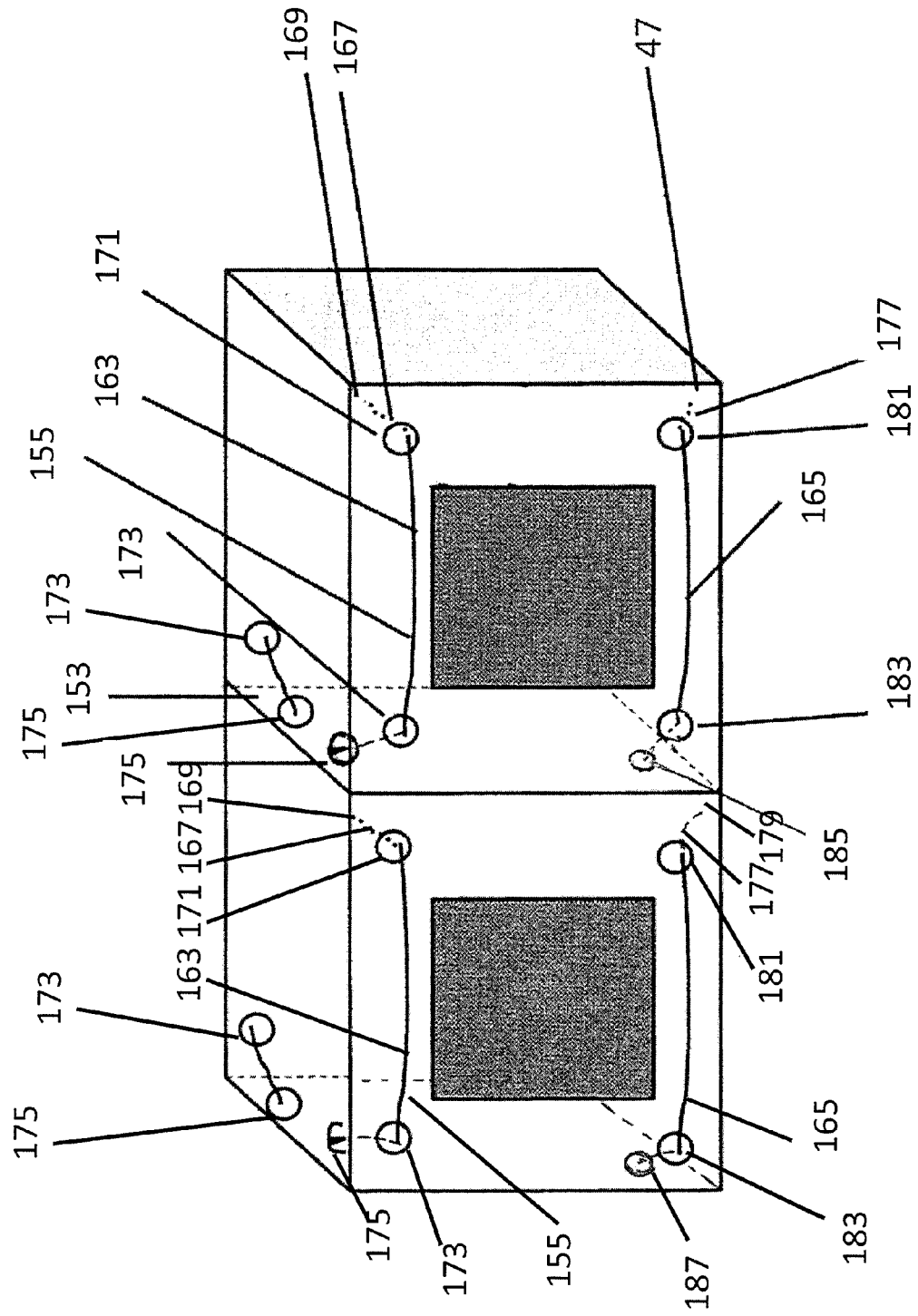
FIG. 40 illustrates a side perspective view of an expandable compartment of the basket of FIG. 31 with a cable routing system.
Figure 41:
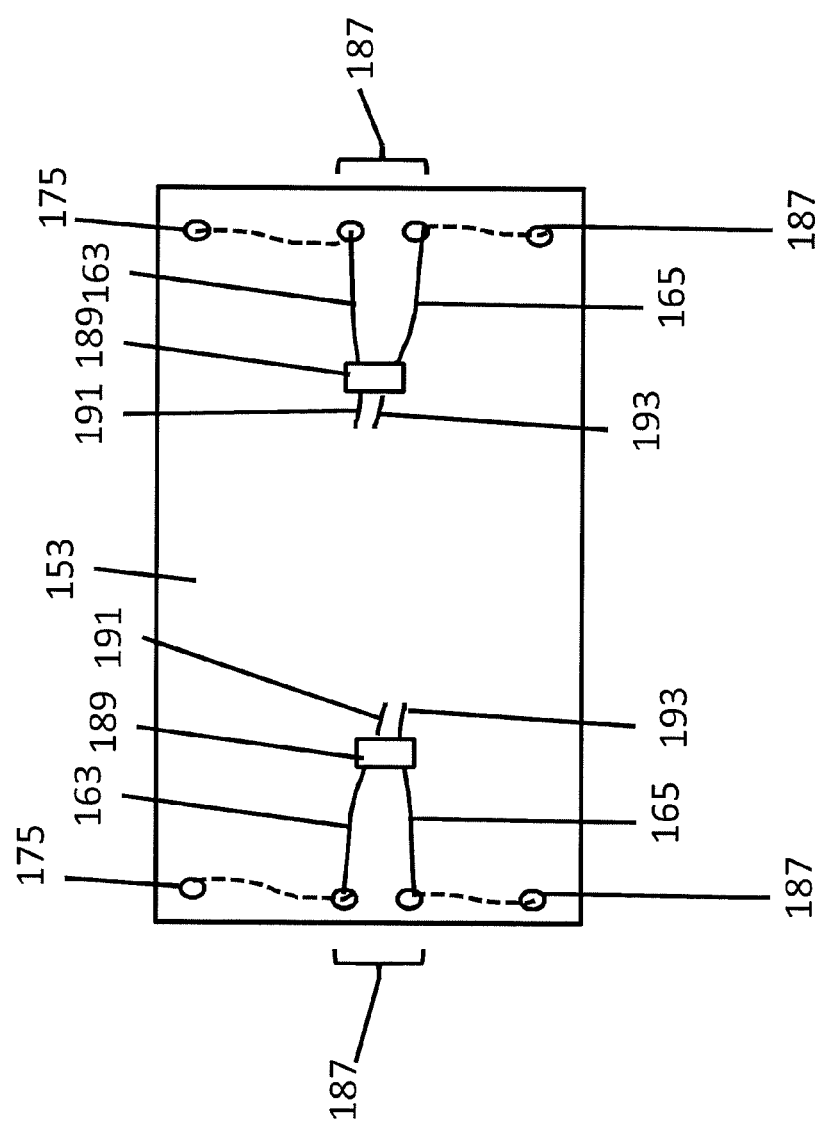
FIG. 41 illustrates a side view of the common panel between two adjacent expandable compartments with the cable routing system associated the basket of FIG. 31.

Each cable routing system 155 independently manages the expansion and retraction of each expandable compartment 149 and is depicted in FIGS. 40 and 41. FIG. 40 is a diagrammatic representation of the cable routing system 155 taken from a side perspective view of the basket 137. FIG. 41 is also a diagrammatic representation of the cable routing system 155 in a side view from the interior of an adjacent expandable compartment 149. The cable routing system 155 comprises a top cable 163 and a lower cable 165 each comprising a first end and a second end. The first end of the top cable 167 is fixedly attached to a point 169 near the top portion of the side of the expandable compartment. The top cable 163 is routed through two holes 171, 173 in the top portion of the side of the expandable compartment and then through at least one hole 175 facing the expandable compartment located on the common panel 153 between adjacent expandable compartments 149. Similarly, the first end of the lower cable 177 is fixedly attached to a point 179 near the bottom portion of the side of the expandable compartment. The lower cable 165 is routed through two holes 181, 183 in the bottom portion of the side of the expandable compartment, then through at least one hole 185 facing the expandable compartment located on the common panel 153 between adjacent expandable compartments 149. The cables 163, 165 are each routed through at least one hole 187 also located on the common panel 153 between adjacent expandable compartments and facing the interior of the adjacent expandable compartment. Once in the adjacent expandable compartment, the top and lower cables 163, 165 are then routed through at least one toggle 189 such that the movement of the top cable is coupled to movement of the lower cable. Moving the toggle in the direction substantially towards the direction of the incoming cables (and expandable compartment) substantially retracts the expandable compartment. Moving the toggle in the direction opposite the direction of the incoming cable (and expandable compartment) allows expansion of the expandable compartment. Additionally the second end of the top cable 191 may be attached to the second end of the lower cable 193. Alternatively, the lower cable and the top cable may comprise parts of a single cable. Notably, the retraction and expansion of a single expandable compartment is independent of that of adjacent expandable compartments. A cable routing system 155 is present on both sides of each expandable compartment; in the embodiment shown, each side of the cable routing system must be operated independently to fully expand or collapse a particular expandable compartment. The points at which the first ends of the lower cable and the top cable attach to the side of the expandable compartment may be located within the two or more layers of fabric and other material comprising the side of the expandable compartment, such that the attachment points 169 and 179 are not visible.

As an alternative to the cable routing system 155 discussed herein, expansion and retraction of the expandable compartments may also be facilitated or restricted by other means, such as zippers, snaps, toggles, buttons, Velcro, magnets or other known means.

Figure 42:
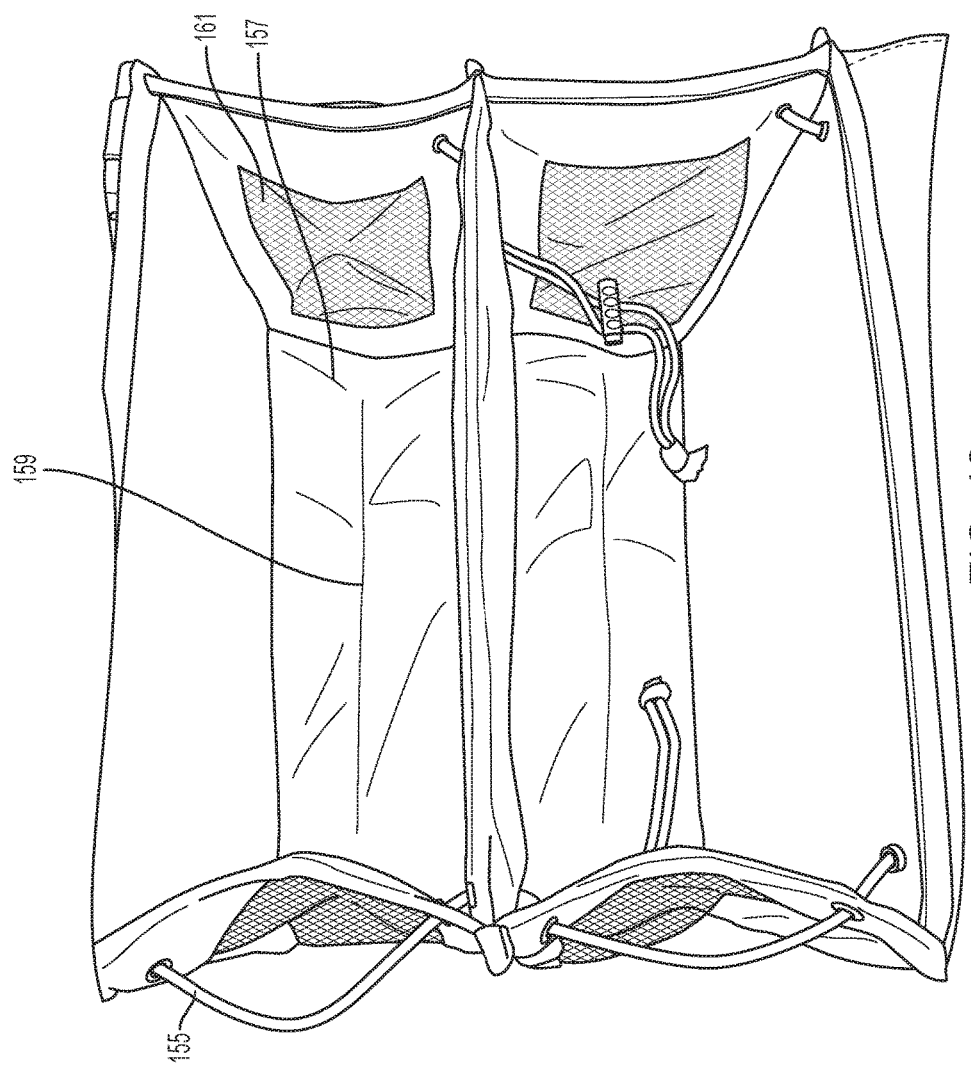
FIG. 42 illustrates a top view of adjacent expandable compartments of the basket of FIG. 31.

FIG. 42 illustrates a top view of adjacent expandable compartments of the basket.

Figure 43:
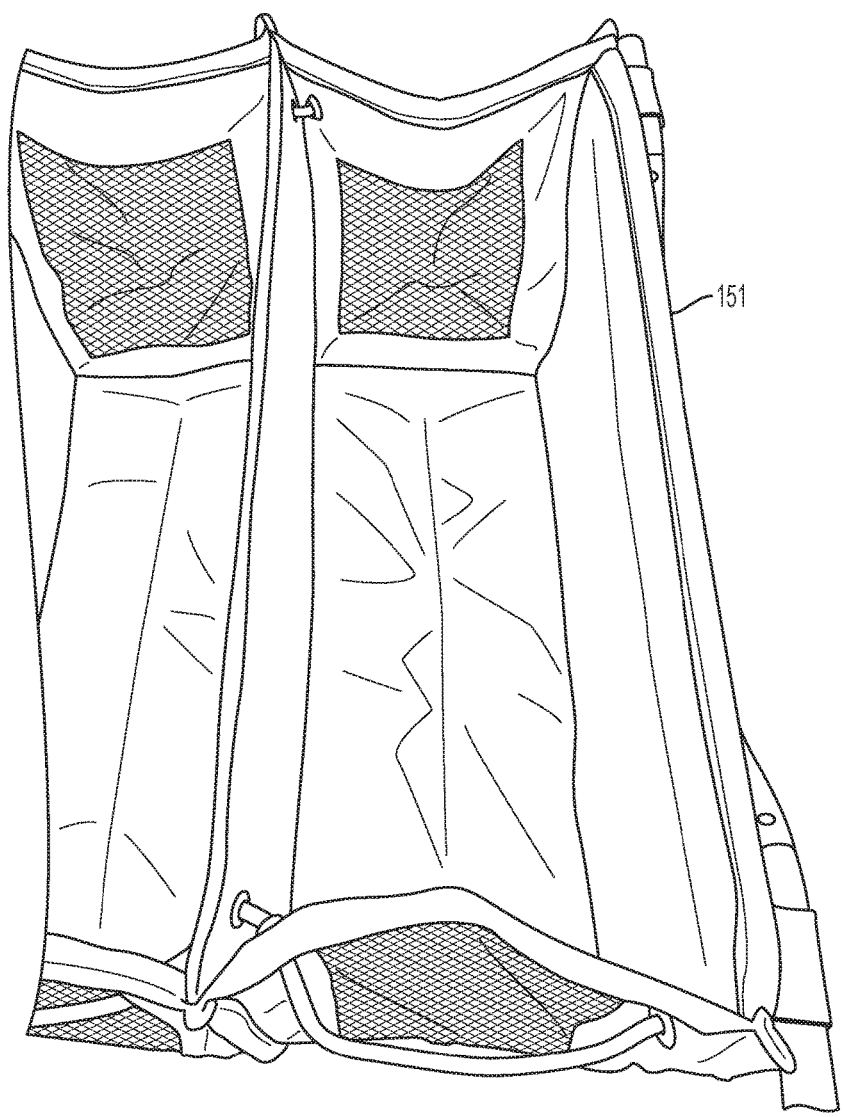
FIG. 43 illustrates a top perspective view of the expandable compartment of the basket located near one end of the basket of FIG. 31.

FIG. 43 illustrates a top perspective view of the expandable compartment of the basket 137 located near the second end 151 of the basket. Similar to the first end 141, the second end 151 of the basket 137 also comprises a handle 133B with laterally spaced attachment ends 17 configured to attach to a frame of a stroller.

Figure 44:
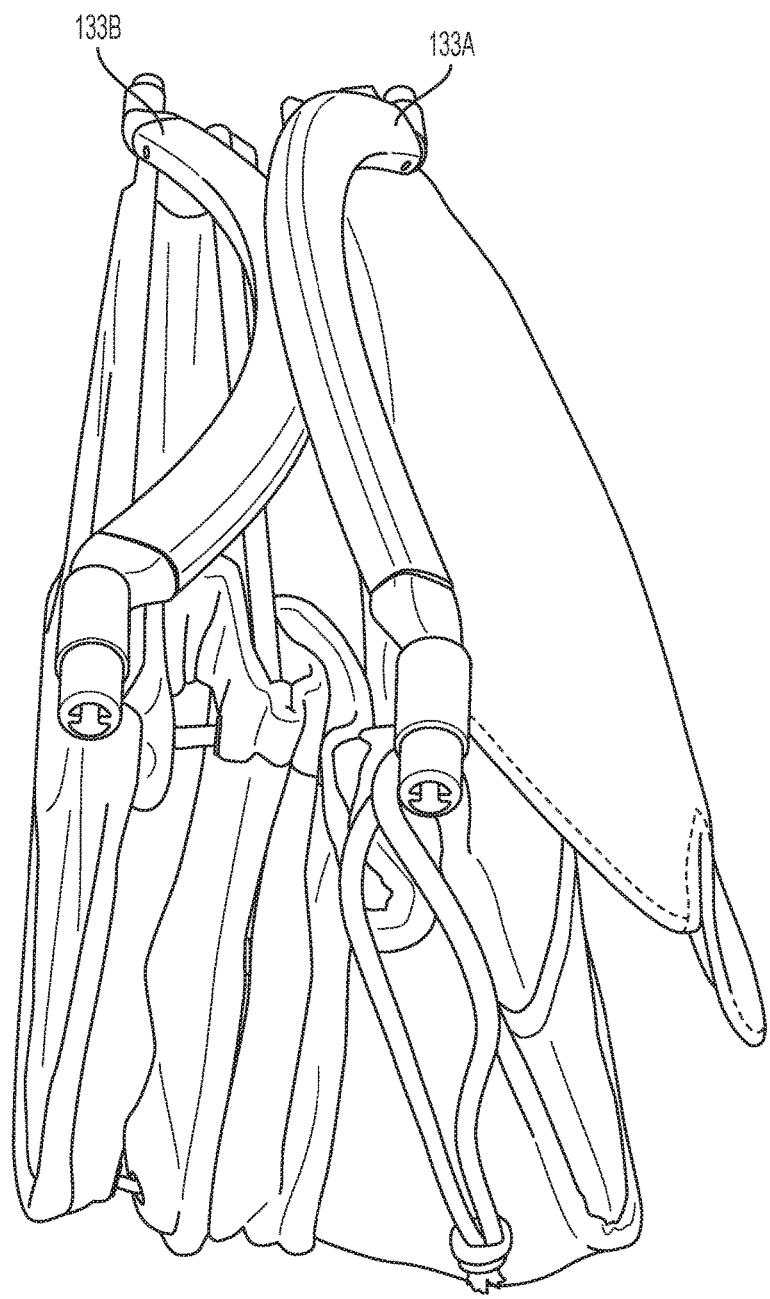
FIG. 44 illustrates a side perspective view of the basket of FIG. 31 in a non-expanded state.

FIG. 44 illustrates a side perspective view of the basket 137 in a non-expanded state. As depicted, the basket 137 may be used as a handbag separately from the expandable stroller.

Figure 45:
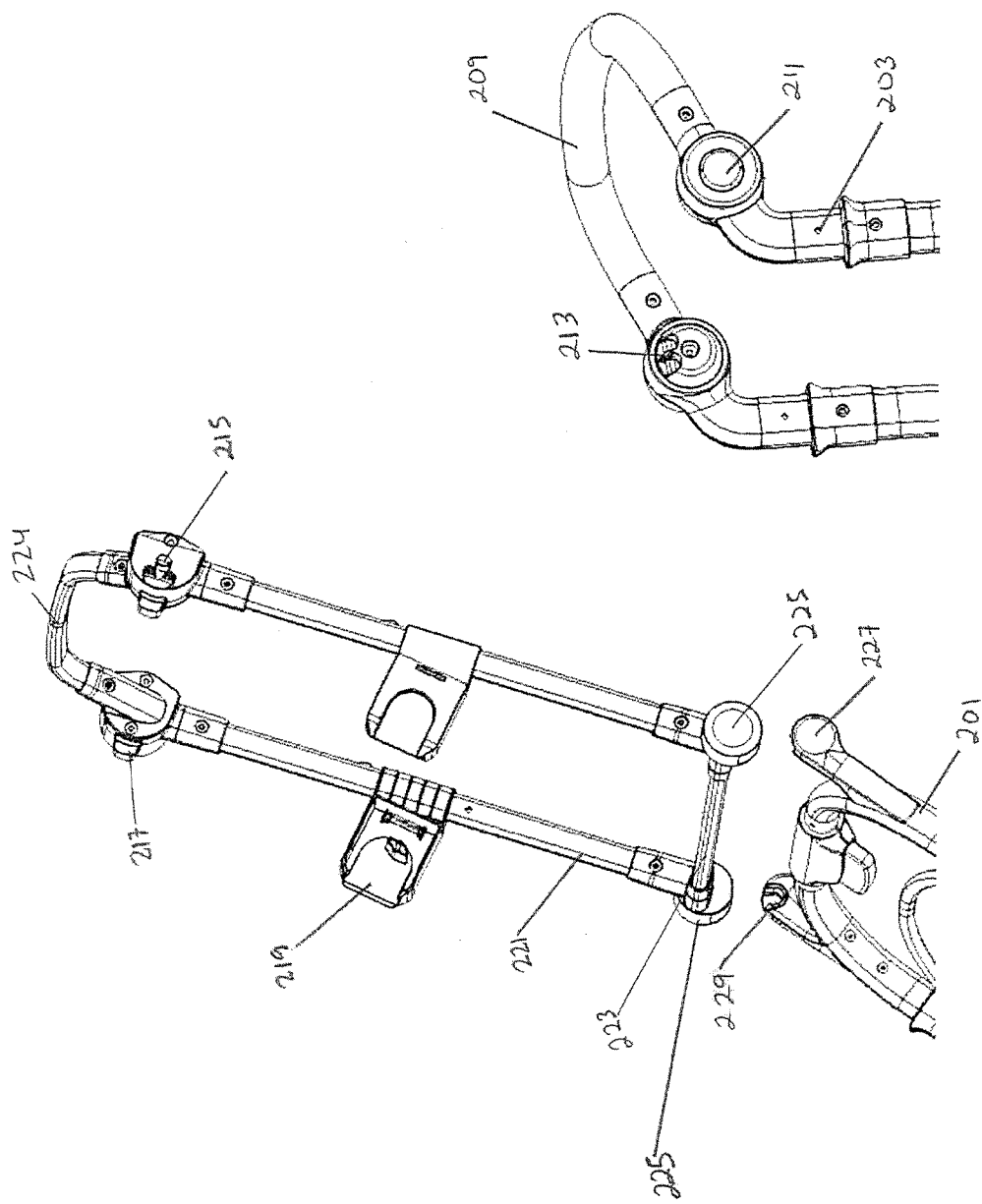
FIG. 45 illustrates a side perspective view of a stroller with a secondary attachment.

FIG. 45 illustrates a further exemplary embodiment of the secondary attachment, such as an infant car seat adapter, for a stroller system. Depicted is a first frame member 201 with front receptacles 229 located within a receiving element 227 located at the top portion of the first front frame member 201. Also illustrated is the top portion of the second rear frame member 203 which may have a handle 209. The top portion of the second rear frame member 203 may have receiving elements 211 containing rear receptacles 213. In one embodiment, the rear receptacles 213 may be dual receptacles (as depicted, the receiving elements 211 each contain two u-shaped openings forming the receptacles). In an alternative embodiment, the receptacles may be semicircular or any other open shape. A secondary attachment 221 is depicted. The secondary attachment 221 forms a generally rectangular frame with opposing first end 223 and second end 224. The secondary attachment 221 may contain one or more locking protrusions 219 configured to engage with an infant car seat or other device to be mounted thereon. The first end 223 of the secondary attachment 221 further comprises attachment ends 225 (each mirror images of the other), configured to engage with the receiving element 227. The second end 224 of the secondary attachment 221 further comprises second attachment ends 215 (each mirror images of each the other), configured to engage with the receiving elements 211. The attachment ends 215 on the second end 224 of the secondary attachment 221 may include a locking mechanism with a actuator 217 operable to releasably secure the second end to the receiving elements 211. FIG. 45 illustrates a first state where the secondary attachment 221 is disengaged from the stroller.

Figure 46:
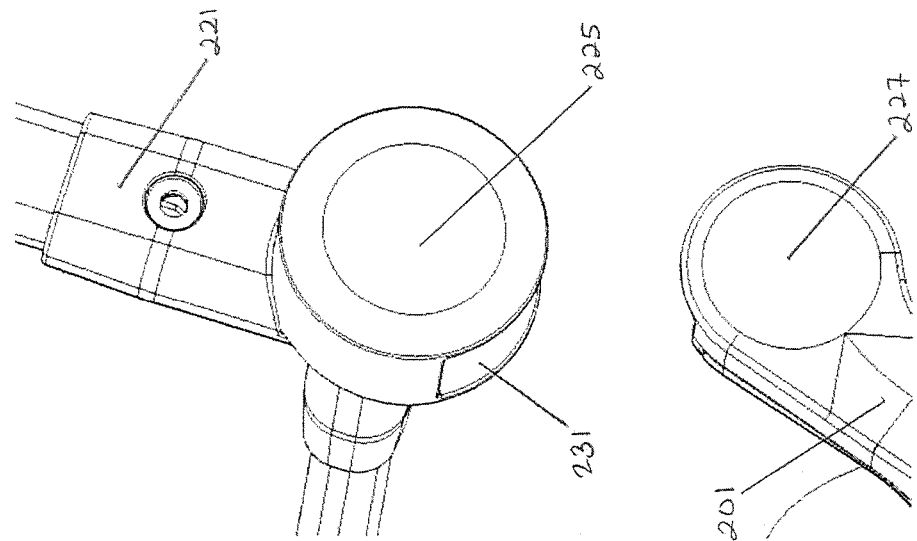
FIG. 46 illustrates a side perspective view of a stroller with a secondary attachment and attachment means therefor.

FIG. 46 depicts the attachment ends 225 of the secondary attachment 221 and the front frame member 201 of the stroller in a disengaged state. As depicted, the secondary attachment 221 further comprises an attachment end 225 configured to engage with the receiving element 227 located on the first front frame member 201. The attachment end 225 may further comprise a slot 231 adapted to receive all or a portion of the receiving element 227 therein. The slot 231 is located on the an outer surface of the attachment end 225 and is configured to substantially enclose the receiving element 227, once engaged thereto.

Figure 47:
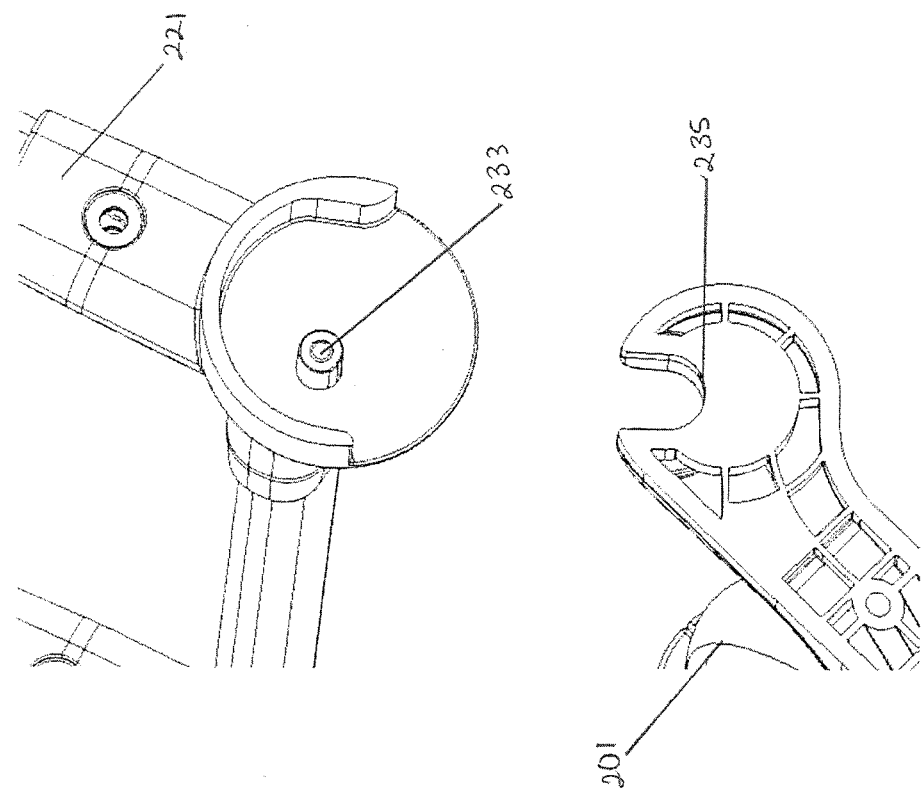
FIG. 47 illustrates a partial cross-sectional view of the structure of FIG. 46.

FIG. 47 provides a partial cross-sectional view of the elements discussed in FIG. 46. The interior of the attachment end 225 may comprise a protruding attachment element 233 configured to engage a receptacle 235, depicted here as a u-shaped receptacle, located within the receiving element 227.

Figure 48:
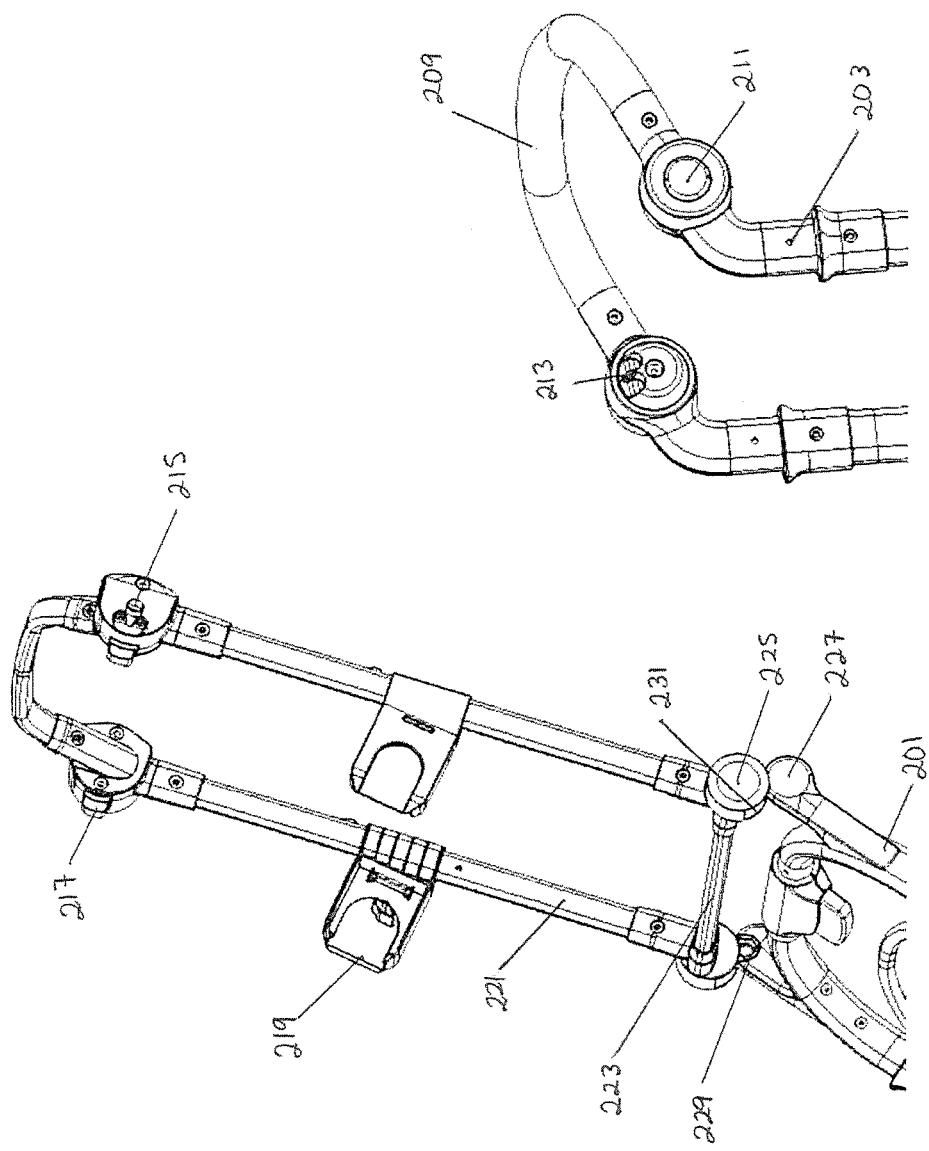
FIG. 48 illustrates a side perspective view of a stroller with a secondary attachment and attachment means therefor.
Figure 49:
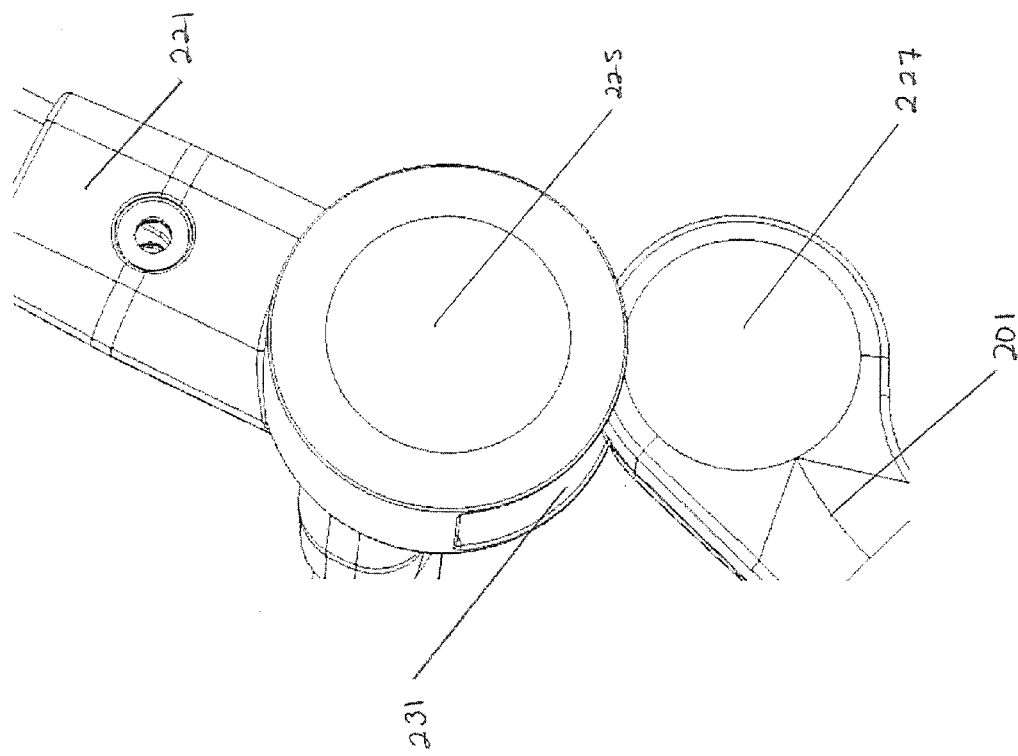
FIG. 49 illustrates a side perspective view of a stroller with a secondary attachment and attachment means therefor.
Figure 50:
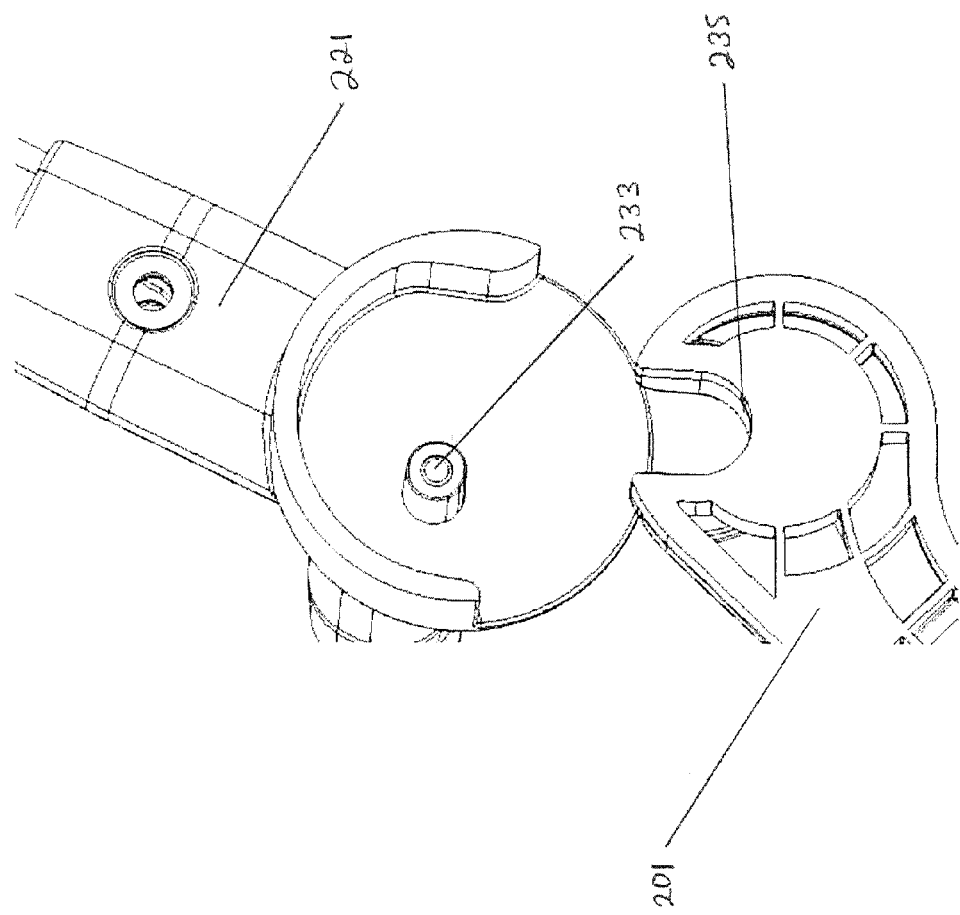
FIG. 50 illustrates a partial cross-sectional view of the structure of FIG. 49.

The secondary attachment 221 may be attached to the stroller by way of the attachment ends 225 of the secondary attachment 221 aligning the slot 231 and protruding element 233 with the receiving element 227 located on the first front frame member 201 so that the receiving element 227 may slide into the slot 231 when the secondary attachment 221 is engaged with the stroller. When the receiving element 227 slides into the slot 231, the u-shaped receptacle 235 may surround the protruding attachment element 233 (FIGS. 48-50 further depict secondary attachment 221 partially attached to the stroller in further detail).

Figure 51:
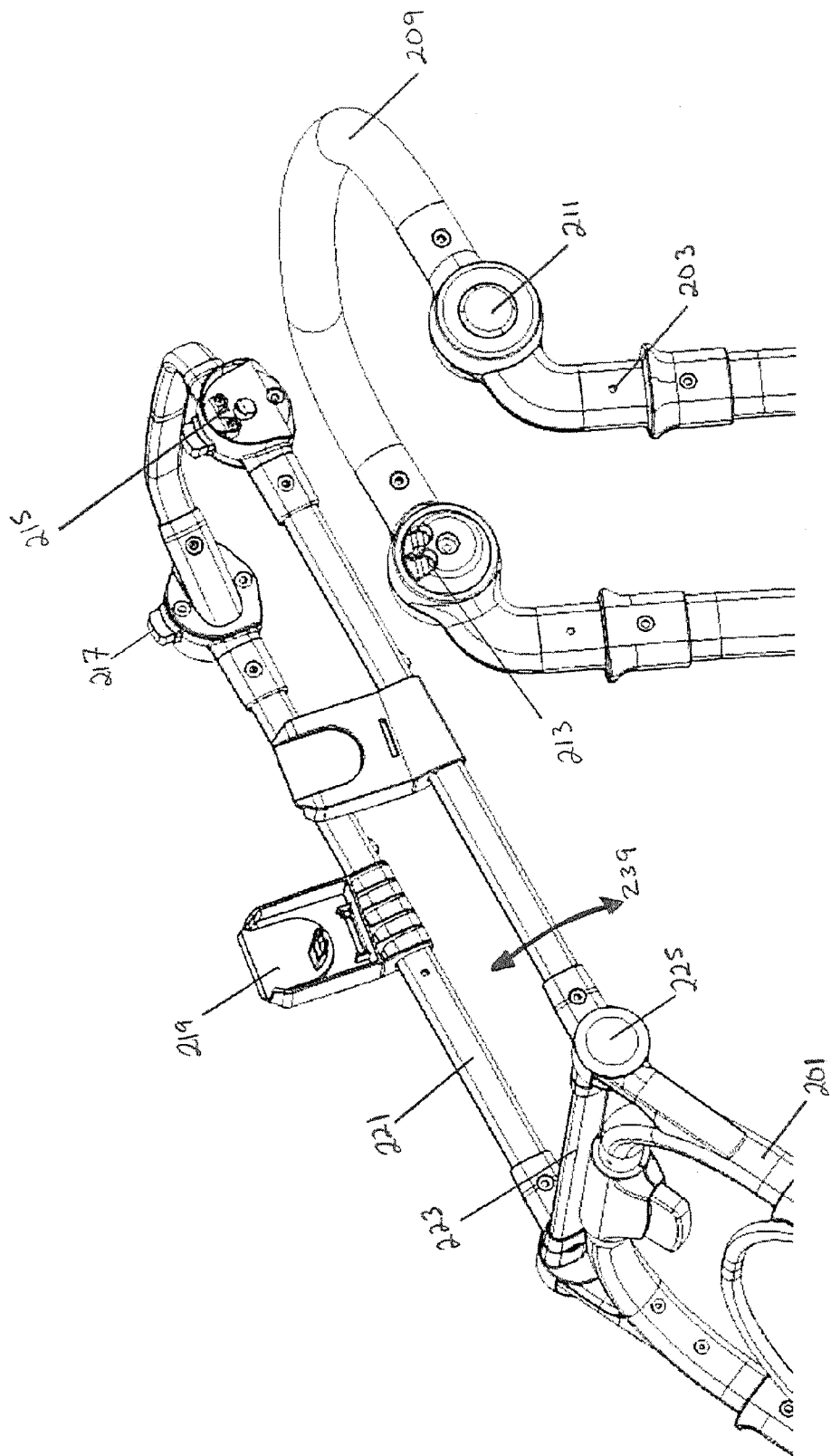
FIG. 51 illustrates a side perspective view of a stroller with a secondary attachment and attachment means therefor.
Figure 52:
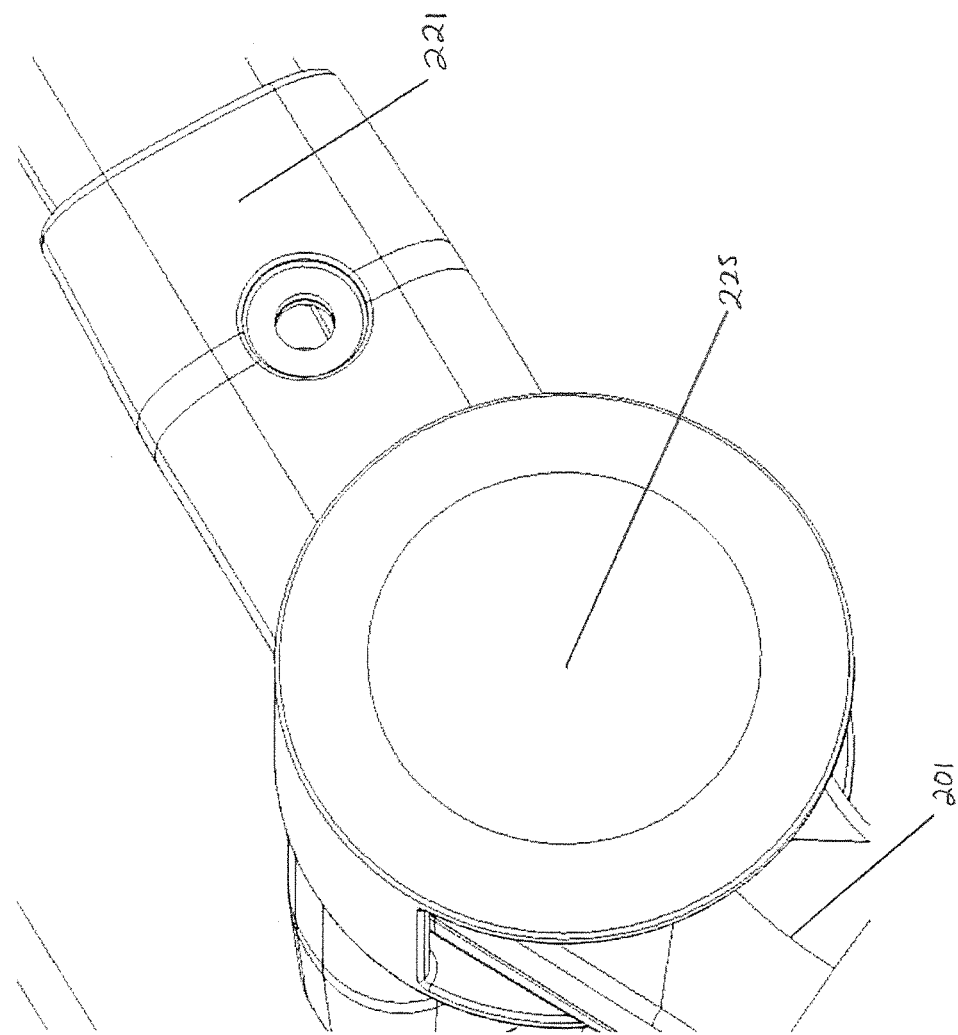
FIG. 52 illustrates a side perspective view of a stroller with a secondary attachment and attachment means therefor.
Figure 53:
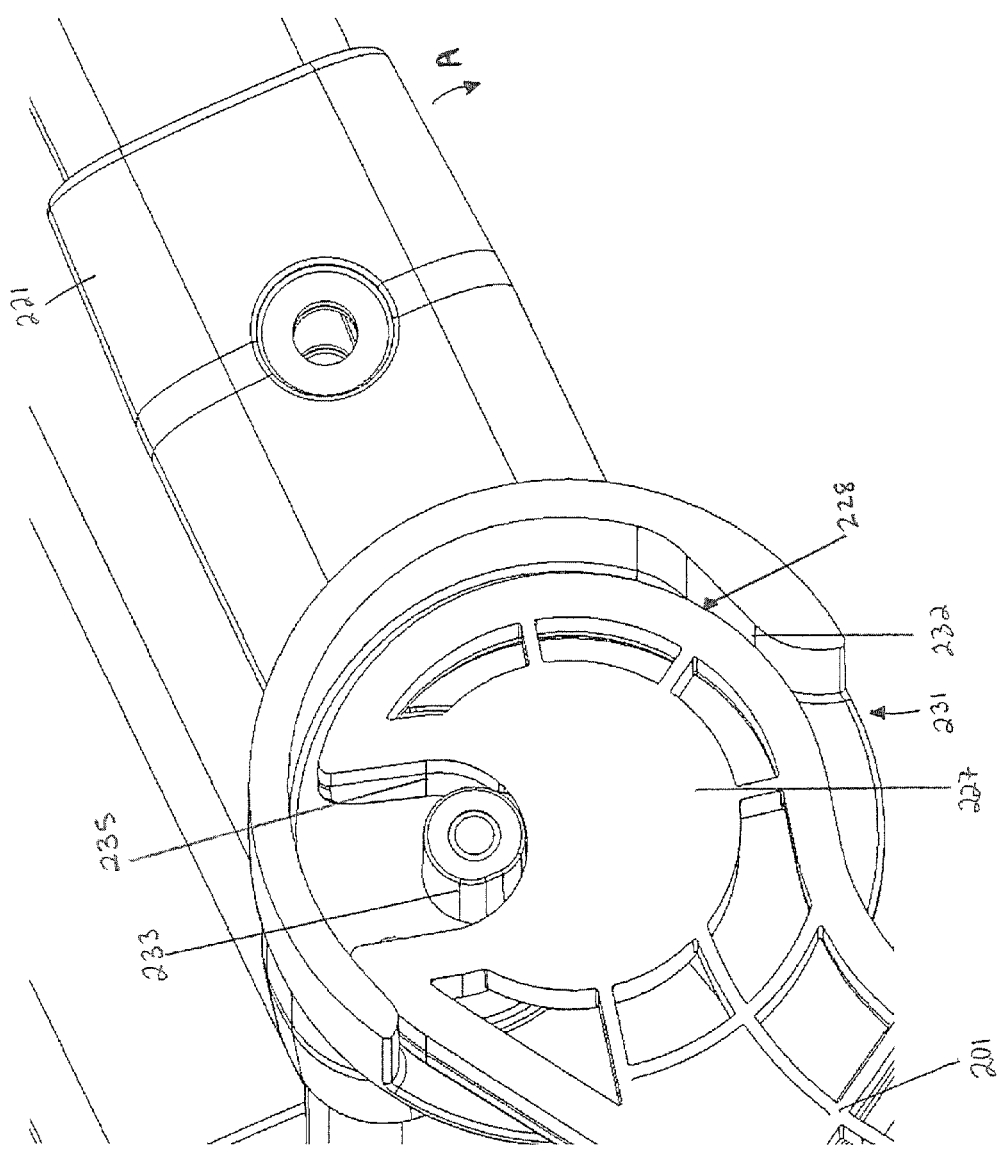
FIG. 53 illustrates a partial cross-sectional view of the structure of FIG. 52.

FIG. 51 illustrates the secondary attachment (infant car seat adapter) 221 partially secured to the first front frame member 201 of the stroller. In the configuration of FIG. 51, the protruding element 233 has engaged in the receptacle, and the secondary attachment 221 has been rotated about the axis of the protruding element (or in other configurations any axis formed by the attachment end of the secondary attachment 221), such that the second attachment ends 215 are brought closer to the rear frame member 203 and corresponding receiving elements 211. As depicted in FIG. 52 the receiving element 227 slides into the slot 231 of the attachment end 225. FIG. 53 provides a cross-sectional view of the elements discussed in FIG. 51. As depicted the receptacle 235 surrounds the protruding attachment element 233. The secondary attachment 221 is then restricted from disengaging from the first front frame member 201 of the stroller by rotating the secondary attachment 221 in the direction of arrow A. Receiving element 227 has a generally round outer surface, 228 and the receptacle 235 is disposed at a location spaced away from the center of receiving element, 227. Located on an inner surface of the attachment end 225, adjacent the slot 231 is a raised portion 232, adapted to engage the outer surface of the receiving element 227. Due to the off center location of the receptacle 235, and therefore the axis of rotation of the secondary attachment about the receiving element 227, as the receiving element is rotated in the direction of arrow A, the raised portion engages the outer surface 228 in a snug fit, thereby further restricting movement of the secondary attachment 221 with respect to the front frame member 201. Those skilled in the art will recognize that although this attachment mechanism is being discussed with respect to the first frame member 201, other embodiments of the stroller may use this attachment mechanism on the second frame member 203, as well as switching the other attachment means discussed herein between first and second frame members of the stroller.

When the secondary attachment 221 is engaged with or attached to the first front frame member 201 the secondary attachment 221 is able to rotate with respect to the first front frame member 201 (see arrow A). To further secure the secondary attachment 221 to the stroller the second upper end 224 of the secondary attachment is rotated towards the second rear frame member 203 while the first lower end 223 of the secondary attachment is attached to the first front frame member 201.

Figure 54:
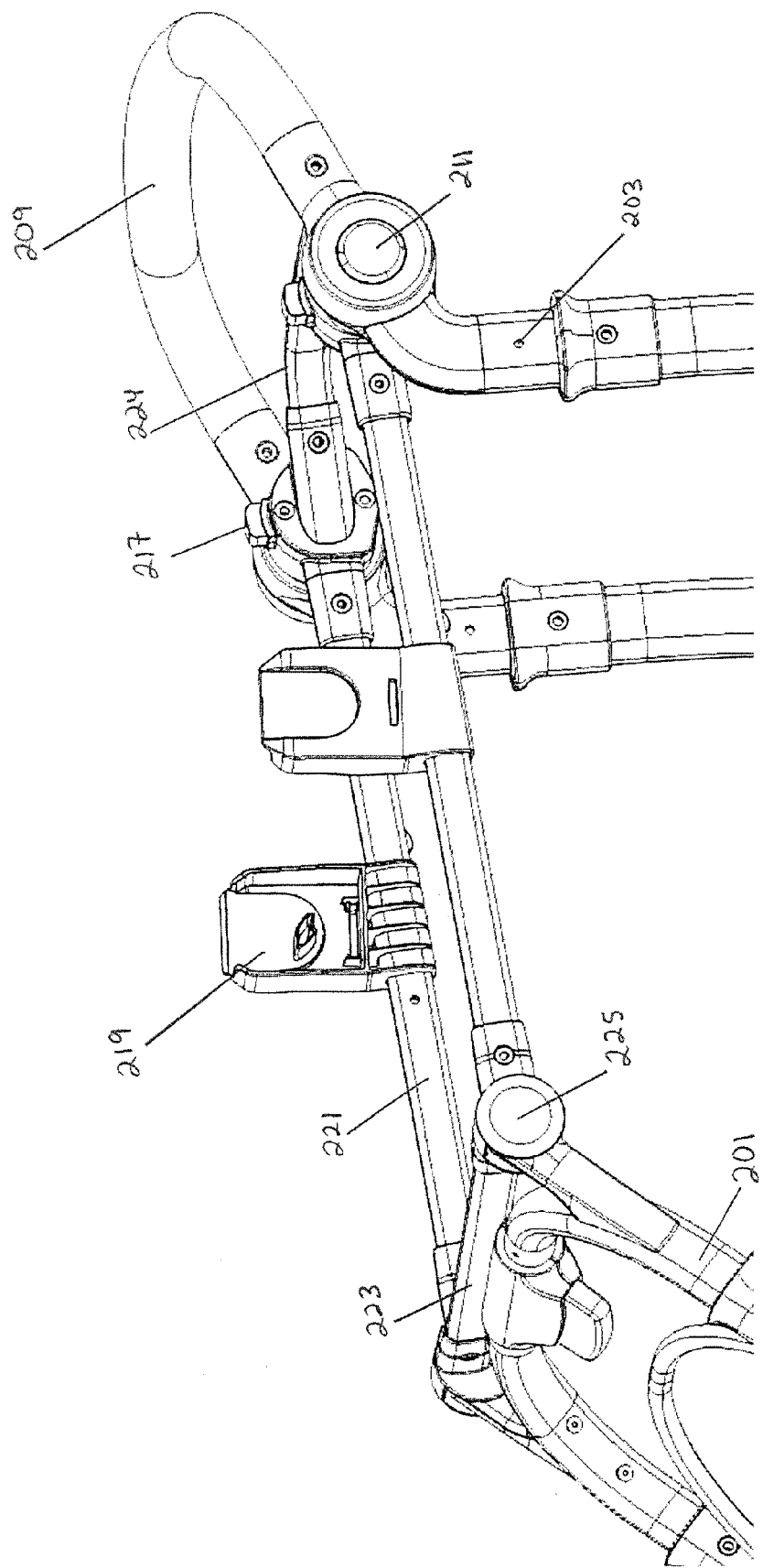
FIG. 54 illustrates a side perspective view of a stroller with a secondary attachment and attachment means therefor.
Figure 55:
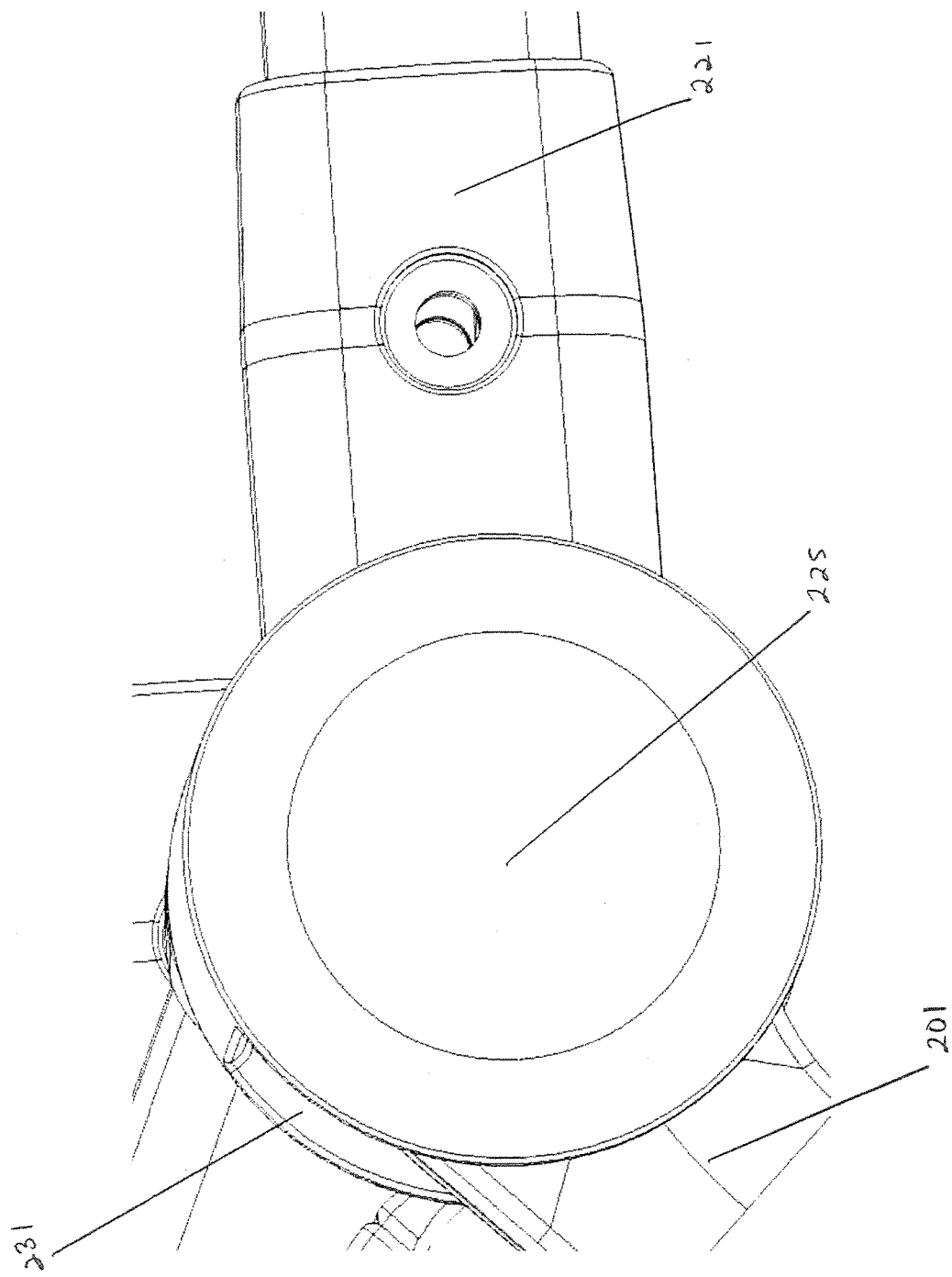
FIG. 55 illustrates a side perspective view of a stroller with a secondary attachment and attachment means therefor.
Figure 56:
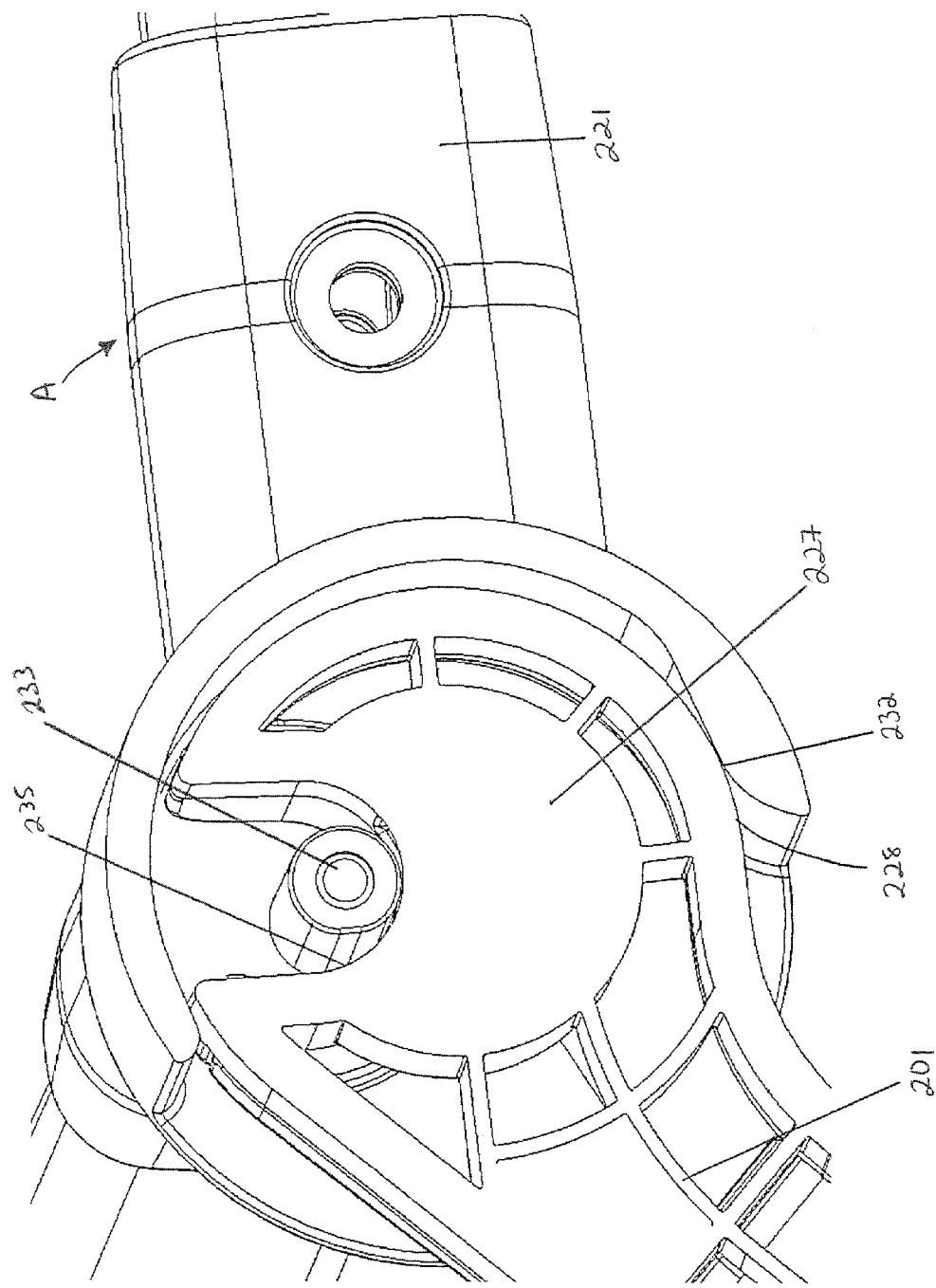
FIG. 56 illustrates a partial cross-sectional view of the structure of FIG. 55.

As depicted in FIG. 54 the secondary attachment 221 is attached to the stroller at both the first lower 223 of the secondary attachment and the second end 224 of the secondary attachment 221. The configuration of the first lower end 223 of the secondary attachment 221 and the first front frame member 201 in such a configuration is depicted in FIG. 55 and a cross-sectional view is presented in FIG. 56. As depicted in FIG. 56, due to rotation of the secondary attachment 221 about the axis of protruding element 233 in the direction of arrow A, the raised surface 232 located inside attachment end 225 snuggly engages outer surface 228 of the receiving element 227.

Figure 57:
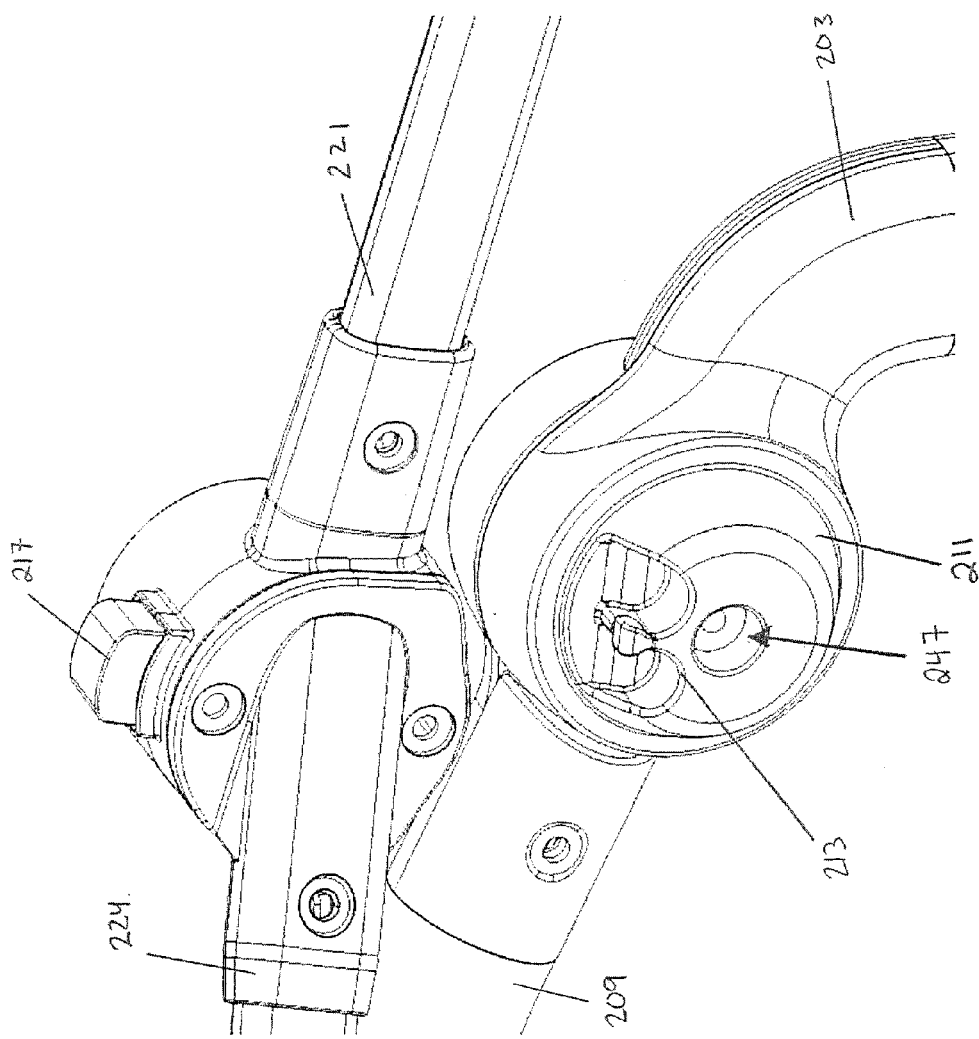
FIG. 57 illustrates a side perspective view of the secondary attachment and the second rear frame member.
Figure 58:
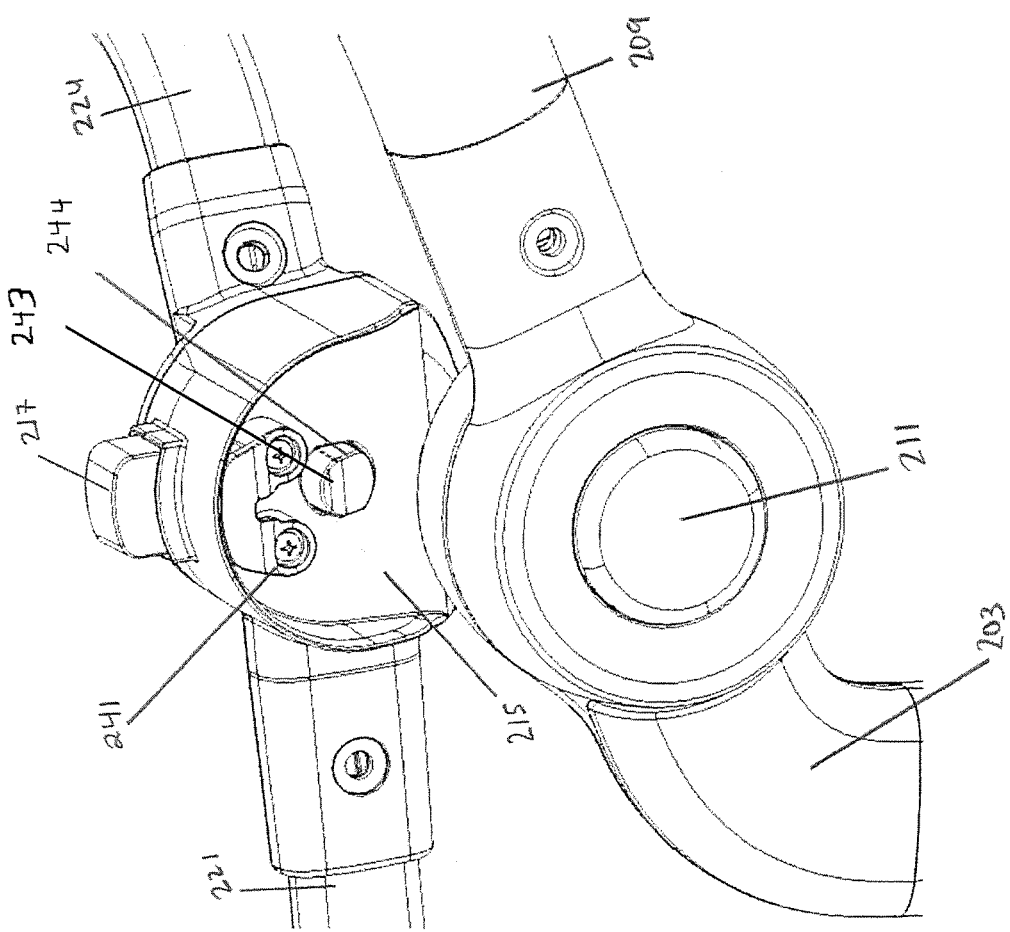
FIG. 58 illustrates a second side perspective view of the secondary attachment and the second rear frame member.

The configuration of the second end 224 of the secondary attachment 221 is illustrated in FIG. 57. Also illustrated in FIG. 57 is the configuration of the top portion of the second, rear, frame member 203, which has receiving elements 211 containing rear dual receptacles 213. The secondary attachment 221 is viewed from the interior of the secondary attachment looking outwards. Similarly, the receiving element 211 is viewed from the interior of the stroller looking outwards. FIG. 58 also depicts the elements present in FIG. 57; however FIG. 58 provides an alternative view from an opposite direction. In FIG. 58 the secondary attachment 221 is viewed from the exterior of the infant car seat adapter 221. The second end 224 of the secondary attachment 221 further comprises attachment ends 215 configured to engage with the receiving elements 211. The attachment members 215 on the second end 224 of the secondary attachment 221 may include a spring loaded locking mechanism comprising an actuator 217 and a locking element 243 and protruding alignment elements 241.

Figure 59:
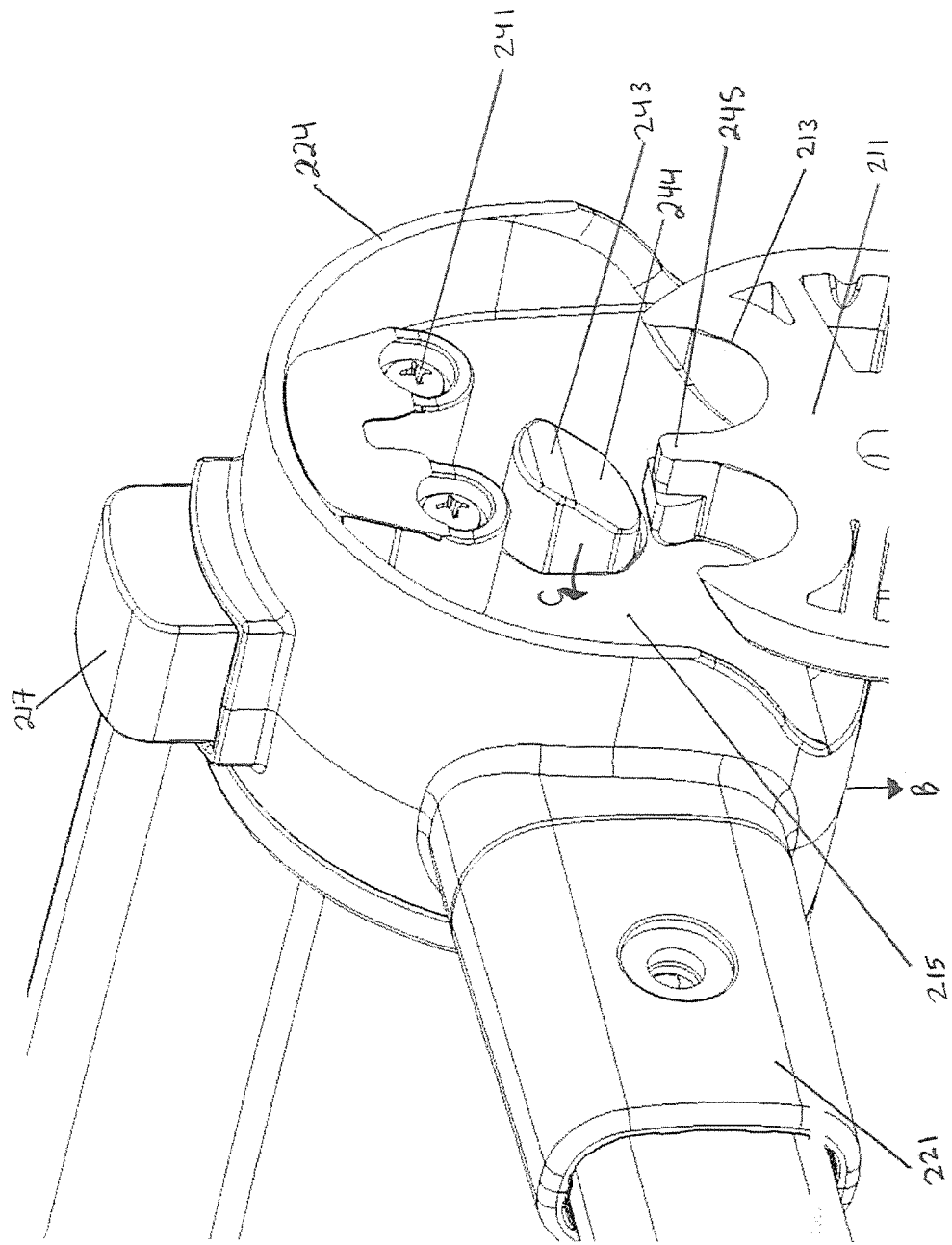
FIG. 59 illustrates a partial cross-sectional view of the secondary attachment and the second rear frame member.
Figure 60:
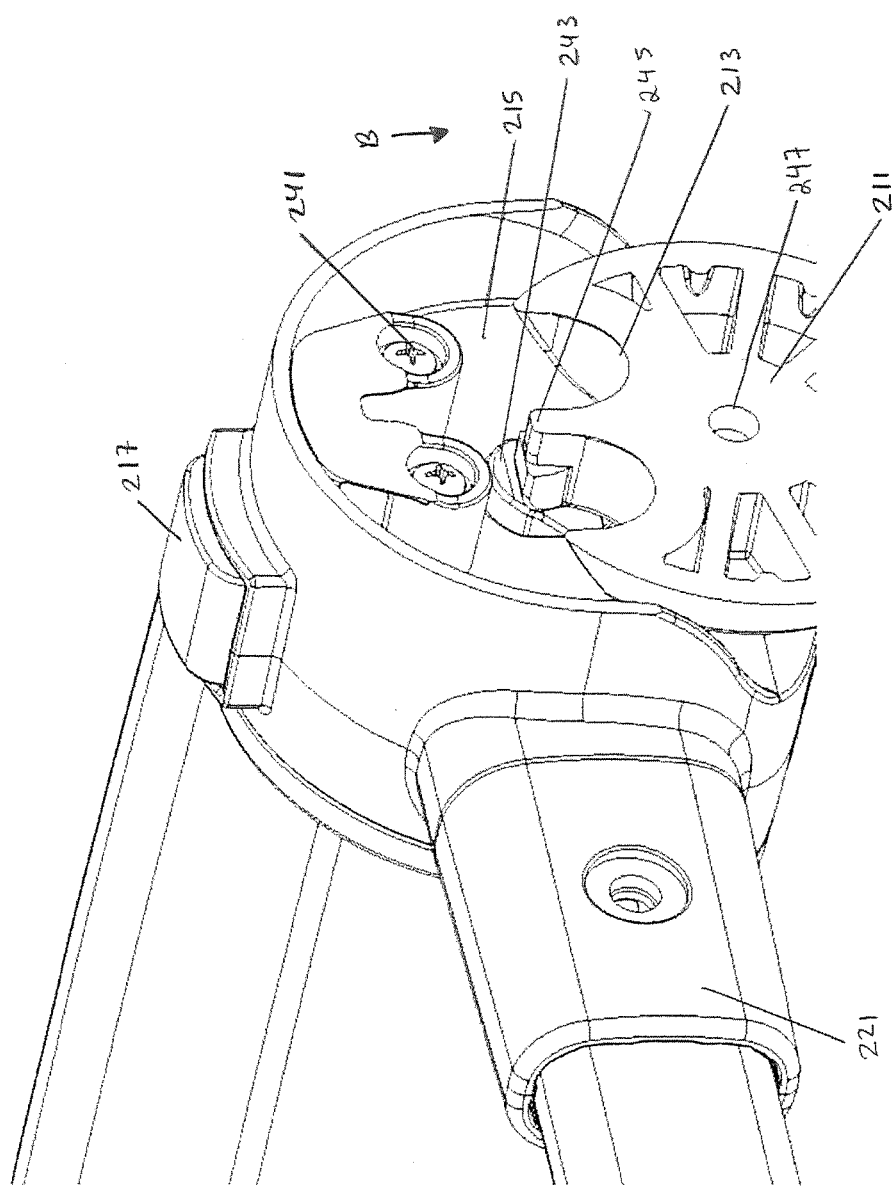
FIG. 60 illustrates a partial cross-sectional view of the secondary attachment and the second rear frame member.

FIG. 59 provides a partial cross-sectional view of the second end 224 of the secondary attachment 221 engaging with the receiving elements 211 of the second, frame member 203, by moving the second end 224 in the direction of arrow B. As depicted, the second end 224 of the secondary attachment 221 may align with and slide in a generally downwards direction into the receiving elements 211, such that the dual alignment elements 241 align with the receptacles 213 (those skilled in the art will recognize that more or less than two alignment elements and receptacles may be utilized). The actuator 217 and locking element 243 are both shown in an expanded or non-depressed state and may be spring loaded in such a configuration. As the secondary attachment 221 engages with the second frame member 203, by movement in the direction of arrow B, a bridge 245 between the two receptacles 213 in the receiving element 211 engages compresses the locking element 243 as the locking element 243. The locking element 243 has a diagonal engagement surface 244, which facilitates compression of the locking element 243 in the direction of arrow C as the locking element engages the bridge 245. In embodiments where the locking element 243 is spring loaded in an expanded state, a spring mechanism (not shown in FIG. 59, but discussed below) within the second end 224 is compressed. The partial compression of the spring along with a compressed state of the locking element 243 is depicted in FIG. 60 and corresponds to the partial attachment of the secondary attachment (infant car seat adapter) 221 with the second, rear frame member 203. As can be seen, as the locking element 243 is compressed, the actuator 217 also moves inwardly to the second end 224.

Figure 61:
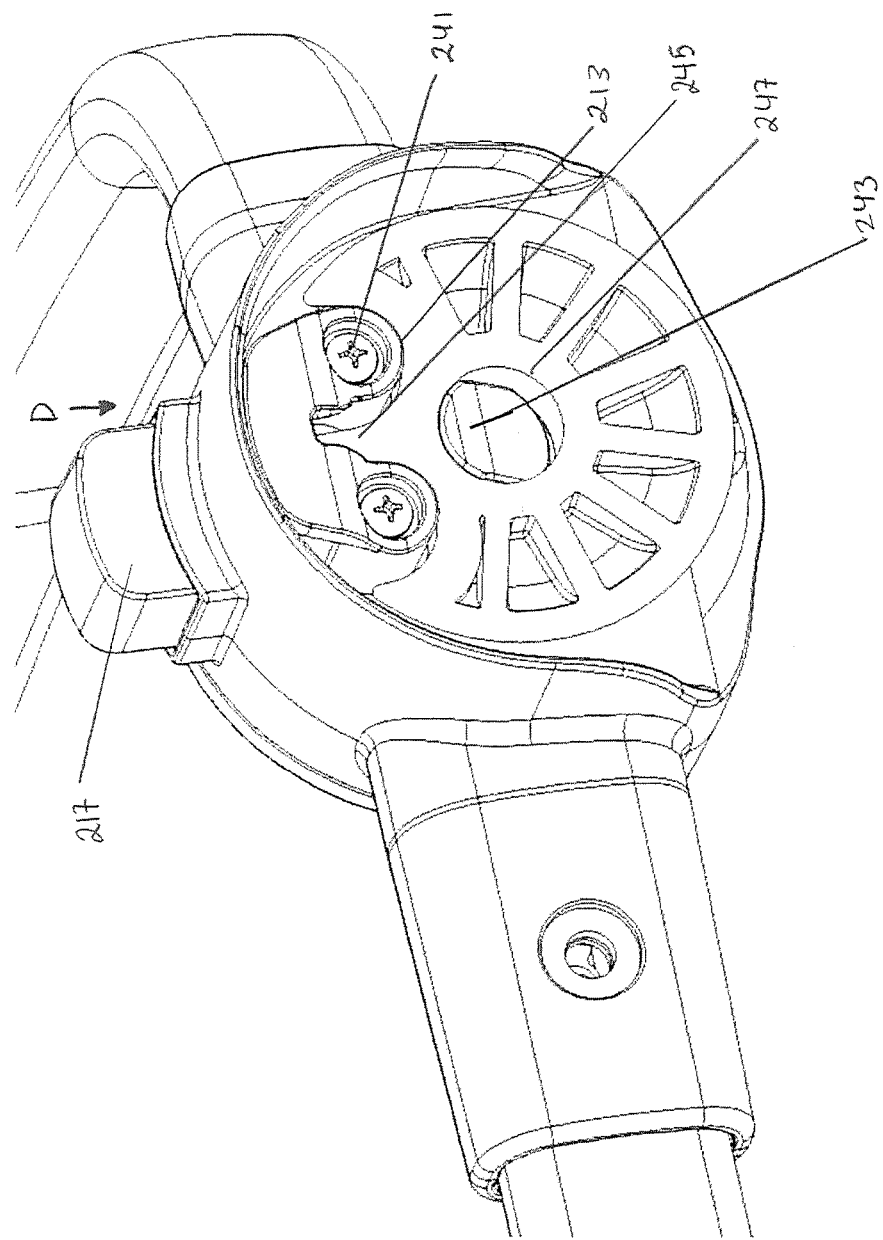
FIG. 61 illustrates a partial cross-sectional view of the secondary attachment and the second rear frame member.

As secondary attachment 221 moves in a generally downwards motion (when viewed in FIG. 60, see arrow B), the bridge 245 moves relatively upwards to a position between the two protruding attachment elements 241. The central axis of the receiving element 211 contains a generally hollow aperture 247 sized just larger than the locking element 243. As depicted in FIG. 61, further movement of the second end 224 with respect to the receiving element 211 will ultimately align the aperture and locking element, such that the locking element will be permitted to expand within the aperture 247. As the locking element 243 expands within the aperture 247, the actuator 217 also returns to its non-depressed state, placing the secondary attachment 221 into a locked state with respect to the second frame member 203. In a locked state, the secondary attachment 221 cannot be removed from the stroller without actuation of the actuator 217.

To remove the secondary attachment 221 from the stroller, the actuator 217 may be compressed in the direction of arrow D by a user thereby forcing the locking element 243 to retract within the second end 224, thereby disengaging the aperture 247, so as to allow the secondary attachment 221 to be disengaged from the stroller.

Figure 62:
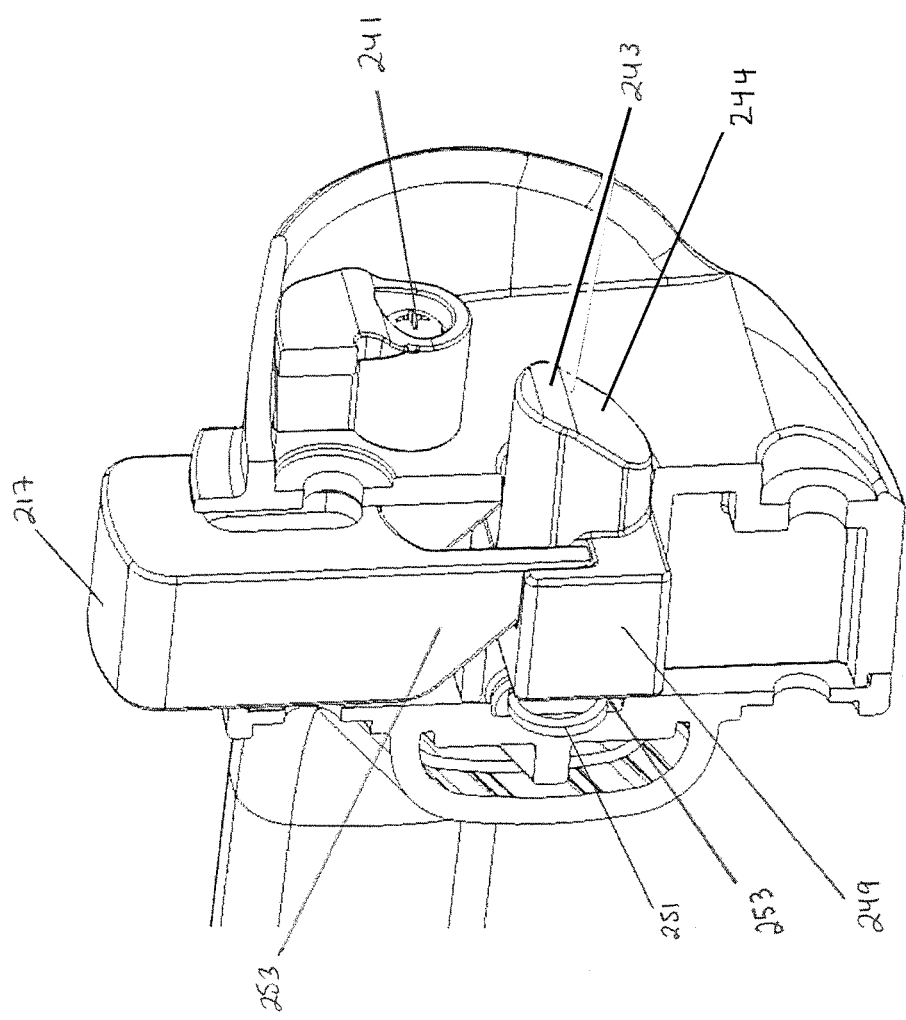
FIG. 62 illustrates a partial cross-sectional view of a locking mechanism used in connection with the secondary attachment.
Figure 63:
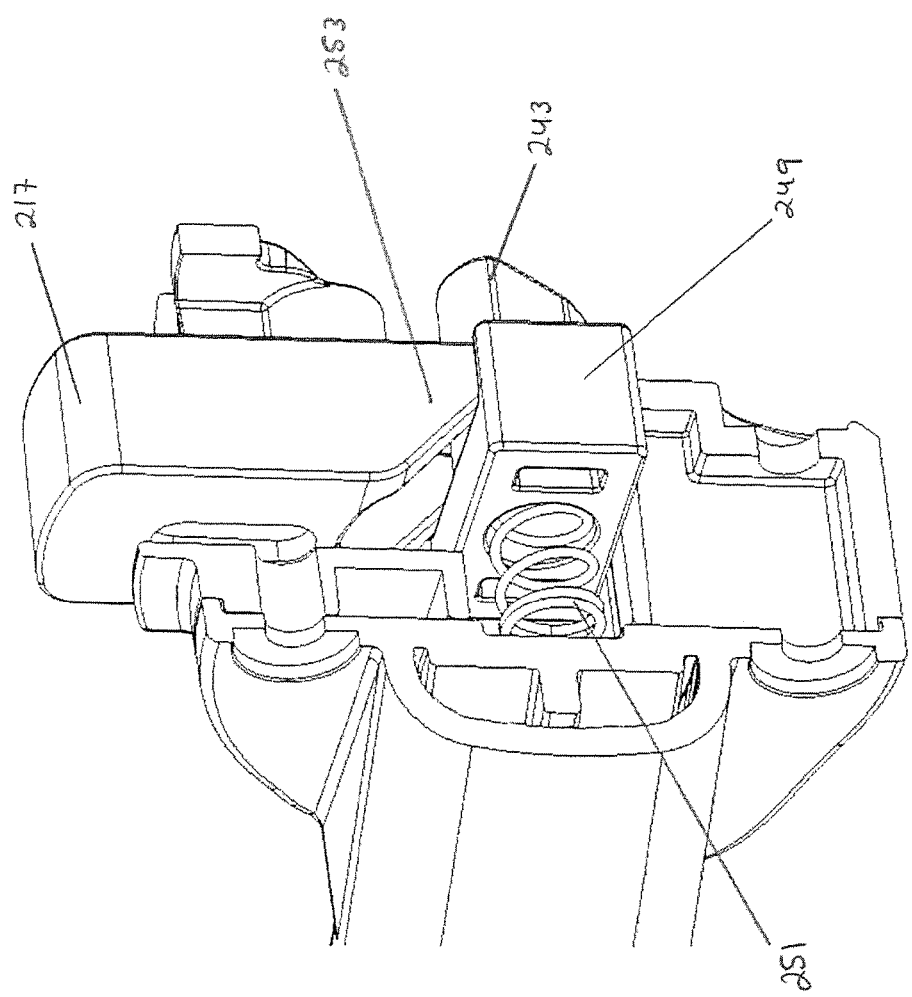
FIG. 63 illustrates a partial cross-sectional view of the locking mechanism used in connection with the secondary attachment.

Partial cross-sectional views of the attachment ends 215 on the second end 224 of the secondary attachment 221 are presented in FIGS. 62-65. In FIGS. 62 and 63 the locking element 243 is in an expanded state. As illustrated, the locking element 243 is biased to remain in the expanded state by a spring 251 contained within a carriage 249 that is attached to locking element 243 and adapted to move therewith. The top surface of the carriage 249 has a diagonal surface (hidden) on which a lower end 253 of the actuator 217, having a diagonal profile with respect to the movement of both the actuator 217 and locking element 243 rests. The interior of the locking element 243 forms a first stop surface for the spring. A stop 253, disposed on an interior surface of the attachment end 215 forms a second stop surface for the spring 251, thereby forming a spring seat.

Figure 64:
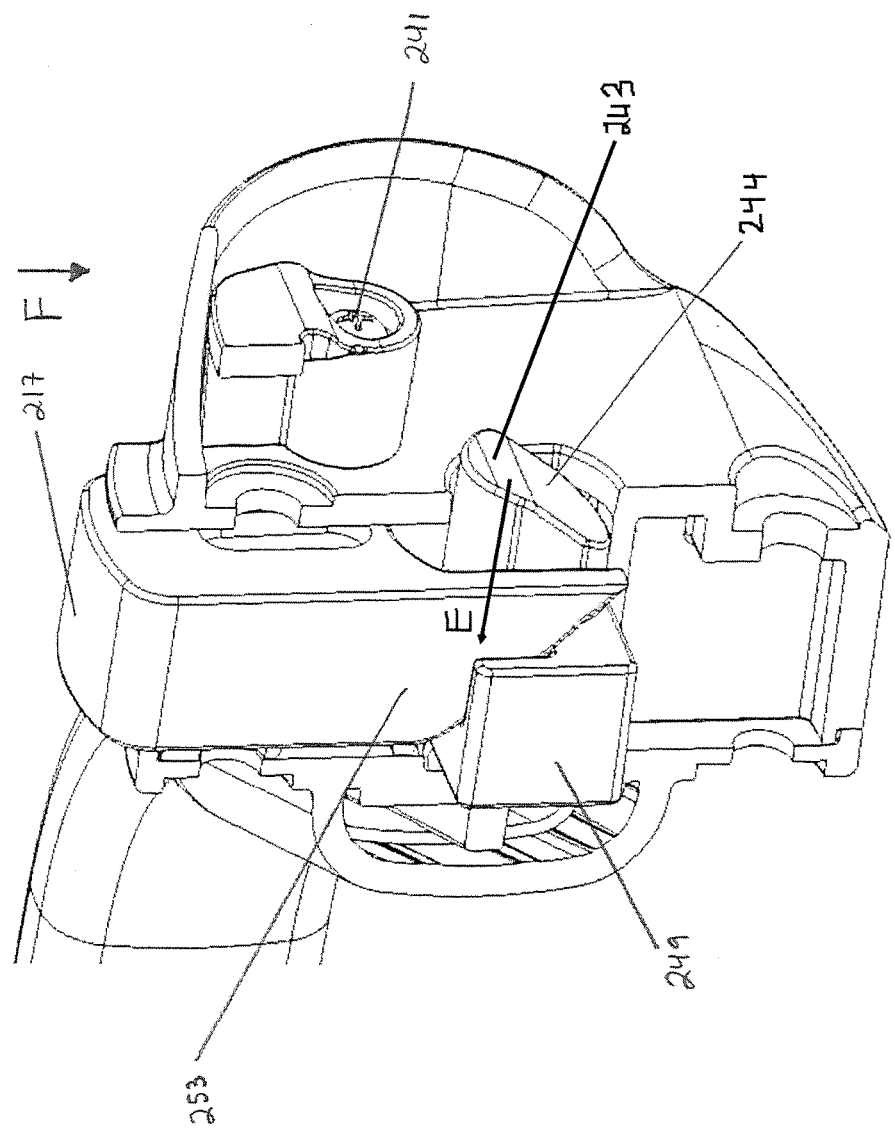
FIG. 64 illustrates a partial cross-sectional view of the locking mechanism used in connection with the secondary attachment.
Figure 65:
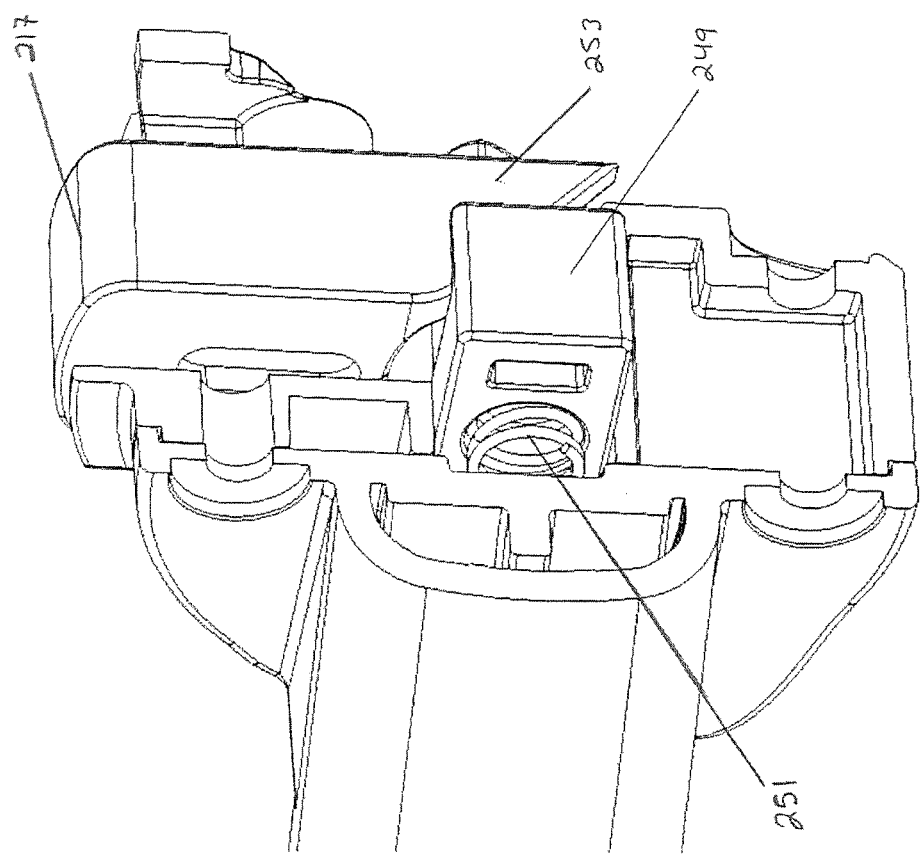
FIG. 65 illustrates a partial cross-sectional view of the locking mechanism used in connection with the secondary attachment.

Referring now to FIGS. 64 and 65, when the locking element 243 is moved in the direction of arrow E, the spring 251 is compressed and the carriage 249 moves towards the interior surface of the attachment end 215. As the carriage 249 moves, a different region of the top diagonal surface of the carriage 249 engages with the lower diagonal shaped end 253 of the actuator 217, resulting in the movement of the actuator 217 in the direction of arrow F. Applying pressure to actuator 217 to force movement of the actuator 217 in the direction of arrow F will result in corresponding movement of the locking element 243 in the direction of arrow E, thereby compressing spring 251. Likewise, when the spring 251 is permitted to expand, the locking element 243 moves back to its expanded state and the actuator 217 returns to its non-depressed state. The actuator 217 may be permitted to move in the direction of arrow F as a result of placing pressure on the locking element 243 in the direction of arrow E or engaging the diagonal engagement surface 244 with pressure sufficient pressure to force the locking element 243 to move in the direction of arrow E. It will be understood that the secondary attachments mentioned herein may have two of each of the engagement mechanisms disclosed herein, with each needing to be individually actuated or engaged, or having a single release or engagement system.

Although the invention has been described in terms of exemplary embodiments, it is not limited thereto. Rather, the appended claims should be construed broadly to include other variants and embodiments of the invention which may be made by those skilled in the art without departing from the scope and range of equivalents of the invention. This disclosure is intended to cover any adaptations or variations of the embodiments discussed herein.

We claim:

1. A stroller comprising:
   a base having a first end, a second end and an elongated portion extending therebetween;

a first frame member having a first end and a second end, wherein the first end is connected to the base proximate the first end of the base and a generally elongated portion extends between the first end and second end of the first frame member, the second end of the first frame member comprising at least one structural member, said at least one structural member being configured to provide support for a secondary attachment;

a second frame member having a first end and a second end, wherein the first end is connected to the base proximate the second end of the base and a generally elongated portion extends between the first end and second end of the second frame member, the second end of the second frame member comprising at least one structural member, said at least one structural member being configured to provide support for the secondary attachment, wherein the secondary attachment further comprises:

a first segment with at least one first attachment end; and a second segment laterally spaced apart from the first segment with at least one second attachment end; and at least one receptacle located within the at least one structural member of the first frame member and at least one structural member of the second frame member, each receptacle capable of receiving at least one of the attachment ends of the secondary attachment, wherein each receptacle has a structure for selectively locking the attachment ends of the secondary attachment therein, wherein, in a first configuration the first attachment end of the secondary attachment is removably attached proximate to an upper portion of the first frame member and the second attachment end is removably attached proximate to a handle at an upper portion of the second frame member by way of the one or more attachment ends of the secondary attachment being engaged with the receptacles, and in a second configuration the secondary attachment is detached from both the upper portion of the first frame member and the upper portion of the second frame member.

2. The stroller of claim 1, wherein the secondary attachment further comprises a basket.

3. The stroller of claim 2, further comprising at least one additional pair of receptacles configured to store the basket.

4. The stroller of claim 2, wherein the basket comprises at least one compartment.

5. The stroller of claim 2, wherein the basket comprises at least one adjustable panel.

6. The stroller of claim 1, wherein the secondary attachment further comprises an infant car seat adapter.

7. The stroller of claim 1, wherein in the secondary attachment is attached to the first frame member by way of a rotatable mechanism pivotally engaged with the receptacle of the first frame member and, wherein the secondary mechanism is rotated with respect to the first frame member to facilitate a locking engagement with the receptacle of the first frame member.

8. The stroller of claim 7, wherein the primary locking mechanism further comprises at least one locking protrusion and one casing positioned to secure at least a portion of the receptacle of the first frame member therebetween.

9. The stroller of claim 1, wherein in the secondary attachment further comprises a spring loaded locking element and is secured to one or more receptacles of one of the first or second frame members when the spring loaded locking element engages an aperture disposed on such one of the first or second frame members.

10. The stroller of claim 9, wherein the engagement of the locking element with the aperture of one of the first or second frame members is facilitated by rotation of the secondary attachment about an axis located on the opposing one of the first or second frame members.

11. The stroller of claim 9, wherein the primary locking mechanism is actuated by at least one actuator.

12. The stroller of claim 11, wherein the actuator is biased in a non-depressed position.

13. The stroller of claim 1, wherein the base member of the stroller is expandable and the secondary attachment is expandable, such that the base member of the stroller may be expanded with the secondary attachment mounted thereon.

14. The stroller of claim 1, wherein the attachment ends are substantially cylindrical.

15. The stroller of claim 14, wherein the attachment ends are configured to rotate within one or more of the receptacles.

16. The stroller of claim 1, wherein the receptacles are substantially semi-circular.

17. A basket comprising:
 a first end comprising at least one attachment mechanism configured to attach to a first frame of an expandable stroller;
 a second end comprising at least one attachment mechanism configured to attach to a second frame of the expandable stroller;
 a primary compartment; and
 at least one expandable compartment, wherein adjacent expandable compartments of the at least one expandable compartments are connected via at least one cable routing system and a common panel, and one of the at least one expandable compartment is adjacent to the primary compartment,
 wherein the at least one expandable compartment is in a first expanded state when the expandable stroller is in an expanded state and the at least one expandable compartment is in a second non-expanded state when the expandable stroller is in a non-expanded state,
 each of the at least one cable routing system configured to expand and retract the length of the expandable compartment.

18. A stroller comprising:
 a base having a first end, a second end and an elongated portion extending therebetween;
 a first frame member having a lower end and an upper end, wherein the lower end is connected to the base proximate the first end of the base and a generally elongated portion extends between the lower end and upper end of the first frame member, the upper end of the first frame member comprising at least one structural member, said at least one structural member being configured to provide support for a secondary attachment;
 a second frame member having a lower end and an upper end, wherein the lower end is connected to the base proximate the second end of the base and a generally elongated portion extends between the lower end and upper end of the second frame member, the upper end of the second frame member comprising at least one structural member, said at least one structural member being configured to provide support for the secondary attachment, wherein the secondary attachment further comprises:

a first segment with at least one first attachment end; and a second segment laterally spaced apart from the first segment with at least one second attachment end; and at least one receptacle located within the at least one structural member of the first frame member and at least one structural member of the second frame member, each receptacle capable of receiving at least one of the attachment ends of the secondary attachment, wherein each receptacle has a structure for selectively locking the attachment ends of the secondary attachment therein, wherein the first attachment end of the secondary attachment is attached proximate to an upper portion of the first frame member and the second attachment end is attached proximate to a handle at an upper portion of the second frame member via a locking mechanism located on the first attachment end or the second attachment end, the locking mechanism comprising one or more actuators, wherein depression of the one or more actuators and rotation of the first attachment end or the second attachment end about an axis located on an opposing attachment end facilitates detachment of one end of the secondary attachment from the first frame member or the second frame member and rotation of an opposing end of the secondary attachment about the axis.

19. A stroller comprising:

a base having a first end, a second end and an elongated portion extending therebetween;

a first frame member having a first end and a second end, wherein the first end is connected to the base proximate the first end of the base and a generally elongated portion extends between the first end and second end of the first frame member, the second end of the first frame member comprising at least one structural member, said at least one structural member being configured to provide support for a secondary attachment;

a second frame member having a first end and a second end, wherein the first end is connected to the base proximate the second end of the base and a generally elongated portion extends between the first end and second end of the second frame member, the second end of the second frame member comprising at least one structural member, said at least one structural member being configured to provide support for the secondary attachment, wherein the secondary attachment further comprises:

a first segment with at least one first attachment end; and a second segment laterally spaced apart from the first segment with at least one second attachment end; and at least one receptacle located within the at least one structural member of the first frame member and at least one structural member of the second frame member, each receptacle capable of receiving at least one of the attachment ends of the secondary attachment, wherein each receptacle has a structure for selectively locking the attachment ends of the secondary attachment therein, wherein, in a first configuration the first attachment end of the secondary attachment is attached proximate to an upper portion of the first frame member and the second attachment end is attached proximate to a handle at an upper portion of the second frame member, and in a second configuration either the first attachment end or the second attachment end of the secondary attachment is detached from the first frame member or the second frame member and the secondary attachment rotates about an axis formed by the attachment end located at the opposing frame member.

\* \* \* \* \*